US011963057B2

United States Patent
Ohlsson et al.

(10) Patent No.: US 11,963,057 B2
(45) Date of Patent: Apr. 16, 2024

(54) HANDOVER OF UNACKNOWLEDGED MODE BEARER IN A WIRELESS COMMUNICATION SYSTEM

(71) Applicant: Telefonaktiebolaget LM Ericsson (publ), Stockholm (SE)

(72) Inventors: Oscar Ohlsson, Bromma (SE); Johan Rune, Lidingö (SE); Claes-Göran Persson, Mjölby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 464 days.

(21) Appl. No.: 17/419,954

(22) PCT Filed: Dec. 18, 2019

(86) PCT No.: PCT/EP2019/085849
§ 371 (c)(1),
(2) Date: Jun. 30, 2021

(87) PCT Pub. No.: WO2020/141074
PCT Pub. Date: Jul. 9, 2020

(65) Prior Publication Data
US 2022/0095187 A1  Mar. 24, 2022

Related U.S. Application Data

(60) Provisional application No. 62/786,999, filed on Dec. 31, 2018.

(51) Int. Cl.
*H04W 36/18* (2009.01)
(52) U.S. Cl.
CPC .................. *H04W 36/18* (2013.01)
(58) Field of Classification Search
CPC .................................................. H04W 36/18
See application file for complete search history.

(56) References Cited

U.S. PATENT DOCUMENTS

2008/0123673 A1* 5/2008 Lee ................... H04W 36/0011
370/412
2013/0114813 A1* 5/2013 Chai .................... H04L 9/0827
455/411
(Continued)

FOREIGN PATENT DOCUMENTS

EP           2835925 A1     2/2015

OTHER PUBLICATIONS

Huawei, et al., "L2 handling for OMS interruption mobility", 3GPP TSG RAN WG2 Meeting #98, R2-1704856, Hangzhou, China, May 15-19, 2017, 1-3.
(Continued)

*Primary Examiner* — Harry H Kim
(74) *Attorney, Agent, or Firm* — Murphy, Bilak & Homiller, PLLC

(57) ABSTRACT

After receiving a handover command (22) that commands a wireless device (16) to perform a make-before-break handover (24), the wireless device (16) continues to receive from a source link (20-0) downlink data packets for an unacknowledged mode bearer (21), until after the wireless device (16) establishes a connection with the target link (20-1) as part of the handover. After the wireless device (16) establishes the connection with the target link (20-1), the wireless device (16) receives from the target link (20-1) downlink data packets for the unacknowledged mode bearer (21). The wireless device (16) preserves a downlink data packet sequence number receiver status for the unacknowledged mode bearer (21), by using the same downlink data packet sequence number receiver status for the unacknowledged mode bearer (21) before and after the handover. Based on the downlink data packet sequence number receiver status as preserved, the wireless device (16) monitors for data packets received in duplicate from the source link (Continued)

(20-0) and the target link (20-1) for the unacknowledged mode bearer (21).

26 Claims, 29 Drawing Sheets

(56) References Cited

U.S. PATENT DOCUMENTS

| | | | |
|---|---|---|---|
| 2015/0208283 A1* | 7/2015 | Yang | H04L 47/34 370/331 |
| 2018/0098250 A1 | 4/2018 | Vrzic et al. | |
| 2018/0115928 A1* | 4/2018 | Kim | H04W 36/0033 |
| 2018/0227805 A1* | 8/2018 | Jang | H04W 72/1215 |
| 2019/0253945 A1* | 8/2019 | Paladugu | H04W 76/27 |
| 2019/0306768 A1* | 10/2019 | Kim | H04W 36/00835 |
| 2020/0245401 A1* | 7/2020 | Ingale | H04W 36/14 |
| 2022/0232431 A1* | 7/2022 | Hsieh | H04L 1/1621 |

OTHER PUBLICATIONS

Qualcomm Incorporated, "LTE Mobility Enhancements", 3GPP TSG-RAN WG2 Meeting #103bis, R2-1814206, Chengdu, China, Oct. 8-12, 2018, 1-9.

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", 3GPP TS 36.300 V15.3.0, Sep. 2018, pp. 1-358.

3GPP, "3rd Generation Partnership Project; Technical Specification Group Radio Access Network; Evolved Universal Terrestrial Radio Access (E-UTRA); Packet Data Convergence Protocol (PDCP) specification (Release 15)", 3GPP TS 36.323 V15.1.0, Sep. 2018, pp. 1-51.

3GPP, "3rd Generation Partnership Project; Technical Specification Group Radio Access Network; NR; NR and NG-RAN Overall Description; Stage 2 (Release 15)", 3GPP TS 38.300 V15.3.1, Oct. 2018, pp. 1-92.

3GPP, "3rd Generation Partnership Project; Technical Specification Group Radio Access Network; NR; Packet Data Convergence Protocol (PDCP) specification (Release 15)", 3GPP TS 38.323 V15.3.0, Sep. 2018, pp. 1-26.

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", 3GPP TS 36.300 V15.2.0, Jun. 2018, pp. 1-357.

3GPP, "3rd Generation Partnership Project; Technical Specification Group Radio Access Network; Evolved Universal Terrestrial Radio Access (E-UTRA); Packet Data Convergence Protocol (PDCP) specification (Release 14)", 3GPP TS 36.323 V14.4.0, Sep. 2017, pp. 1-43.

3GPP, "3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.3.0, Sep. 2018, pp. 1-770.

3GPP, "3rd Generation Partnership Project; Technical Specification Group Radio Access Network; Evolved Universal Terrestrial Radio Access Network (E-UTRAN); X2 application protocol (X2AP) (Release 15)", 3GPP TS 36.423 V15.3.0, Sep. 2018, pp. 1-401.

3GPP, "3rd Generation Partnership Project; Technical Specification Group Radio Access Network; NR; NR and NG-RAN Overall Description; Stage 2 (Release 15)", 3GPP TS 38.300 V15.1.0, Mar. 2018, pp. 1-71.

3GPP, "3rd Generation Partnership Project; Technical Specification Group Radio Access Network; NR; Packet Data Convergence Protocol (PDCP) specification (Release 15)", 3GPP TS 38.323 V15.0.0, Dec. 2017, pp. 1-25.

CATT, "NR PDCP window and timer mechanisms", 3GPP TSG-RAN WG2 Meeting #98, R2-1704264, Hangzhou, China, May 15-19, 2017, pp. 1-4.

Qualcomm Incorporated, "NR OMS Interruption Ho", 3GPP TSG-RAN WG2 Meeting #101, R2-1803662, Athens, Greece, Feb. 26-Mar. 2, 2018, pp. 1-8.

Samsung, "Data forwarding for Maintaining source eNB connection solution", 3GPP TSG-RAN WG3 Meeting #93bis, R3-162134, Sophia Antipolis, France, Oct. 10-14, 2016, pp. 1-4.

ZTE Corporation, "Data forwarding issues for solution 2", 3GPP TSG-RAN WG3 #93, R3-161598, Göteborg, Sweden, Aug. 22-26, 2016, pp. 1-2.

\* cited by examiner

```
┌─────────────────────────────────────────────────────────────┐
│ ESTABLISHING AN UNACKNOWLEDGED MODE BEARER WITH A SOURCE LINK│
│                            400                               │
└─────────────────────────────────────────────────────────────┘
                              │
                              ▼
┌─────────────────────────────────────────────────────────────┐
│  RECEIVING A HANDOVER COMMAND THAT COMMANDS THE WIRELESS    │
│  DEVICE TO PERFORM A MAKE-BEFORE-BREAK HANDOVER FROM THE    │
│            SOURCE LINK TO A TARGET LINK                      │
│                            402                               │
└─────────────────────────────────────────────────────────────┘
                              │
                              ▼
┌─────────────────────────────────────────────────────────────┐
│  PERFORMING THE MAKE-BEFORE-BREAK HANDOVER FROM THE SOURCE  │
│                  LINK TO THE TARGET LINK                     │
│                            404                               │
└─────────────────────────────────────────────────────────────┘
                              │
                              ▼
┌─────────────────────────────────────────────────────────────┐
│  AFTER RECEIVING THE HANDOVER COMMAND, CONTINUING TO RECEIVE│
│   FROM THE SOURCE LINK DOWNLINK DATA PACKETS FOR THE        │
│              UNACKNOWLEDGED MODE BEARER                      │
│                            406                               │
└─────────────────────────────────────────────────────────────┘
                              │
                              ▼
┌─────────────────────────────────────────────────────────────┐
│  RESPONSIVE TO THE WIRELESS DEVICE ESTABLISHING A CONNECTION│
│  WITH THE TARGET LINK AS PART OF THE MAKE-BEFORE-BREAK HANDOVER│
│  OR TO THE WIRELESS DEVICE RECEIVING DOWNLINK DATA PACKETS FOR│
│   THE UNACKNOWLEDGED MODE BEARER FROM THE TARGET LINK,      │
│      STOPPING RECEIVING DOWNLINK DATA PACKETS FOR THE       │
│     UNACKNOWLEDGED MODE BEARER FROM THE SOURCE LINK         │
│                            408                               │
└─────────────────────────────────────────────────────────────┘
                              │
                              ▼
┌─────────────────────────────────────────────────────────────┐
│   TRANSMITTING TO THE SOURCE RADIO NETWORK NODE CONTROL     │
│ SIGNALING INDICATING THAT THE WIRELESS DEVICE HAS ESTABLISHED THE│
│              CONNECTION WITH THE TARGET LINK                 │
│                            410                               │
└─────────────────────────────────────────────────────────────┘
                              │
                              ▼
┌─────────────────────────────────────────────────────────────┐
│  AFTER OR AS PART OF PERFORMING THE MAKE-BEFORE-BREAK       │
│  HANDOVER, RESETTING A DOWNLINK DATA PACKET SEQUENCE NUMBER │
│    RECEIVER STATUS FOR THE UNACKNOWLEDGED MODE BEARER       │
│                            412                               │
└─────────────────────────────────────────────────────────────┘
```

*FIGURE 4A*

TRANSMITTING, FROM THE RADIO NETWORK NODE AS A TARGET RADIO NETWORK NODE, A HANDOVER COMMAND TO A SOURCE RADIO NETWORK NODE THAT COMMANDS A WIRELESS DEVICE TO PERFORM A MAKE-BEFORE-BREAK HANDOVER FROM A SOURCE LINK PROVIDED BY THE SOURCE RADIO NETWORK NODE TO A TARGET LINK PROVIDED BY THE TARGET RADIO NETWORK NODE
430

AFTER TRANSMITTING THE HANDOVER COMMAND, TRANSMITTING, FROM THE TARGET RADIO NETWORK NODE TO THE SOURCE RADIO NETWORK NODE, CONTROL SIGNALING INDICATING THAT THE SOURCE RADIO NETWORK NODE IS TO START FORWARDING DOWNLINK DATA PACKETS FOR THE UNACKNOWLEDGED MODE BEARER TO THE TARGET RADIO NETWORK NODE
432

RESPONSIVE TO TRANSMITTING THE CONTROL SIGNALING, RECEIVING DOWNLINK DATA PACKETS FOR THE UNACKNOWLEDGED MODE BEARER FORWARDED FROM THE SOURCE RADIO NETWORK NODE
434

AFTER ESTABLISHING A CONNECTION BETWEEN THE WIRELESS DEVICE AND THE TARGET LINK AS PART OF THE MAKE-BEFORE-BREAK HANDOVER, TRANSMITTING FROM THE TARGET LINK TO THE WIRELESS DEVICE DOWNLINK DATA PACKETS FOR THE UNACKNOWLEDGED MODE BEARER
436

AFTER OR AS PART OF THE MAKE-BEFORE-BREAK HANDOVER, RESETTING A DOWNLINK DATA DOWNLINK DATA PACKET SEQUENCE NUMBER RECEIVER STATUS FOR THE UNACKNOWLEDGED MODE BEARER
438

*FIGURE 4C*

```
┌─────────────────────────────────────────────────────────────┐
│ ESTABLISHING AN UNACKNOWLEDGED MODE BEARER WITH A SOURCE LINK│
│                           500                                │
└─────────────────────────────────────────────────────────────┘
                              │
                              ▼
┌─────────────────────────────────────────────────────────────┐
│  RECEIVING A HANDOVER COMMAND THAT COMMANDS THE WIRELESS    │
│  DEVICE TO PERFORM A MAKE-BEFORE-BREAK HANDOVER FROM THE    │
│              SOURCE LINK TO A TARGET LINK                    │
│                           502                                │
└─────────────────────────────────────────────────────────────┘
                              │
                              ▼
┌─────────────────────────────────────────────────────────────┐
│   PERFORMING THE MAKE-BEFORE-BREAK HANDOVER FROM THE SOURCE │
│                  LINK TO THE TARGET LINK                     │
│                           504                                │
└─────────────────────────────────────────────────────────────┘
                              │
                              ▼
┌─────────────────────────────────────────────────────────────┐
│  AFTER RECEIVING THE HANDOVER COMMAND, CONTINUING TO RECEIVE│
│     FROM THE SOURCE LINK DOWNLINK DATA PACKETS FOR THE      │
│  UNACKNOWLEDGED MODE BEARER, UNTIL AFTER THE WIRELESS DEVICE│
│    ESTABLISHES A CONNECTION WITH THE TARGET LINK AS PART OF │
│             THE MAKE-BEFORE-BREAK HANDOVER                   │
│                           506                                │
└─────────────────────────────────────────────────────────────┘
                              │
                              ▼
┌─────────────────────────────────────────────────────────────┐
│   AFTER THE WIRELESS DEVICE ESTABLISHES THE CONNECTION WITH │
│   THE TARGET LINK, RECEIVING FROM THE TARGET LINK DOWNLINK  │
│       DATA PACKETS FOR THE UNACKNOWLEDGED MODE BEARER       │
│                           508                                │
└─────────────────────────────────────────────────────────────┘
                              │
                              ▼
┌─────────────────────────────────────────────────────────────┐
│  PRESERVING A DOWNLINK DATA PACKET SEQUENCE NUMBER RECEIVER │
│     STATUS AT THE WIRELESS DEVICE FOR THE UNACKNOWLEDGED    │
│    MODE BEARER, BY USING THE SAME DOWNLINK DATA PACKET      │
│  SEQUENCE NUMBER RECEIVER STATUS FOR THE UNACKNOWLEDGED MODE│
│     BEARER BEFORE AND AFTER THE MAKE-BEFORE-BREAK HANDOVER  │
│                           510                                │
└─────────────────────────────────────────────────────────────┘
                              │
                              ▼
┌─────────────────────────────────────────────────────────────┐
│  BASED ON THE DOWNLINK DATA PACKET SEQUENCE NUMBER RECEIVER │
│   STATUS AS PRESERVED, MONITORING FOR DATA PACKETS RECEIVED │
│  IN DUPLICATE FROM THE SOURCE LINK AND THE TARGET LINK FOR  │
│              THE UNACKNOWLEDGED MODE BEARER                  │
│                           512                                │
└─────────────────────────────────────────────────────────────┘
```

*FIGURE 5A*

```
┌─────────────────────────────────────────────────────────────┐
│  TRANSMITTING, FROM THE RADIO NETWORK NODE AS A TARGET RADIO │
│  NETWORK NODE, A HANDOVER COMMAND TO A SOURCE RADIO NETWORK  │
│   NODE THAT COMMANDS A WIRELESS DEVICE TO PERFORM A MAKE-    │
│   BEFORE-BREAK HANDOVER FROM A SOURCE LINK PROVIDED BY THE   │
│   SOURCE RADIO NETWORK NODE TO A TARGET LINK PROVIDED BY THE │
│                   TARGET RADIO NETWORK NODE                  │
│                             530                              │
└─────────────────────────────────────────────────────────────┘
                              │
                              ▼
┌─────────────────────────────────────────────────────────────┐
│  AFTER TRANSMITTING THE HANDOVER COMMAND, RECEIVING DOWNLINK │
│   DATA PACKETS FOR THE UNACKNOWLEDGED MODE BEARER FORWARDED  │
│                FROM THE SOURCE RADIO NETWORK NODE            │
│                             532                              │
└─────────────────────────────────────────────────────────────┘
                              │
                              ▼
┌─────────────────────────────────────────────────────────────┐
│  AFTER ESTABLISHING A CONNECTION BETWEEN THE WIRELESS DEVICE │
│ AND THE TARGET LINK AS PART OF THE MAKE-BEFORE-BREAK HANDOVER,│
│     TRANSMITTING FROM THE TARGET LINK TO THE WIRELESS DEVICE │
│       DOWNLINK DATA PACKETS FOR THE UNACKNOWLEDGED MODE BEARER│
│                             534                              │
└─────────────────────────────────────────────────────────────┘
                              │
                              ▼
┌─────────────────────────────────────────────────────────────┐
│       RECEIVING, FROM THE SOURCE RADIO NETWORK NODE, CONTROL │
│   SIGNALING INDICATING A DOWNLINK DATA PACKET SEQUENCE NUMBER│
│   TRANSMITTER STATUS AT THE SOURCE RADIO NETWORK NODE FOR THE│
│                   UNACKNOWLEDGED MODE BEARER                 │
│                             536                              │
└─────────────────────────────────────────────────────────────┘
                              │
                              ▼
┌─────────────────────────────────────────────────────────────┐
│      RECEIVING, FROM THE WIRELESS DEVICE, CONTROL SIGNALING  │
│   THAT INDICATES A SEQUENCE NUMBER OCCURRING NEXT AFTER A    │
│   HIGHEST SEQUENCE NUMBER OF DOWNLINK DATA PACKETS RECEIVED  │
│      BY THE WIRELESS DEVICE FOR THE UNACKNOWLEDGED MODE      │
│                           BEARER                             │
│                             538                              │
└─────────────────────────────────────────────────────────────┘
                              │
                              ▼
┌─────────────────────────────────────────────────────────────┐
│  BASED ON THE INDICATED DOWNLINK DATA PACKET SEQUENCE NUMBER │
│    RECEIVER STATUS AND THE CONTROL SIGNALING RECEIVED FROM   │
│   THE WIRELESS DEVICE, MONITORING FOR WHICH DATA PACKETS     │
│   RECEIVED FROM THE SOURCE RADIO NETWORK NODE ARE DUPLICATIVE│
│    OF DATA PACKETS THAT THE CONTROL SIGNALING FROM THE       │
│   WIRELESS DEVICE INDICATES HAVE ALREADY BEEN RECEIVED BY    │
│       THE WIRELESS DEVICE FOR THE UNACKNOWLEDGED MODE BEARER │
│                             540                              │
└─────────────────────────────────────────────────────────────┘
```

*FIGURE 5C*

```
┌─────────────────────────────────────────────────────────────┐
│  TRANSMITTING, FROM THE RADIO NETWORK NODE AS A TARGET RADIO │
│  NETWORK NODE, A HANDOVER COMMAND TO A SOURCE RADIO NETWORK  │
│   NODE THAT COMMANDS A WIRELESS DEVICE TO PERFORM A MAKE-    │
│    BEFORE-BREAK HANDOVER FROM A SOURCE LINK PROVIDED BY THE  │
│    SOURCE RADIO NETWORK NODE TO A TARGET LINK PROVIDED BY THE│
│                  TARGET RADIO NETWORK NODE                   │
│                             620                              │
└─────────────────────────────────────────────────────────────┘
                              │
                              ▼
┌─────────────────────────────────────────────────────────────┐
│  AFTER TRANSMITTING THE HANDOVER COMMAND, RECEIVING DOWNLINK │
│  DATA PACKETS FOR THE UNACKNOWLEDGED MODE BEARER FORWARDED   │
│            FROM THE SOURCE RADIO NETWORK NODE                │
│                             622                              │
└─────────────────────────────────────────────────────────────┘
                              │
                              ▼
┌─────────────────────────────────────────────────────────────┐
│  AFTER ESTABLISHING A CONNECTION BETWEEN THE WIRELESS DEVICE │
│  AND THE TARGET LINK AS PART OF THE MAKE-BEFORE-BREAK HANDOVER,│
│       TRANSMITTING FROM THE TARGET LINK TO THE WIRELESS DEVICE│
│    DOWNLINK DATA PACKETS FOR THE UNACKNOWLEDGED MODE BEARER  │
│                             624                              │
└─────────────────────────────────────────────────────────────┘
                              │
                              ▼
┌─────────────────────────────────────────────────────────────┐
│   RECEIVING, FROM THE WIRELESS DEVICE, CONTROL SIGNALING THAT│
│   INDICATES A SEQUENCE NUMBER OCCURRING NEXT AFTER A HIGHEST │
│    SEQUENCE NUMBER OF DOWNLINK DATA PACKETS RECEIVED BY THE  │
│       WIRELESS DEVICE FOR THE UNACKNOWLEDGED MODE BEARER     │
│                             626                              │
└─────────────────────────────────────────────────────────────┘
                              │
                              ▼
┌─────────────────────────────────────────────────────────────┐
│   BASED ON THE INDICATED DOWNLINK DATA PACKET SEQUENCE NUMBER│
│    RECEIVER STATUS AND THE CONTROL SIGNALING RECEIVED FROM THE│
│     WIRELESS DEVICE, MONITORING FOR WHICH DATA PACKETS RECEIVED│
│     FROM THE SOURCE RADIO NETWORK NODE ARE DUPLICATIVE OF DATA│
│     PACKETS THAT THE CONTROL SIGNALING FROM THE WIRELESS DEVICE│
│   INDICATES HAVE ALREADY BEEN RECEIVED BY THE WIRELESS DEVICE FOR│
│                THE UNACKNOWLEDGED MODE BEARER                │
│                             628                              │
└─────────────────────────────────────────────────────────────┘
```

*FIGURE 6B*

HANDOVER OF UNACKNOWLEDGED MODE BEARER IN A WIRELESS COMMUNICATION SYSTEM

TECHNICAL FIELD

The present application generally relates to a wireless communication system, and more particularly relates to handover of an unacknowledged mode bearer in such a system.

BACKGROUND

Some wireless communication systems support transmission in either an acknowledged mode or an unacknowledged mode, e.g., at a radio link layer, RLC. In acknowledged mode, data packets that have not been correctly received by the receiver are selectively retransmitted, so as to achieve high reliability transmission. Acknowledged mode therefore relies on acknowledgement feedback from the receiver to the transmitter indicating which data packets have been correctly received. In unacknowledged mode, by contrast, data packets that have not been correctly received by the receiver are not retransmitted. Because packets are never retransmitted, unacknowledged mode efficiently avoids transmitting the same sort of feedback from the receiver to the transmitter. Unacknowledged mode may be used for delay sensitive packets, such as those used for Voice over IP (Vol P) or audio/video streams.

Some contexts complicate the use of unacknowledged mode as compared to acknowledged mode. Make-before-break (MBB) handover is one such context. In MBB, a wireless device makes a connection with the target of the handover before breaking its connection with the source of the handover. This minimizes interruption to downlink transmission during the handover process. Indeed, the source base station may continue to transmit downlink data packets to the wireless device even after commanding the wireless device to handover to a target base station. In the meantime, downlink data packets may be forwarded from the source base station to the target base station, for transmitting to the wireless device once the device connects to the target base station. Because unacknowledged mode inherently lacks the same sort of control signalling as acknowledged mode, though, it proves challenging with unacknowledged mode to prevent or detect the occurrence of packets being sent to the wireless device in duplicate from both the source base station and the target base station. Without this ability, MBB handover of unacknowledged mode bearers risks wasting radio resources, processing power, and/or battery life.

SUMMARY

According to some embodiments herein, the source radio network node of a make-before-break handover receives control signalling (e.g., from the target radio network node or the wireless device) that indicates the wireless device has established a connection with the target link of the handover or that indicates the source radio network node is to start forwarding downlink data packets for an unacknowledged mode bearer to the target radio network node. Responsive to this control signaling, the source radio network node may stop transmitting downlink data packets for the unacknowledged mode bearer from the source link to the wireless device and start to forward downlink data packets for the unacknowledged mode bearer from the source radio network node to the target radio network node. These embodiments may thereby exploit such control signaling to prevent packets being sent in duplicate to both the target radio network node and the wireless device.

According to other embodiments herein, a source radio network node of a make-before-break handover transmits to a target radio network node control signalling indicating a downlink data packet sequence number transmitter status (e.g., a PDCP COUNT) for an unacknowledged mode (UM) bearer (e.g., an RLC UM bearer). Alternatively or additionally, a wireless device transmits to the target radio network node control signaling (e.g., a PDCP status report) that indicates a sequence number occurring next after a highest sequence number of downlink data packets received by the wireless device for the unacknowledged mode bearer. These embodiments may thereby exploit such control signaling for unacknowledged mode, despite the control signaling not being needed for retransmissions in unacknowledged mode. These and/or other embodiments herein may advantageously allow the wireless device and/or the target radio network node to prevent or detect the occurrence of packets being sent to the wireless device in duplicate from both the source radio network node and the target radio network node.

Generally, then, some embodiments may improve the packet transmission efficiency in unacknowledged mode, so as to conserve radio resources, processing resources, and/or power consumption.

More particularly, embodiments herein include a method performed by a wireless device. The method may comprise establishing an unacknowledged mode bearer with a source link. The method may also comprise receiving a handover command that commands the wireless device to perform a make-before-break handover from the source link to a target link. The method may further comprise performing the make-before-break handover from the source link to the target link. The method may comprise, after receiving the handover command, continuing to receive from the source link downlink data packets for the unacknowledged mode bearer, until after the wireless device establishes a connection with the target link as part of the make-before-break handover. The method may also comprise, after the wireless device establishes the connection with the target link, receiving from the target link downlink data packets for the unacknowledged mode bearer. In some embodiments, the method may further comprise preserving a downlink data packet sequence number receiver status at the wireless device for the unacknowledged mode bearer, by using the same downlink data packet sequence number receiver status for the unacknowledged mode bearer before and after the make-before-break handover. The method may also comprise, based on the downlink data packet sequence number receiver status as preserved, monitoring for data packets received in duplicate from the source link and the target link for the unacknowledged mode bearer.

In some embodiments, the downlink data packets are downlink packet data convergence protocol, PDCP, service data units, SDUs, and the downlink data packet sequence number receiver status is a downlink PDCP sequence number, SN, receiver status that indicates a next PDCP SN that the target link shall assign to a new SDU which does not have a PDCP SN yet.

In some embodiments, said preserving comprises preserving a packet data convergence protocol, PDCP, COUNT for the unacknowledged mode bearer, and the PDCP COUNT comprises a hyper-frame number, HFN, and a PDCP sequence number.

In other embodiments, a packet data convergence protocol, PDCP, COUNT comprises a hyper-frame number, HFN, and a PDCP sequence number, and said preserving comprises preserving at least the PDCP sequence number of the PDCP COUNT for the unacknowledged mode bearer.

In some embodiments, the unacknowledged mode bearer is a radio link control, RLC, unacknowledged mode, UM, bearer or a radio bearer that utilizes RLC UM.

Embodiments herein also include a method performed by a wireless device. The method may comprise receiving downlink data packets on an unacknowledged mode bearer. The method may also comprise transmitting control signaling that indicates a sequence number occurring next after a highest sequence number of downlink data packets received by the wireless device for the unacknowledged mode bearer.

In some embodiments, the downlink data packets are downlink packet data convergence protocol, PDCP, service data units, SDUs, and the unacknowledged mode bearer is a radio link control, RLC, unacknowledged mode, UM, bearer or a radio bearer that utilizes RLC UM.

In some embodiments, the control signaling does not indicate which sequence numbers below the indicated sequence number are missing at the wireless device for the unacknowledged mode bearer.

In some embodiments, the control signaling comprises a first missing SDU, FMS, field of a PDCP status report or comprises a PDCP control protocol data unit, PDU, specific for RLC UM.

Embodiments herein further include a method performed by a radio network node. The method comprises receiving, from a wireless device, control signaling that indicates a sequence number occurring next after a highest sequence number of downlink data packets received by the wireless device for an unacknowledged mode bearer.

In some embodiments, the control signaling from the wireless device does not indicate which sequence numbers below the indicated sequence number are missing at the wireless device for the unacknowledged mode bearer.

In some embodiments, the control signaling from the wireless device comprises a first missing SDU, FMS, field of a PDCP status report or comprises a PDCP control protocol data unit, PDU, specific for RLC UM.

In some embodiments, the method further comprises transmitting, from the radio network node as a target radio network node, a handover command to a source radio network node that commands the wireless device to perform a make-before-break handover from a source link provided by the source radio network node to a target link provided by the target radio network node. The method may also comprise, after transmitting the handover command, receiving downlink data packets for the unacknowledged mode bearer forwarded from the source radio network node. The method may further comprise, after establishing a connection between the wireless device and the target link as part of the make-before-break handover, transmitting from the target link to the wireless device downlink data packets for the unacknowledged mode bearer. In some embodiments, the method further comprises, based on the control signaling received from the wireless device, monitoring for which data packets received from the source radio network node are duplicative of data packets that the control signaling from the wireless device indicates have already been received by the wireless device for the unacknowledged mode bearer. In this case, in some embodiments, said transmitting from the target link to the wireless device downlink data packets for the unacknowledged mode bearer may comprise selectively transmitting downlink data packets for the unacknowledged mode bearer that are not determined to be duplicative according to said monitoring.

In some embodiments, the downlink data packets are downlink packet data convergence protocol, PDCP, service data units, SDUs, and the unacknowledged mode bearer is a radio link control, RLC, unacknowledged mode, UM, bearer or a radio bearer that utilizes RLC UM.

Embodiments herein further include a method performed by a radio network node. The method may comprise establishing an unacknowledged mode bearer with a wireless device. The method may also comprise transmitting, from the radio network node as a source radio network node, a handover command that commands the wireless device to perform a make-before-break handover from a source link provided by the source radio network node to a target link provided by a target radio network node. The method may further comprise transmitting, from the source radio network node to the target radio network node, control signaling indicating a downlink data packet sequence number transmitter status at the source radio network node for the unacknowledged mode bearer.

In some embodiments, the method further comprises, after transmitting the handover command, forwarding downlink data packets for the unacknowledged mode bearer from the source radio network node to the target radio network node; and continuing to transmit downlink data packets for the unacknowledged mode bearer from the source link to the wireless device, until after the wireless device establishes a connection with the target link as part of the make-before-break handover.

In some embodiments, the downlink data packet sequence number transmitter status indicates a next sequence number that the target radio network node shall assign to a new data packet for the unacknowledged mode bearer which does not have a sequence number yet.

In some embodiments, the downlink data packets are downlink packet data convergence protocol, PDCP, service data units, SDUs, and the downlink data packet sequence number transmitter status is a downlink PDCP sequence number, SN, transmitter status that indicates a next PDCP SN that the target link shall assign to a new SDU which does not have a PDCP SN yet.

In some embodiments, a packet data convergence protocol, PDCP, COUNT comprises a hyper-frame number, HFN, and a PDCP sequence number, and said downlink data packet sequence number transmitter status comprises at least the PDCP sequence number of the PDCP COUNT for the unacknowledged mode bearer.

In some embodiments, the unacknowledged mode bearer is a radio link control, RLC, unacknowledged mode, UM, bearer or a radio bearer that utilizes RLC UM.

Embodiments herein further include a method performed by a radio network node. The method may comprise transmitting, from the radio network node as a target radio network node, a handover command to a source radio network node that commands a wireless device to perform a make-before-break handover from a source link provided by the source radio network node to a target link provided by the target radio network node. The method may also comprise receiving, from the source radio network node, control signaling indicating a downlink data packet sequence number transmitter status at the source radio network node for an unacknowledged mode bearer.

In some embodiments, the method further comprises, after transmitting the handover command, receiving downlink data packets for the unacknowledged mode bearer forwarded from the source radio network node. In this case, the method may further comprise, after establishing a connection between the wireless device and the target link as part of the make-before-break handover, transmitting from the target link to the wireless device downlink data packets for the unacknowledged mode bearer.

In some embodiments, the downlink data packet sequence number transmitter status indicates a next sequence number that the target radio network node shall assign to a new data packet for the unacknowledged mode bearer which does not have a sequence number yet. In one such embodiment, the next sequence number is a sequence number occurring next after a highest sequence number of downlink data packets transmitted by the source radio network node to the wireless device for the unacknowledged mode bearer. Alternatively or additionally, in some embodiments, the method may further comprise assigning the indicated next sequence number to a new data packet for the unacknowledged mode bearer which does not have a sequence number yet.

In some embodiments, a DL COUNT field of a sequence number, SN, status transfer message indicates a PDCP-SN and a Hyper frame number, and wherein the control signaling comprises the PDCP-SN indicated by the DL COUNT field.

In some embodiments, the downlink data packets are downlink packet data convergence protocol, PDCP, service data units, SDUs, and the downlink data packet sequence number transmitter status is a downlink PDCP sequence number, SN, transmitter status that indicates a next PDCP SN that the target link shall assign to a new SDU which does not have a PDCP SN yet.

In some embodiments, the unacknowledged mode bearer is a radio link control, RLC, unacknowledged mode, UM, bearer or a radio bearer that utilizes RLC UM.

Embodiments herein also include corresponding apparatus, computer programs, and carriers such as non-transitory computer-readable storage mediums. For example, embodiments herein include a wireless device. The wireless device may be configured (e.g., via communication circuitry and processing circuitry) to operate as described below. In particular, the wireless device may be configured to establish an unacknowledged mode bearer with a source link. The wireless device may also be configured to receive a handover command that commands the wireless device to perform a make-before-break handover from the source link to a target link. The wireless device may further be configured to perform the make-before-break handover from the source link to the target link. The wireless device may be configured to, after receiving the handover command, continue to receive from the source link downlink data packets for the unacknowledged mode bearer, until after the wireless device establishes a connection with the target link as part of the make-before-break handover. The wireless device may also be configured to, after the wireless device establishes the connection with the target link, receive from the target link downlink data packets for the unacknowledged mode bearer. In some embodiments, the wireless device may further be configured to preserve a downlink data packet sequence number receiver status at the wireless device for the unacknowledged mode bearer, by using the same downlink data packet sequence number receiver status for the unacknowledged mode bearer before and after the make-before-break handover. The wireless device may also be configured to, based on the downlink data packet sequence number receiver status as preserved, monitor for data packets received in duplicate from the source link and the target link for the unacknowledged mode bearer.

Embodiments herein also include a wireless device. The wireless device may be configured (e.g., via communication circuitry and processing circuitry) to operate as described below. In particular, the wireless device may be configured to receive downlink data packets on an unacknowledged mode bearer. The wireless device may also be configured to transmit control signaling that indicates a sequence number occurring next after a highest sequence number of downlink data packets received by the wireless device for the unacknowledged mode bearer.

Embodiments herein also include a radio network node. The radio network node may be configured (e.g., via communication circuitry and processing circuitry) to operate as described below. In particular, the radio network node may be configured to receive, from a wireless device, control signaling that indicates a sequence number occurring next after a highest sequence number of downlink data packets received by the wireless device for an unacknowledged mode bearer.

Embodiments herein also include a radio network node. The radio network node may be configured (e.g., via communication circuitry and processing circuitry) to operate as described below. In particular, the radio network node may be configured to establish an unacknowledged mode bearer with a wireless device. The radio network node may also be configured to transmit, from the radio network node as a source radio network node, a handover command that commands the wireless device to perform a make-before-break handover from a source link provided by the source radio network node to a target link provided by a target radio network node. The radio network node may further be configured to transmit, from the source radio network node to the target radio network node, control signaling indicating a downlink data packet sequence number transmitter status at the source radio network node for the unacknowledged mode bearer.

Embodiments herein also include a radio network node. The radio network node may be configured (e.g., via communication circuitry and processing circuitry) to operate as described below. In particular, the radio network node may be configured to transmit, from the radio network node as a target radio network node, a handover command to a source radio network node that commands a wireless device to perform a make-before-break handover from a source link provided by the source radio network node to a target link provided by the target radio network node. The radio network node may also be configured to receive, from the source radio network node, control signaling indicating a downlink data packet sequence number transmitter status at the source radio network node for an unacknowledged mode bearer.

BRIEF DESCRIPTION OF THE DRAWINGS

FIG. 4A is a logic flow diagram of a method performed by a wireless device according to some embodiments.

FIG. 4C is a logic flow diagram of a method performed by a radio network node according to some embodiments.

FIG. 5A is a logic flow diagram of a method performed by a wireless device according to other embodiments.

FIG. 5C is a logic flow diagram of a method performed by a radio network node according to other embodiments.

FIG. 6B is a logic flow diagram of a method performed by a radio network node according to still other embodiments.

DETAILED DESCRIPTION

Figure 1:
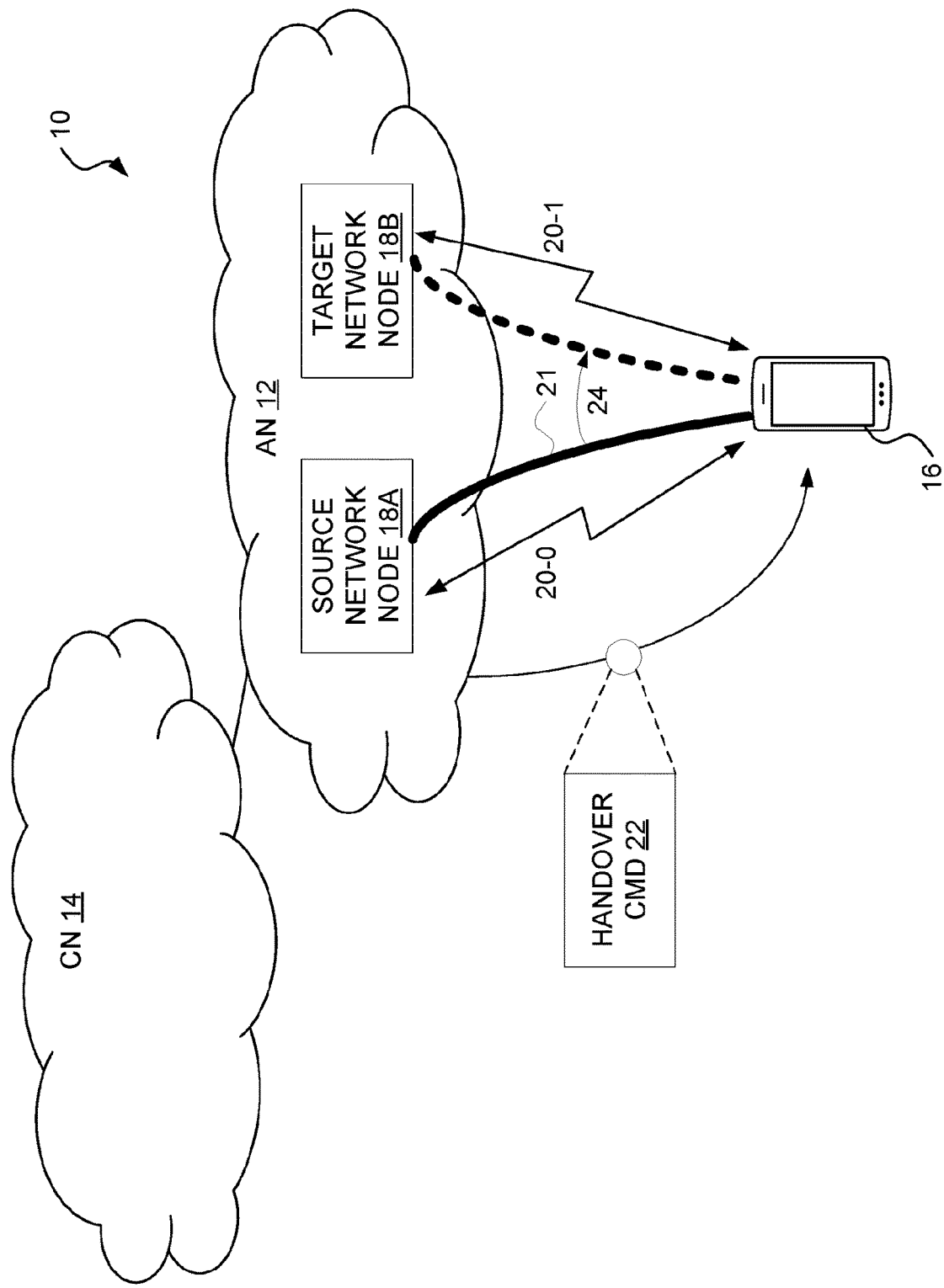
FIG. 1 is a block diagram of a wireless communication network according to some embodiments.

FIG. 1 illustrates a wireless communication network 10 according to one or more embodiments. As shown, the network 10, e.g., a 5G network or New Radio, NR, network, may include an access network (AN) 12 and a core network (CN) 14. The AN 12 wirelessly connects a wireless communication device 16 (or simply "wireless device 16") to the CN 14. The CN 14 in turn connects the wireless device 16 to one or more external networks (not shown), such as a public switched telephone network and/or a packet data network, e.g., the Internet.

The AN 12 provides links via which the wireless device 16 may wirelessly access the system 10, e.g., using uplink and/or downlink communications. The AN 12 may for example provide links 20-0, 20-1, . . . 20-N (generally links 20) in the form of access nodes, e.g., base stations, cells, sectors, beams, carriers, or the like. Some links 20 may provide wireless coverage over different geographical areas.

The wireless device 16 as shown establishes a so-called unacknowledged mode bearer 21 on a serving link 20-0. The unacknowledged mode bearer 21 may for instance be described as a radio link control, RLC, unacknowledged mode, UM, bearer or a radio bearer that utilizes RLC UM. In these and other cases, downlink data packets that are transmitted on the bearer 21 to the wireless device 16 but that are not correctly received by the wireless device 16 are not retransmitted. So configured, the unacknowledged mode bearer 21 may be used for delay sensitive packets, such as those used for Voice over IP (Vol P) or audio/video streams.

Due for instance to mobility of the device 16 or changing channel conditions, the network 10 may transmit to the wireless device 16 a handover command 22 that commands the device 16 to perform a handover 24 from link 20-0 (referred to as the source link) to link 20-1 (referred to as the target link). Such a handover means that the unacknowledged mode bearer 21 is handed over from the source link 20-0 (as provided by source radio network node 18A) to the target link 20-1 (as provided by target radio network node 18B, which may be the same or different than the source radio network node 18A).

In some embodiments, the handover 24 is a make-before-break handover whereby the wireless device 16 makes a connection on/with the target link 20-1 before breaking its connection on/with the source link 20-0. This minimizes interruption to downlink transmission during the handover process. Indeed, the source radio network node 18A may continue to transmit downlink data packets to the wireless device 16 on the source link 20-0 even after commanding the wireless device 16 to handover to the target radio network node 18B. In the meantime, downlink data packets may be forwarded from the source radio network node 18A to the target radio network node 18B, for transmitting to the wireless device 16 once the device 16 connects on/with the target link 20-1.

Some embodiments herein allow the source radio network node 18A to continue transmitting downlink data packets to the wireless device 16 on the source link 20-0 after commanding the device 16 to hand over, i.e., in a make-before-break fashion, but control the source radio network node 18A to stop such transmission to the device 16 before or upon forwarding downlink data packets to the target radio network node 18B. The source radio network node 18A in this way may still perform a make-before-break handover but may avoid sending the same downlink data packet for the unacknowledged mode bearer 21 both to the wireless device 16 on the source link 20-0 and to the target radio network node 18B (for transmission by the target radio network node 18B to the device 16 on the target link 20-1).

Figure 2:
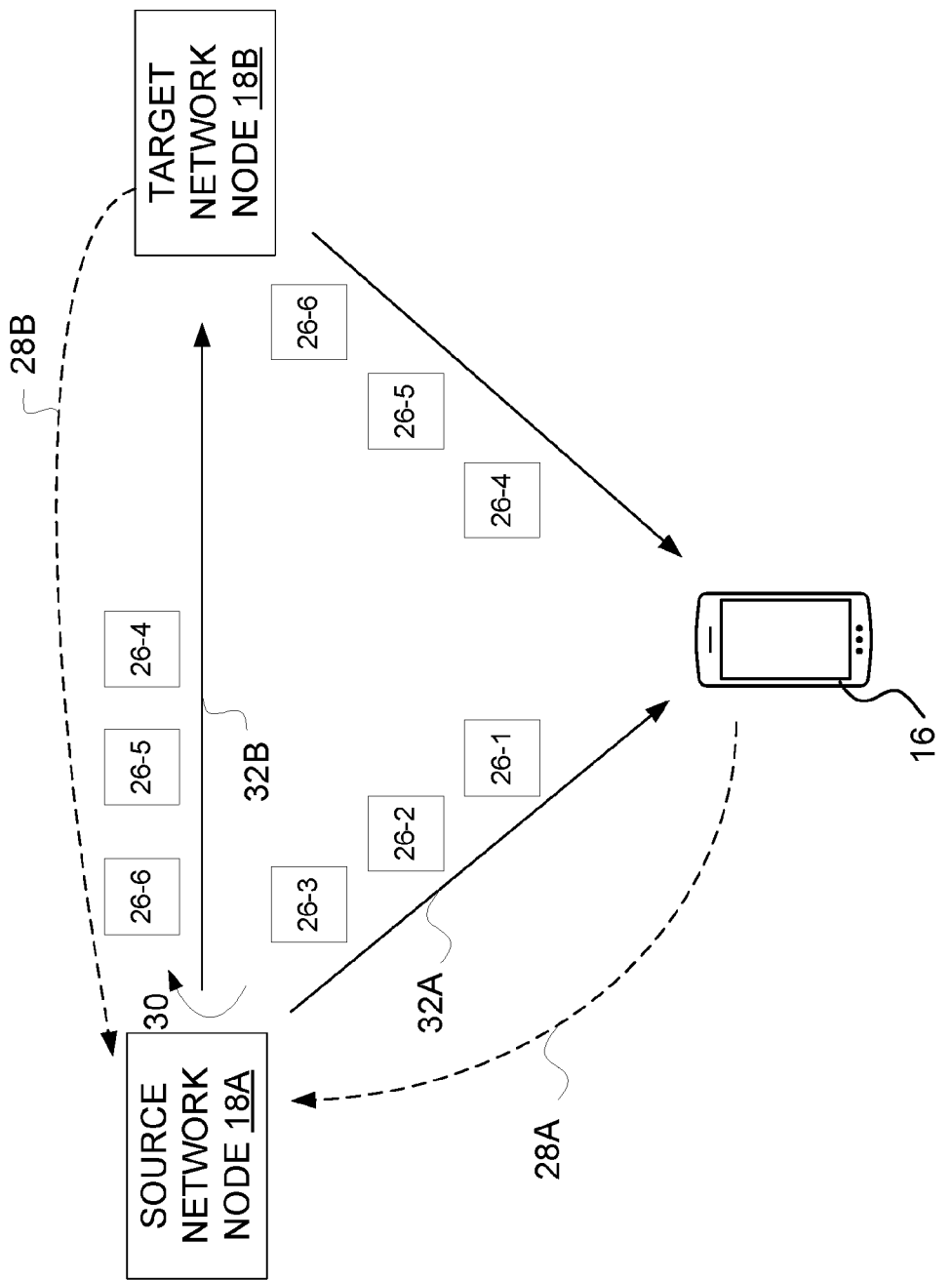
FIG. 2 is a block diagram of a wireless communication network according to other embodiments.

FIG. 2 illustrates additional details of these embodiments. As shown, the source radio network node 18A continues to transmit downlink data packets 26 (shown as downlink data packets 26-1, 26-2, and 26-3) for the unacknowledged mode bearer 21 from the source link 20-1 to the wireless device 16 even after transmitting the handover command 22. In some embodiments, though, the source radio network node 18A receives control signalling 28A from the wireless device 16 (e.g., in the form of a handover complete indication) that indicates the wireless device 16 has established a connection with the target link 20-1, e.g., in accordance with the handover command 22. Alternatively or additionally, the source radio network node 18A receives control signalling 28B from the target radio network node 18B that indicates the source radio network node 18A is to start forwarding downlink data packets for the unacknowledged mode bearer 21 to the target radio network node 18B. Responsive to receiving the control signalling 28A and/or 28B, the source radio network node 18A notably stops transmitting downlink data packets 26 for the unacknowledged mode bearer 21 from the source link 20-0 to the wireless device 16 and starts to forward downlink data packets 26 (shown as downlink data packets 26-4, 26-5, and 26-6) for the unacknowledged mode bearer 21 from the source radio network node 18A to the target radio network node 18B. FIG. 2 shows this as the source radio network node 18A performing a switch 30 (e.g., at or upon receiving control signaling 28A or 28B) from performing a downlink transmission 32A to device 16 on the source link 20-0 to performing a sidelink transmission 32B to target network node 18B. Regardless, the source radio network node 18A in this way may avoid sending the same downlink data packet for the unacknowledged mode bearer 21 both to the wireless device 16 on the source link 20-0 and to the target radio network node 18B (for transmission by the target radio network node 18B to the device 16 on the target link 20-1).

Alternatively or additionally from the perspective of the wireless device 16, the device 16 may stop receiving downlink data packets 26 for the unacknowledged mode bearer 21 from the source link 20-0 responsive to the wireless device establishing a connection with the target link 20-1 as part of the make-before-break handover or to the wireless device 16 receiving downlink data packets 26 for the unacknowledged mode bearer 21 from the target link 20-1. The wireless device's configuration in this regard may account for the source radio network node 18A stopping its downlink data packet transmission to the device 16 responsive to its receipt of control signaling 28A or 28B.

Note that the numbering of downlink data packets 26 in FIG. 2 is purely for illustrative purposes and may not reflect the actual sequence numbering of the data packets. In fact, with duplicate packet transmission avoided in this way, the downlink data packet sequence number transmitter/receiver status may be reset for the unacknowledged mode bearer 21, e.g., after or as part of performing the make-before-break handover 24. Where the downlink data packets are downlink packet data convergence protocol (PDCP) service data units (SDUs) for instance, such status may be a downlink PDCP sequence number (SN) transmitter/receiver status that indicates a next PDCP SN that the target link 20-0 shall assign to a new SDU which does not have a PDCP SN yet. In these and other embodiments, such resetting may involve resetting a packet data convergence protocol, PDCP, COUNT for the unacknowledged mode bearer 21. Here, the PDCP COUNT may be a hyper-frame number, HFN, and a PDCP sequence number.

Accordingly, the target radio network node 18B may in such embodiments, after such resetting, assign a sequence number of zero to a first downlink data packet received for the unacknowledged mode bearer 21 which does not have a sequence number yet.

Still other embodiments herein allow the source radio network node 18A to continue transmitting downlink data packets to the wireless device 16 on the source link 20-0 after commanding the device 16 to hand over, i.e., in a make-before-break fashion, but preserve the downlink data packet sequence number transmitter/receiver status even for the unacknowledged mode bearer 21. That is, some embodiments use the same downlink data packet sequence number transmitter/receiver status for the unacknowledged mode bearer 21 before and after the make-before-break handover 24. With such status preserved, the wireless device 16 and/or the target radio network node 18B may prevent and/or detect the occurrence of downlink data packets being sent to the wireless device 16 in duplicate from both the source radio network node 18A and the target radio network node 18B.

Figure 3:
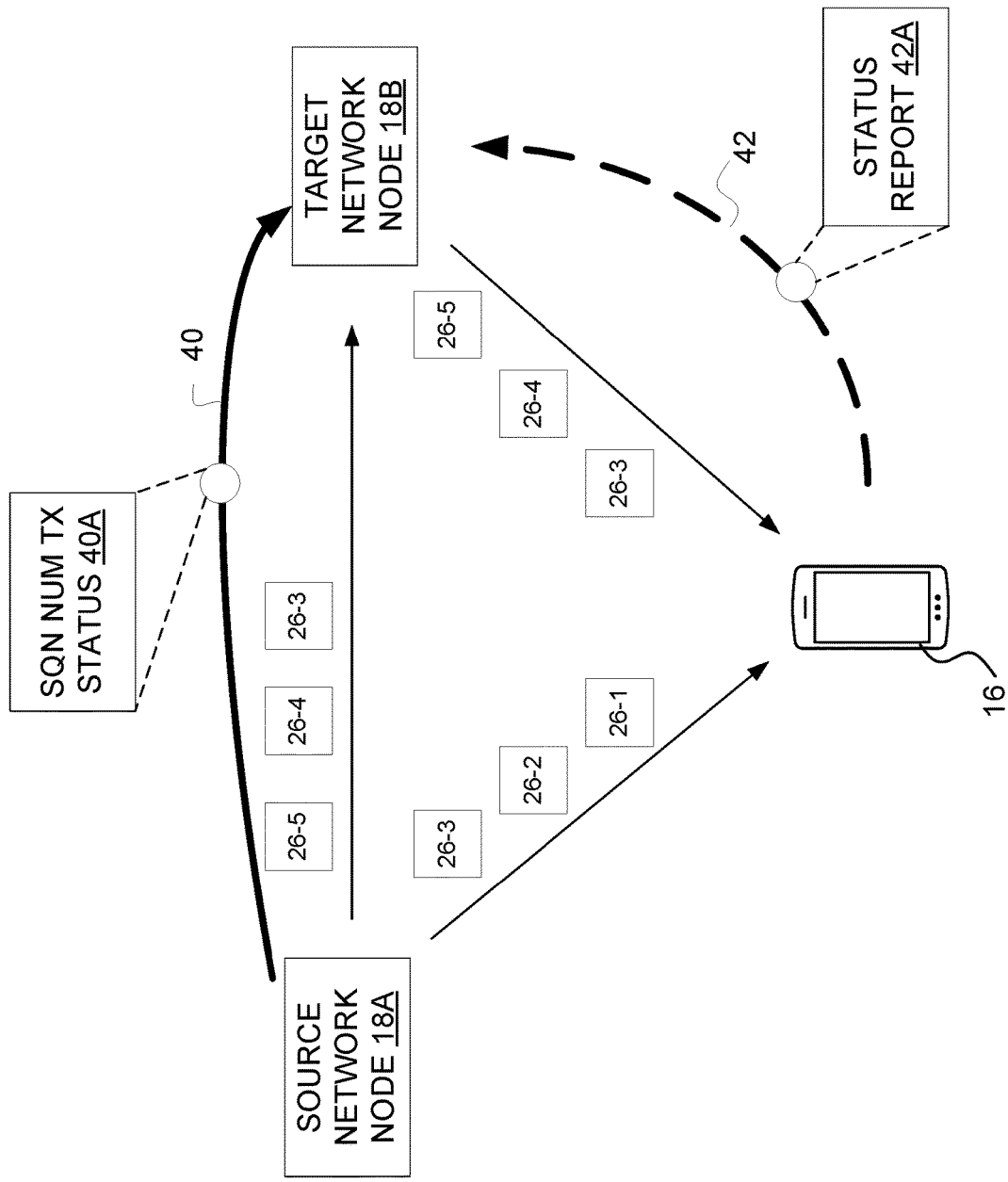
FIG. 3 is a block diagram of a wireless communication network according to yet other embodiments.

FIG. 3 illustrates additional details of these embodiments. As shown, the source radio network node 18A also continues to transmit downlink data packets 26 (shown as downlink data packets 26-1, 26-2, and 26-3) for the unacknowledged mode bearer 21 from the source link 20-1 to the wireless device 16 even after transmitting the handover command 22. In these embodiments, though, the source radio network node 18A transmits to the target radio network node 18 control signaling 40 indicating a downlink data packet sequence number transmitter status 40A (SQN NUM TX STATUS) at the source radio network node 18A for the unacknowledged mode bearer 21. The target radio network node 18B may then assign sequence numbers to new data packets for the unacknowledged mode bearer 21 based on this control signaling 40.

For example, in some embodiments, the downlink data packet sequence number transmitter status 40A may indicate a next sequence number that the target radio network node 18A shall assign to a new data packet for the unacknowledged mode bearer 21 which does not have a sequence number yet. In this case, the next sequence number may be a sequence number occurring next after a highest sequence number of downlink data packets transmitted by the source radio network node 18A to the wireless device 16 for the unacknowledged mode bearer 21. Accordingly, the target radio network node 18B may assign the indicated next sequence number to a new data packet for the unacknowledged mode bearer 21 which does not have a sequence number yet.

In some embodiments, the control signaling 40 may be included in a sequence number (SN) status transfer message. In this and other embodiments, the control signaling 40 may comprise at least a portion of a downlink (DL) COUNT field of the SN status transfer message. For example, the DL COUNT field may indicate a PDCP-SN and a Hyper frame number, in which case the control signaling 40 may comprise at least the PDCP-SN indicated by the DL COUNT field. Alternatively, the control signaling 40 may be transmitted within a generic tunneling protocol, GTP, extension header field of one or more data packets forwarded from the source radio network node 18A to the target radio network node 18B for the unacknowledged mode bearer 21.

Regardless, with the downlink data packet sequence number transmitter status indicated to the target radio network node 18B, the wireless device 16 may correspondingly preserve its downlink data packet sequence number receiver status for the unacknowledged mode bearer 21. That is, the wireless device 16 may use the same downlink data packet sequence number receiver status for the unacknowledged mode bearer 21 before and after the make-before-break handover 24. Moreover, in some embodiments, based on the downlink data packet sequence number receiver status as preserved, the wireless device 16 may monitor for data packets received in duplicate from the source link 20-0 and the target link 20-1 for the unacknowledged mode bearer 21.

As shown in FIG. 3, for example, the source radio network node 18A (unlike in FIG. 2) may transmit the same downlink data packet 26-3 to the wireless device 16 on the source link 20-0 and to the target radio network node 18B, e.g., for robust handover performance. With sequence numbering preserved before and after the handover 24, though, the wireless device 16 may advantageously detect that downlink data packet 26-3 is sent in duplicate and handle such duplication accordingly.

In some embodiments, the wireless device 16 may alternatively or additionally transmit to the target radio network node 18B control signaling 42. The control signaling 42 may indicate a sequence number occurring next after a highest sequence number of downlink data packets received by the wireless device 16 for the unacknowledged mode bearer 21. That is such control signaling 42 may be sent despite the unacknowledged mode nature of the bearer 21. FIG. 3 in this regard shows the control signaling 42 in the form of a status report 42A, e.g., a PDCP status report. In some embodiments, in fact, the control signaling 42 is more particularly a first missing SDU (FMS) field of a PDCP status report. Alternatively, the control signaling 42 may comprise a PDCP control PDU specific for RLC UM.

In any event, based on the indicated downlink data packet sequence number transmitter status 40A and the control signaling 42 received from the wireless device 16, the target radio network node 18B may monitor for which data packets received from the source radio network node 18A are duplicative of data packets that the control signaling 40A from the wireless device 16 indicates have already been received by the wireless device 16 for the unacknowledged mode bearer 21. The target radio network node 18B in some embodiments may then selectively transmit downlink data packets for the unacknowledged mode bearer 21 that are not determined to be duplicative according to such monitoring. For example, in such embodiments, the target radio network node 18B may refrain from transmitting downlink data packet 26-3 to the wireless device 16 to begin with (assuming the control signaling 42 was received prior to the radio network node 18B scheduling transmission of downlink data packet 26-3).

In view of the above, FIG. 4A depicts a method performed by a wireless device 16 in accordance with particular embodiments, e.g., such as those shown in FIG. 2. The method in some embodiments includes establishing an unacknowledged mode bearer 21 with a source link 20-0 (Block 400). The method may further include receiving a handover command 22 that commands the wireless device 16 to perform a make-before-break handover from the source link 20-0 to a target link 20-1 (Block 402) and performing the make-before-break handover from the source link 20-0 to the target link 20-1 (Block 404). The method as shown may also include after receiving the handover command 22, continuing to receive from the source link 20-0 downlink data packets for the unacknowledged mode bearer 21 (Block 406).

In some embodiments, the method may also include, responsive to the wireless device 16 establishing a connection with the target link 20-1 as part of the make-before-break handover or to the wireless device 16 receiving downlink data packets for the unacknowledged mode bearer 21 from the target link 20-1, stopping receiving downlink data packets for the unacknowledged mode bearer 21 from the source link 20-0 (Block 408). Alternatively or additionally, the method may include transmitting to the source radio network node 18A control signaling 28A (e.g., a handover complete indication) indicating that the wireless device 16 has established the connection with the target link 20-1 (Block 410). The control signaling 28A may be transmitted for instance responsive to the wireless device 16 establishing a connection with the target link 20-1 as part of the make-before-break handover or to the wireless device 16 receiving downlink data packets for the unacknowledged mode bearer 21 from the target link 20-1.

Regardless, the method may further include, after or as part of performing the make-before-break handover, resetting a downlink data packet sequence number receiver status for the unacknowledged mode bearer 21 (Block 412).

In some embodiments, the method may further comprise transmitting to the source radio network node control signaling indicating that the wireless device has established the connection with the target link. In one embodiment, the control signaling comprises a handover complete indication. Alternatively or additionally, said stopping may be performed responsive to transmitting the control signaling.

In some embodiments, the downlink data packet sequence number transmitter status is a downlink PDCP sequence number, SN, transmitter status that indicates a next PDCP SN that the target link shall assign to a new SDU which does not have a PDCP SN yet.

In some embodiments, said resetting comprises resetting a packet data convergence protocol, PDCP, COUNT for the unacknowledged mode bearer, where the PDCP COUNT comprises a hyper-frame number, HFN, and a PDCP sequence number.

In some embodiments, the unacknowledged mode bearer is a radio link control, RLC, unacknowledged mode, UM, bearer or a radio bearer that utilizes RLC UM.

In some embodiments, the downlink data packets are downlink packet data convergence protocol, PDCP, service data units, SDUs.

In some embodiments, said stopping is performed responsive to the wireless device receiving downlink data packets for the unacknowledged mode bearer from the target link. In other embodiments, said stopping is performed responsive to the wireless device establishing a connection with the target link as part of the make-before-break handover.

In some embodiments, Solution 1 described below from the perspective of a UE may be an example implementation of the method in FIG. 4A.

Figure 4B:
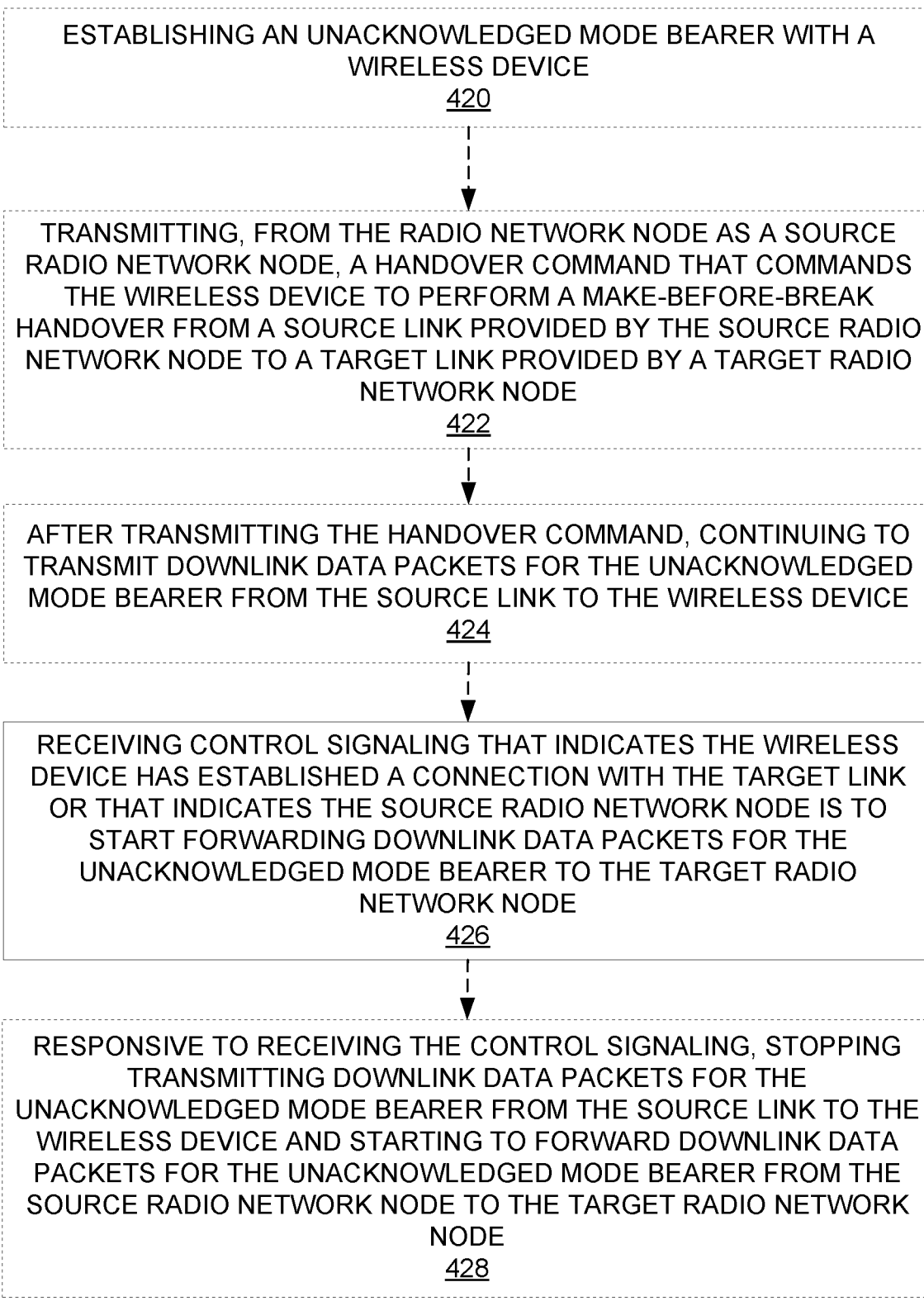
FIG. 4B is a logic flow diagram of a method performed by a radio network node according to some embodiments.

FIG. 4B depicts a method performed by a radio network node in accordance with other particular embodiments, e.g., such as those shown in FIG. 2. The method may include establishing an unacknowledged mode bearer 21 with a wireless device 16 (Block 420). The method may also include transmitting, from the radio network node as a source radio network node 18A, a handover command 22 that commands the wireless device 16 to perform a make-before-break handover from a source link 20-0 provided by the source radio network node 18A to a target link 20-1 provided by a target radio network node 18B (Block 422). The method may further include, after transmitting the handover command 22, continuing to transmit downlink data packets for the unacknowledged mode bearer 21 from the source link 20-0 to the wireless device 16 (Block 424).

The method in some embodiments also includes receiving control signaling 28A or 28B that indicates the wireless device 16 has established a connection with the target link 20-1 or that indicates the source radio network node 18A is to start forwarding downlink data packets for the unacknowledged mode bearer 21 to the target radio network node 18B (Block 426). For example, in some embodiments, the control signaling 28A (e.g., in the form of a handover complete indication from the wireless device 16) indicates the wireless device 16 has established a connection with the target link 20-1. Alternatively, the control signaling 28B (e.g., from the target radio network node 18B) indicates the source radio network node 18A is to start forwarding downlink data packets for the unacknowledged mode bearer 21 to the target radio network node 18B.

Regardless, the method may further include, responsive to receiving the control signaling 28A or 28B, stopping transmitting downlink data packets for the unacknowledged mode bearer 21 from the source link 20-0 to the wireless device 16 and starting to forward downlink data packets for the unacknowledged mode bearer 21 from the source radio network node 18A to the target radio network node 18B (Block 428). For example, this starting and stopping may be performed such that the source radio network node 18A avoids sending the same downlink data packet for the unacknowledged mode bearer 21 both to the wireless device 16 on the source link 20-0 and to the target radio network node 18B.

In some embodiments, the unacknowledged mode bearer is a radio link control, RLC, unacknowledged mode, UM, bearer or a radio bearer that utilizes RLC UM.

In some embodiments, the downlink data packets are downlink packet data convergence protocol, PDCP, service data units, SDUs.

In some embodiments, Solution 1 described below from the perspective of a source radio network node 18A (e.g., source eNB or source gNB) may be an example implementation of the method in FIG. 4B.

FIG. 4C depicts a method performed by a radio network node in accordance with other particular embodiments, e.g., such as those shown in FIG. 2. The method may include transmitting, from the radio network node as a target radio network node 18B, a handover command 22 to a source radio network node 18A that commands a wireless device 16 to perform a make-before-break handover from a source link 20-0 provided by the source radio network node 18A to a target link 20-1 provided by the target radio network node 18B (Block 430). The method may also include, after transmitting the handover command 22, transmitting, from the target radio network node 18B to the source radio network node 18A, control signaling 28B indicating that the source radio network node 18A is to start forwarding downlink data packets for the unacknowledged mode bearer 21 to the target radio network node 18B (Block 432). In some embodiments, the method further includes, responsive to transmitting the control signaling 28B, receiving downlink data packets for the unacknowledged mode bearer 21 forwarded from the source radio network node 18A (Block 434).

In some embodiments, the method also includes, after establishing a connection between the wireless device 16 and the target link 20-1 as part of the make-before-break handover, transmitting from the target link 20-1 to the wireless device 16 downlink data packets for the unacknowledged mode bearer 21 (Block 436). Alternatively or additionally, the method may include, after or as part of the make-before-break handover, resetting a downlink data downlink data packet sequence number receiver status for the unacknowledged mode bearer 21 (Block 438). For example, in some embodiments, the downlink data packet sequence number receiver status is a downlink PDCP sequence number, SN, receiver status that indicates a next PDCP SN that the target link shall assign to a new SDU which does not have a PDCP SN yet. In these and other embodiments, said resetting may comprise resetting a packet data convergence protocol, PDCP, COUNT for the unacknowledged mode bearer, where the PDCP COUNT comprises a hyper-frame number, HFN, and a PDCP sequence number. Alternatively or additionally, the method may further comprise, after said resetting, assigning a sequence number of zero to a first downlink data packet received for the unacknowledged mode bearer which does not have a sequence number yet.

In some embodiments, the unacknowledged mode bearer is a radio link control, RLC, unacknowledged mode, UM, bearer or a radio bearer that utilizes RLC UM.

In some embodiments, the downlink data packets are downlink packet data convergence protocol, PDCP, service data units, SDUs.

In some embodiments, Solution 1 described below from the perspective of a target radio network node 18B (e.g., target eNB or target gNB) may be an example implementation of the method in FIG. 4C.

FIG. 5A depicts a method performed by a wireless device 16 in accordance with other particular embodiments, e.g., such as those shown in FIG. 3. The method in some embodiments includes establishing an unacknowledged mode bearer 21 with a source link 20-0 (Block 500). The method may also include receiving a handover command 22 that commands the wireless device 16 to perform a make-before-break handover from the source link 20-0 to a target link 20-1 (Block 502) and performing the make-before-break handover from the source link 20-0 to the target link 20-1 (Block 504).

The method may further include, after receiving the handover command 22, continuing to receive from the source link 20-0 downlink data packets for the unacknowledged mode bearer 21, e.g., until after the wireless device 16 establishes a connection with the target link 20-1 as part of the make-before-break handover (Block 506). The method may also include, after the wireless device 16 establishes the connection with the target link 20-1, receiving from the target link 20-1 downlink data packets for the unacknowledged mode bearer 21 (where the unacknowledged mode bearer 21 for the target link 20-1 may correspond to the unacknowledged mode bearer 21 for the source link 20-0) (Block 508).

In some embodiments, the method includes preserving a downlink data packet sequence number receiver status at the wireless device 16 for the unacknowledged mode bearer 21, e.g., by using the same downlink data packet sequence number receiver status for the unacknowledged mode bearer 21 before and after the make-before-break handover (Block 510). For example, this may involve preserving a packet data convergence protocol, PDCP, COUNT for the unacknowledged mode bearer 21, wherein the PDCP COUNT comprises a hyper-frame number, HFN, and a PDCP sequence number.

In one or more embodiments, the method may further include, based on the downlink data packet sequence number receiver status as preserved, monitoring for data packets received in duplicate from the source link 20-0 and the target link 20-1 for the unacknowledged mode bearer 21 (Block 512).

Although not shown, the method in some embodiments may further include transmitting, to the target link 20-1, control signaling 42 that indicates a sequence number occurring next after a highest sequence number of downlink data packets received by the wireless device 16 for the unacknowledged mode bearer 21.

In some embodiments, the downlink data packets are downlink packet data convergence protocol, PDCP, service data units, SDUs.

In some embodiments, the downlink data packet sequence number receiver status is a downlink PDCP sequence number, SN, receiver status that indicates a next PDCP SN that the target link shall assign to a new SDU which does not have a PDCP SN yet.

In some embodiments, said preserving comprises preserving a packet data convergence protocol, PDCP, COUNT for the unacknowledged mode bearer, wherein the PDCP COUNT comprises a hyper-frame number, HFN, and a PDCP sequence number. In other embodiments, a packet data convergence protocol, PDCP, COUNT comprises a hyper-frame number, HFN, and a PDCP sequence number, and said preserving comprises preserving at least the PDCP sequence number of the PDCP COUNT for the unacknowledged mode bearer. In this latter case, the method may further comprise resetting to zero the HFN of the PDCP COUNT for the unacknowledged mode bearer.

In some embodiments, the unacknowledged mode bearer is a radio link control, RLC, unacknowledged mode, UM, bearer or a radio bearer that utilizes RLC UM.

In some embodiments, the method further comprises transmitting, to the target link, control signaling that indicates a sequence number occurring next after a highest sequence number of downlink data packets received by the wireless device for the unacknowledged mode bearer. In one such embodiment, the control signaling does not indicate which sequence numbers below the indicated sequence number are missing at the wireless device for the unacknowledged mode bearer. Alternatively or additionally, the control signaling comprises a first missing SDU, FMS, field of a PDCP status report. Or, in other embodiments, the control signaling comprises a PDCP control protocol data unit, PDU, specific for RLC UM.

In some embodiments, Solution 2 described below from the perspective of a UE may be an example implementation of the method in FIG. 5A.

Figure 5B:
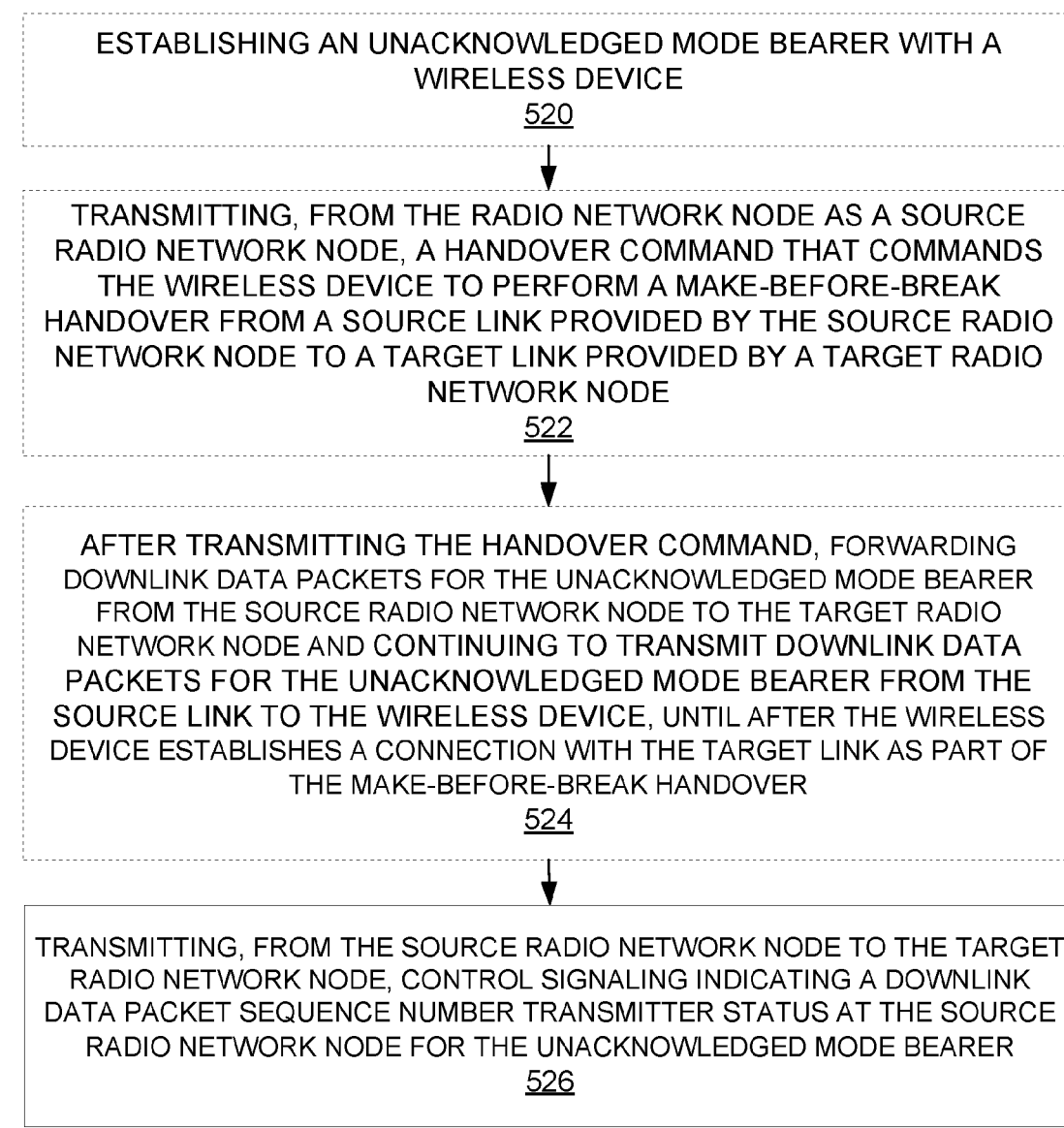
FIG. 5B is a logic flow diagram of a method performed by a radio network node according to other embodiments.

FIG. 5B depicts a method performed by a radio network node in accordance with still other particular embodiments, e.g., such as those shown in FIG. 3. The method may include establishing an unacknowledged mode bearer 21 with a wireless device 16 (Block 520). The method may also include transmitting, from the radio network node as a source radio network node 18A, a handover command 22 that commands the wireless device 16 to perform a make-before-break handover from a source link 20-0 provided by the source radio network node 18A to a target link 20-1 provided by a target radio network node 18B (Block 522). The method may further include, after transmitting the handover command 22: (i) forwarding downlink data packets for the unacknowledged mode bearer 21 from the source radio network node 18A to the target radio network node 18B; and (ii) continuing to transmit downlink data packets for the unacknowledged mode bearer 21 from the source link 20-0 to the wireless device 16, until after the wireless device 16 establishes a connection with the target link 20-1 as part of the make-before-break handover (Block 524).

The method in some embodiments also includes transmitting, from the source radio network node 18A to the target radio network node 18B, control signaling 40 indicating a downlink data packet sequence number transmitter status at the source radio network node 18A for the unacknowledged mode bearer 21 (Block 526). For example, in some embodiments, the control signaling 40 is included in a sequence number, SN, status transfer message. In this case, the control signaling in some embodiments comprises at least a portion of a downlink, DL, COUNT field of the SN status transfer message, e.g., the PDCP-SN indicated by the DL COUNT field. Note that, in some embodiments where the downlink data packets are downlink packet data convergence protocol, PDCP, service data units, SDUs, the downlink data packet sequence number transmitter status is a downlink PDCP sequence number, SN, transmitter status that indicates a next PDCP SN that the target link 20-1 shall assign to a new SDU which does not have a PDCP SN yet.

In some embodiments, the downlink data packet sequence number transmitter status indicates a next sequence number that the target radio network node shall assign to a new data packet for the unacknowledged mode bearer which does not have a sequence number yet. In one such embodiment, the next sequence number is a sequence number occurring next after a highest sequence number of downlink data packets transmitted by the source radio network node to the wireless device for the unacknowledged mode bearer.

In some embodiments, the downlink data packet sequence number transmitter status indicates a hyper frame number that the target radio network node shall assign to a new data packet for the unacknowledged mode bearer which does not have a sequence number yet, wherein the hyper frame number is zero.

In some embodiments, transmitting the control signaling comprises transmitting the control signaling within a generic tunneling protocol, GTP, extension header field of one or more data packets forwarded from the source radio network node to the target radio network node for the unacknowledged mode bearer.

In some embodiments, a packet data convergence protocol, PDCP, COUNT comprises a hyper-frame number, HFN, and a PDCP sequence number, and where said downlink data packet sequence number transmitter status comprises at least the PDCP sequence number of the PDCP COUNT for the unacknowledged mode bearer.

In some embodiments, the unacknowledged mode bearer is a radio link control, RLC, unacknowledged mode, UM, bearer or a radio bearer that utilizes RLC UM.

In some embodiments, Solution 2 described below from the perspective of a source radio network node 18A (e.g., source eNB or source gNB) may be an example implementation of the method in FIG. 5B.

FIG. 5C depicts a method performed by a radio network node in accordance with other particular embodiments, e.g., such as those shown in FIG. 3. The method may include transmitting, from the radio network node as a target radio network node 18B, a handover command 22 to a source radio network node 18A that commands a wireless device 16 to perform a make-before-break handover from a source link 20-0 provided by the source radio network node 18A to a target link 20-1 provided by the target radio network node 18B (Block 530). The method may also include, after transmitting the handover command 22, receiving downlink data packets for the unacknowledged mode bearer 21 forwarded from the source radio network node 18A (Block 532). In some embodiments, the method further includes, after establishing a connection between the wireless device 16 and the target link 20-1 as part of the make-before-break handover, transmitting from the target link 20-1 to the wireless device 16 downlink data packets for the unacknowledged mode bearer 21 (Block 534).

In some embodiments, the method also includes, receiving, from the source radio network node 18A, control signaling 40 indicating a downlink data packet sequence number transmitter status 40A at the source radio network node 18A for the unacknowledged mode bearer 21 (Block 536). For example, in some embodiments, the control signaling 40 is included in a sequence number, SN, status transfer message. In this case, the control signaling 40 in some embodiments comprises at least a portion of a downlink, DL, COUNT field of the SN status transfer message, e.g., the PDCP-SN indicated by the DL COUNT field. Note that, in some embodiments where the downlink data packets are downlink packet data convergence protocol, PDCP, service data units, SDUs, the downlink data packet sequence number transmitter status is a downlink PDCP sequence number, SN, transmitter status that indicates a next PDCP SN that the target link 20-1 shall assign to a new SDU which does not have a PDCP SN yet.

Although not shown, the method in some embodiments may also include assigning the indicated next sequence number to a new data packet for the unacknowledged mode bearer 21 which does not have a sequence number yet.

Regardless, the method may further include, receiving, from the wireless device 16, control signaling 42 that indicates a sequence number occurring next after a highest sequence number of downlink data packets received by the wireless device 16 for the unacknowledged mode bearer 21 (Block 538). In some embodiments, for example, the control signaling from the wireless device does not indicate which sequence numbers below the indicated sequence number are missing at the wireless device for the unacknowledged mode bearer. In one embodiment, the control signaling from the wireless device comprises a first missing SDU, FMS, field of a PDCP status report. In another embodiment, the control signaling from the wireless device comprises a PDCP control protocol data unit, PDU, specific for RLC UM. Regardless, in some embodiments, the method in this case may also include, based on the indicated downlink data packet sequence number receiver status and the control signaling 42 received from the wireless device 16, monitoring for which data packets received from the source radio network node 18A are duplicative of data packets that the control signaling from the wireless device 16 indicates have already been received by the wireless device 16 for the unacknowledged mode bearer 21 (Block 540). In this case, then, transmitting from the target link 20-1 to the wireless device 16 downlink data packets for the unacknowledged mode bearer 21 may comprise selectively transmitting downlink data packets for the unacknowledged mode bearer 21 that are not determined to be duplicative according to such monitoring.

In some embodiments, the downlink data packet sequence number transmitter status indicates a next sequence number that the target radio network node shall assign to a new data packet for the unacknowledged mode bearer which does not have a sequence number yet. In one such embodiment, the next sequence number is a sequence number occurring next after a highest sequence number of downlink data packets transmitted by the source radio network node to the wireless device for the unacknowledged mode bearer.

In some embodiments, the downlink data packet sequence number transmitter status indicates a hyper frame number that the target radio network node shall assign to a new data packet for the unacknowledged mode bearer which does not have a sequence number yet, wherein the hyper frame number is zero. In one such embodiment, the DL COUNT field indicates a PDCP-SN and a Hyper frame number, and wherein the control signaling comprises the PDCP-SN indicated by the DL COUNT field.

In some embodiments, receiving the control signaling comprises receiving the control signaling within a generic tunneling protocol, GTP, extension header field of one or more data packets forwarded from the source radio network node to the target radio network node for the unacknowledged mode bearer.

In some embodiments, the downlink data packets are downlink packet data convergence protocol, PDCP, service data units, SDUs.

In some embodiments, a packet data convergence protocol, PDCP, COUNT comprises a hyper-frame number, HFN, and a PDCP sequence number, and wherein said downlink data packet sequence number transmitter status comprises at least the PDCP sequence number of the PDCP COUNT for the unacknowledged mode bearer.

In some embodiments, the unacknowledged mode bearer is a radio link control, RLC, unacknowledged mode, UM, bearer or a radio bearer that utilizes RLC UM.

In some embodiments, Solution 2 described below from the perspective of a target radio network node 18B (e.g., target eNB or target gNB) may be an example implementation of the method in FIG. 5C.

Figure 6A:
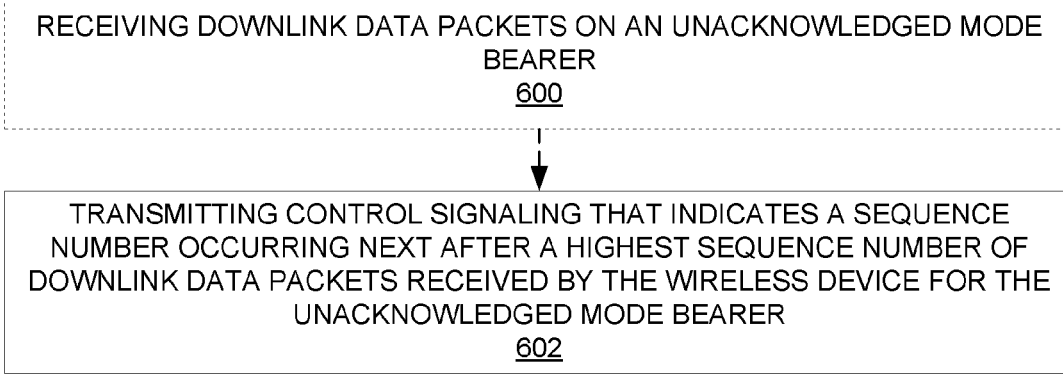
FIG. 6A is a logic flow diagram of a method performed by a wireless device according to still other embodiments.

FIG. 6A depicts a method performed by a wireless device 16 in accordance with still other particular embodiments. The method in some embodiments receiving downlink data packets on an unacknowledged mode bearer 21 (Block 600). The method may also include transmitting control signaling 42 that indicates a sequence number occurring next after a highest sequence number of downlink data packets received by the wireless device 16 for the unacknowledged mode bearer 21 (Block 602).

In some embodiments, the downlink data packets are downlink packet data convergence protocol, PDCP, service data units, SDUs.

In some embodiments, the unacknowledged mode bearer is a radio link control, RLC, unacknowledged mode, UM, bearer or a radio bearer that utilizes RLC UM.

In some embodiments, the control signaling does not indicate which sequence numbers below the indicated sequence number are missing at the wireless device for the unacknowledged mode bearer.

In some embodiments, the control signaling comprises a first missing SDU, FMS, field of a PDCP status report. In other embodiments, the control signaling comprises a PDCP control protocol data unit, PDU, specific for RLC UM.

FIG. 6B depicts a method performed by a radio network node in accordance with other particular embodiments. The method may include transmitting, from the radio network node as a target radio network node 18B, a handover command 22 to a source radio network node 18A that commands a wireless device 16 to perform a make-before-break handover from a source link 20-0 provided by the source radio network node 18A to a target link 20-1 provided by the target radio network node 18B (Block 620). The method may also include, after transmitting the handover command 22, receiving downlink data packets for the unacknowledged mode bearer 21 forwarded from the source radio network node 18A (Block 622). In some embodiments, the method further includes, after establishing a connection between the wireless device 16 and the target link 20-1 as part of the make-before-break handover, transmitting from the target link 20-1 to the wireless device 16 downlink data packets for the unacknowledged mode bearer 21 (Block 624).

In some embodiments, the method also includes receiving, from the wireless device 16, control signaling 42 that indicates a sequence number occurring next after a highest sequence number of downlink data packets received by the wireless device 16 for the unacknowledged mode bearer 21 (Block 626). In some embodiment, the control signaling from the wireless device does not indicate which sequence numbers below the indicated sequence number are missing at the wireless device for the unacknowledged mode bearer.

In one embodiment, for example, the control signaling from the wireless device comprises a first missing SDU, FMS, field of a PDCP status report. In another embodiment, the control signaling from the wireless device comprises a PDCP control protocol data unit, PDU, specific for RLC UM. Regardless, in some embodiments, the method in this case may also include, based on the indicated downlink data packet sequence number receiver status and the control signaling received from the wireless device 16, monitoring for which data packets received from the source radio network node 18A are duplicative of data packets that the control signaling from the wireless device 16 indicates have already been received by the wireless device 16 for the unacknowledged mode bearer 21 (Block 628). In this case, then, transmitting from the target link 20-1 to the wireless device 16 downlink data packets for the unacknowledged mode bearer 21 may comprise selectively transmitting downlink data packets for the unacknowledged mode bearer 21 that are not determined to be duplicative according to such monitoring.

In some embodiments, the method further comprises receiving, from the source radio network node, control signaling indicating a downlink data packet sequence number transmitter status at the source radio network node for the unacknowledged mode bearer. In one such embodiment, the downlink data packet sequence number transmitter status indicates a next sequence number that the target radio network node shall assign to a new data packet for the unacknowledged mode bearer which does not have a sequence number yet. For example, the next sequence number may be a sequence number occurring next after a highest sequence number of downlink data packets transmitted by the source radio network node to the wireless device for the unacknowledged mode bearer. In some embodiments, the method further comprises assigning the indicated next sequence number to a new data packet for the unacknowledged mode bearer which does not have a sequence number yet.

In some embodiments, the downlink data packet sequence number transmitter status indicates a hyper frame number that the target radio network node shall assign to a new data packet for the unacknowledged mode bearer which does not have a sequence number yet, wherein the hyper frame number is zero.

In some embodiments, the control signaling from the source radio network node is included in a sequence number, SN, status transfer message. In one such embodiment, the control signaling from the source radio network node comprises at least a portion of a downlink, DL, COUNT field of the SN status transfer message. For example, the DL COUNT field may indicate a PDCP-SN and a Hyper frame number, and the control signaling from the source radio network node may comprise the PDCP-SN indicated by the DL COUNT field.

In some embodiments, receiving the control signaling from the source radio network node comprises receiving the control signaling from the source radio network node within a generic tunneling protocol, GTP, extension header field of one or more data packets forwarded from the source radio network node to the target radio network node for the unacknowledged mode bearer.

In some embodiments, the downlink data packets are downlink packet data convergence protocol, PDCP, service data units, SDUs, and where the downlink data packet sequence number transmitter status is a downlink PDCP sequence number, SN, transmitter status that indicates a next PDCP SN that the target link shall assign to a new SDU which does not have a PDCP SN yet.

In some embodiments, a packet data convergence protocol, PDCP, COUNT comprises a hyper-frame number, HFN, and a PDCP sequence number, and said downlink data packet sequence number transmitter status comprises at least the PDCP sequence number of the PDCP COUNT for the unacknowledged mode bearer.

In some embodiments, the downlink data packets are downlink packet data convergence protocol, PDCP, service data units, SDUs.

In some embodiments, the unacknowledged mode bearer is a radio link control, RLC, unacknowledged mode, UM, bearer or a radio bearer that utilizes RLC UM.

Although not shown embodiments herein also include a method performed by a wireless device. The method comprises establishing an unacknowledged mode bearer with a source link. The method further comprises receiving a handover command that commands the wireless device to perform a make-before-break handover from the source link to a target link, and performing the make-before-break handover from the source link to the target link. The method further comprises, after receiving the handover command, continuing to receive from the source link downlink data packets for the unacknowledged mode bearer. The method may also comprise, responsive to the wireless device establishing a connection with the target link as part of the make-before-break handover or to the wireless device receiving downlink data packets for the unacknowledged mode bearer from the target link, transmitting to the source radio network node control signaling indicating that the wireless device has established the connection with the target link.

In some embodiments, the method further comprises, responsive to the wireless device establishing a connection with the target link as part of the make-before-break handover or to the wireless device receiving downlink data packets for the unacknowledged mode bearer from the target link, stopping receiving downlink data packets for the unacknowledged mode bearer from the source link. Alternatively or additionally, the method may further comprise, after or as part of performing the make-before-break handover, resetting a downlink data packet sequence number receiver status for the unacknowledged mode bearer.

In some embodiments, the control signaling comprises a handover complete indication.

Embodiments also include a wireless device comprising processing circuitry and power supply circuitry. The processing circuitry is configured to perform any of the steps of any of the embodiments described above for the wireless device. The power supply circuitry is configured to supply power to the wireless device.

Embodiments further include a wireless device comprising processing circuitry. The processing circuitry is configured to perform any of the steps of any of the embodiments described above for the wireless device. In some embodiments, the wireless device further comprises communication circuitry.

Embodiments further include a wireless device comprising processing circuitry and memory. The memory contains instructions executable by the processing circuitry whereby the wireless device is configured to perform any of the steps of any of the embodiments described above for the wireless device.

Embodiments moreover include a user equipment (UE). The UE comprises an antenna configured to send and receive wireless signals. The UE also comprises radio frontend circuitry connected to the antenna and to processing circuitry, and configured to condition signals communicated between the antenna and the processing circuitry. The processing circuitry is configured to perform any of the steps of any of the embodiments described above for the wireless device. In some embodiments, the UE also comprises an input interface connected to the processing circuitry and configured to allow input of information into the UE to be processed by the processing circuitry. The UE may comprise an output interface connected to the processing circuitry and configured to output information from the UE that has been processed by the processing circuitry. The UE may also comprise a battery connected to the processing circuitry and configured to supply power to the UE.

Embodiments herein also include a radio network node configured to perform any of the steps of any of the embodiments described above for the radio network node.

Embodiments also include a radio network node comprising processing circuitry and power supply circuitry. The processing circuitry is configured to perform any of the steps of any of the embodiments described above for the radio network node. The power supply circuitry is configured to supply power to the radio network node.

Embodiments further include a radio network node comprising processing circuitry. The processing circuitry is configured to perform any of the steps of any of the embodiments described above for the radio network node. In some embodiments, the radio network node further comprises communication circuitry.

Embodiments further include a radio network node comprising processing circuitry and memory. The memory contains instructions executable by the processing circuitry whereby the radio network node is configured to perform any of the steps of any of the embodiments described above for the radio network node.

More particularly, the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 7:
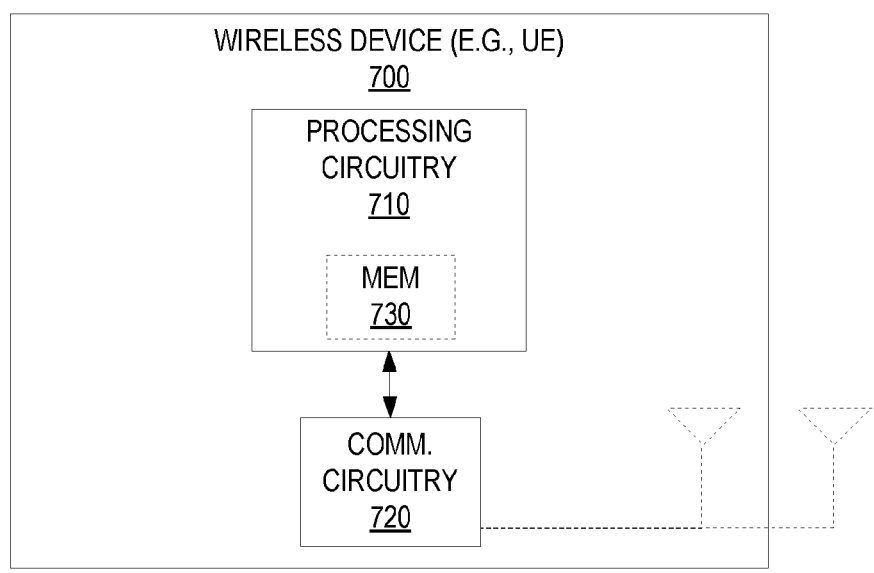
FIG. 7 is a block diagram of a wireless device according to some embodiments.

FIG. 7 for example illustrates a wireless device 700 (e.g., wireless device 16) as implemented in accordance with one or more embodiments. As shown, the wireless device 700 includes processing circuitry 710 and communication circuitry 720. The communication circuitry 720 (e.g., radio circuitry) is configured to transmit and/or receive information to and/or from one or more other nodes, e.g., via any communication technology. Such communication may occur via one or more antennas that are either internal or external to the wireless device 700. The processing circuitry 710 is configured to perform processing described above, e.g., in FIGS. 4A, 5A, and/or 6A such as by executing instructions stored in memory 730. The processing circuitry 710 in this regard may implement certain functional means, units, or modules.

Figure 8:
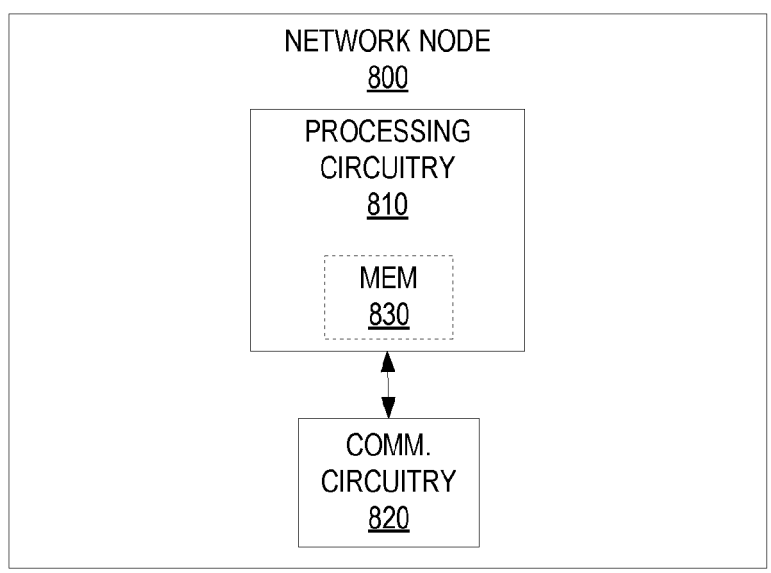
FIG. 8 is a block diagram of a network node according to some embodiments.

FIG. 8 illustrates a network node 800 (e.g., source radio network node 18A or target radio network node 18B) as implemented in accordance with one or more embodiments. As shown, the network node 800 includes processing circuitry 810 and communication circuitry 820. The communication circuitry 820 is configured to transmit and/or receive information to and/or from one or more other nodes, e.g., via any communication technology. The processing circuitry 810 is configured to perform processing described above, e.g., in FIGS. 4B, 4C, 5B, 5C, and/or 6B such as by executing instructions stored in memory 830. The processing circuitry 810 in this regard may implement certain functional means, units, or modules.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

Figure 9:
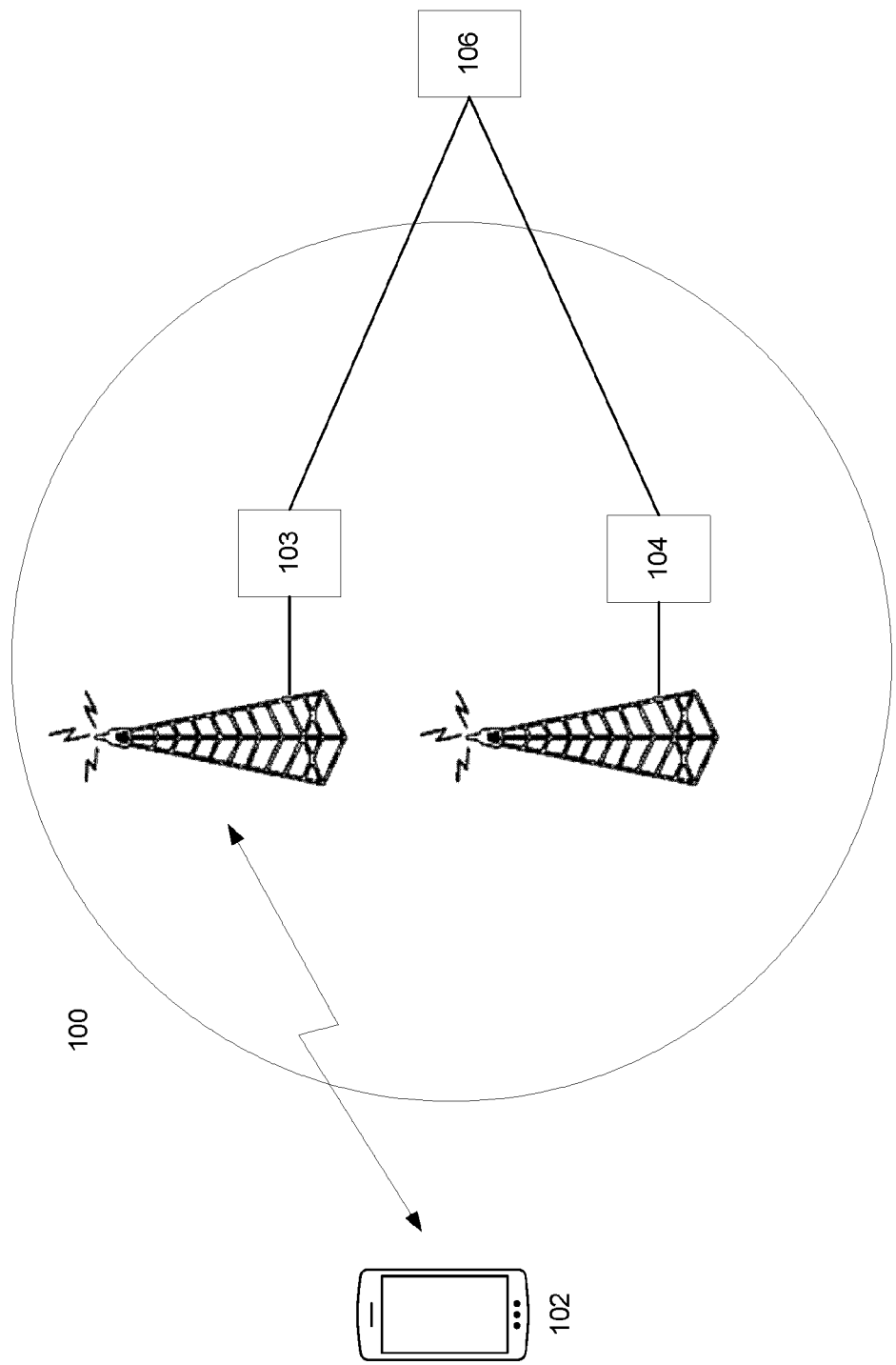
FIG. 9 is a block diagram of a simplified wireless communication system.

Consider the simplified wireless communication system illustrated in FIG. 9, with a UE 102, which communicates with one or multiple access nodes 103-104, which in turn is connected to a network node 106. The access nodes 103-104 are part of the radio access network 100.

For wireless communication systems pursuant to 3GPP Evolved Packet System, EPS (also referred to as Long Term Evolution, LTE, or 4G) standard specifications, such as specified in 3GPP TS 36.300 v. 15.3.0 and related specifications, the access nodes 103-104 each correspond typically to an Evolved NodeB (eNB) and the network node 106 corresponds typically to either a Mobility Management Entity (MME) and/or a Serving Gateway (SGW). The eNB is part of the radio access network 100, which in this case is the E-UTRAN (Evolved Universal Terrestrial Radio Access Network), while the MME and SGW are both part of the EPC (Evolved Packet Core network). The eNBs are interconnected via the X2 interface, and connected to the Evolved Packet Core (EPC) via the S1 interface, more specifically via S1-C to the MME and S1-U to the SGW.

For wireless communication systems pursuant to 3GPP 5G System, 5GS (also referred to as New Radio, NR, or 5G) standard specifications, such as specified in 3GPP TS 38.300 v.16.3.1 and related specifications, on the other hand, the access nodes 103-104 each correspond typically to an 5G NodeB (gNB) and the network node 106 corresponds typically to either a Access and Mobility Management Function (AMF) and/or a User Plane Function (UPF). The gNB is part of the radio access network 100, which in this case is the NG-RAN (Next Generation Radio Access Network), while the AMF and UPF are both part of the 5G Core Network (5GC). The gNBs are inter-connected via the Xn interface, and connected to 5GC via the NG interface, more specifically via NG-C to the AMF and NG-U to the UPF.

To support fast mobility between NR and LTE and avoid a change of core network, LTE eNBs can also be connected to the 5G-CN via NG-U/NG-C and support the Xn interface. An eNB connected to 5GC is called a next generation eNB (ng-eNB) and is considered part of the NG-RAN. LTE connected to 5GC will not be discussed further; however, it should be noted that most of the solutions/features described for LTE and NR herein also apply to LTE connected to 5GC. Accordingly, when the term LTE is used herein without further specification it refers to LTE-EPC.

A UE in RRC_CONNECTED state can be configured by the network to perform measurements of serving and neighbor cells and based on the measurement reports sent by the UE, the network may decide to perform a handover of the UE to a neighbor cell. The network then sends a Handover command 22 message to the UE (in LTE an RRCConnectionReconfiguration message with a field called mobilityControlInfo and in NR an RRCReconfiguration message with a reconfigurationWithSync field).

The reconfiguration of the UE is prepared by the target access node upon a request from the source access node (Handover Request message sent over X2 interface in case of LTE or Xn interface in case of NR) and takes into account the existing RRC configuration the UE has in the source cell (which is provided to the target access node in the Handover Request message). The reconfiguration parameters provided by the target access node (such as a target eNB/gNB), contain, for example, information needed by the UE to access the target cell, e.g., random access configuration, a new Cell Radio Network Temporary Identity (C-RNTI) assigned by the target access node and security parameters enabling the UE to calculate new security keys associated to the target cell so that the UE can send a Handover Complete message on signal radio bearer 1 (SRB1) (encrypted and integrity protected based on the new security keys) upon accessing the target access node.

Figure 10:
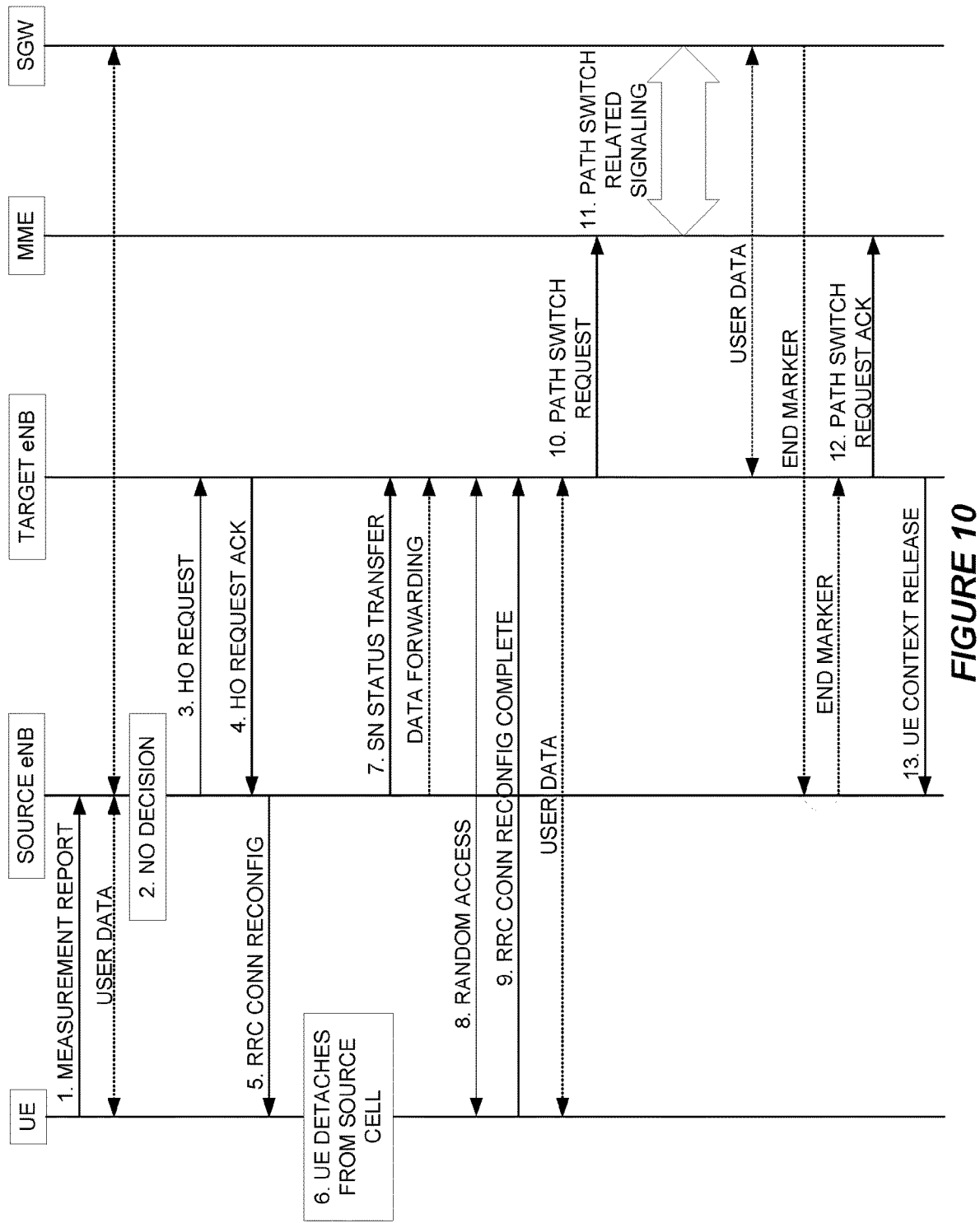
FIG. 10 is a signaling flow diagram during a handover procedure.

FIG. 10 summarizes the signalling flow between UE, source access node 103 (also known as source eNB or source cell) and target access node 104 (also known as target eNB or target cell) during a handover procedure, using LTE as an example.

For those bearers for which PDCP status preservation applies (i.e. for RLC AM), the "SN status transfer" message (step 7) provides the PDCP Hyper Frame Number (HFN) and PDCP Sequence Number (SN) which the target access node should assign to the first packet with no sequence number yet assigned that it must deliver. This first packet can either be one received from the gateway (i.e. from the SGW via S1-U in case of LTE or from the UPF via NG-U in case of NR) or one received from the source access node (via X2 in case of LTE or Xn in case of NR) if data forwarding is used (see below). When it sends the "SN status transfer" message, the source access node freezes its transmitter/receiver status—i.e. it stops assigning PDCP SNs to downlink packets and stops delivering uplink packets to the gateway.

Handovers can be categorized according to their resilience to packet loss in two different modes: (i) the handover is "seamless" if it minimizes the interruption time during the move of the UE, or; (ii) "lossless" if it tolerates no loss of packets at all.

These two modes use data forwarding of user plane downlink (DL) packets between the source access node and the target access node. The source access node may decide to operate one of these two modes on a per-bearer basis, based on the quality of service (QoS) received for this bearer and the service in question. These two modes are described in more detail below. Seamless handover is applicable to both RLC AM and RLC UM bearers while lossless handover is only applicable to RLC AM bearers.

If, for a given bearer, the source access node selects the seamless handover mode, it proposes to the target access node in the "Handover Request" message to establish a GTP tunnel to operate the downlink data forwarding. If the target access node accepts, it indicates in the "Handover Request Ack" message the tunnel endpoint where the forwarded data is expected to be received. This tunnel endpoint may be different from the one set up as the termination point of the new tunnel established with the gateway (i.e. the S1-U/NG-U tunnel endpoint).

Upon reception of the "Handover Request Ack" message, the source access node can start forwarding the data arriving from the gateway towards the indicated tunnel endpoint in parallel with sending the handover trigger to the UE over the radio interface. This forwarded data is thus available at the target access node to be delivered to the UE as early as possible.

When data forwarding is in operation and in-sequence delivery of packets is required, the target access node is assumed to deliver the packets to the UE in a given order. The packets received from the source access node (i.e. the packets forwarded over X2/Xn) are delivered before packets received from the gateway once the path switch has been performed (i.e. the packets received over the target S1-U/NG-U path). The end of the data forwarding is signaled to the target access node over X2/Xn by the reception of some special "end-marker" packets which the gateway has inserted over the source path just before switching this path; these are then forwarded by the source access node to the target access node like any other regular packets.

If the source access node selects the lossless mode for a given bearer, it will additionally forward to the target access node those user plane downlink packets which it has PDCP processed but are still buffered locally because they have not yet been delivered and acknowledged by the UE. These packets are forwarded together with their assigned PDCP SN included in a GTP extension header field. They are sent to the target access node prior to the freshly arriving packets received from the gateway. The same mechanisms described above for the seamless handover are used for the GTP tunnel establishment. The end of forwarding is also handled in the same way, since in-sequence packet delivery also applies to lossless handovers. In addition, the target access node must ensure that all the packets—including the ones received with sequence number from the source access node—are delivered in sequence at the target side.

An additional feature of lossless handover is so-called selective re-transmission. In some cases it may happen that a PDCP SDU has been successfully received, but a corresponding RLC acknowledgement has not. In this case, after the handover, there may be unnecessary retransmissions initiated by the UE or the target access node based on the incorrect status received from the RLC layer. In order to avoid these unnecessary retransmissions a PDCP status report can be sent from the access node to the UE and from the UE to the access node. Whether to send a PDCP status report after handover is configured independently for each radio bearer and for each direction.

The PDCP status report contains a bitmap indicating which PDCP SDUs need to be retransmitted and a reference SN, the First Missing SDU (FMS) See FIG. 11 below which shows a PDCP status report in LTE using a 12 bit SN. In the case that all PDCP SDUs have been received in sequence, this field indicates the next expected SN and no bitmap is included (for details of the PDCP status report, see 3GPP TS 36.323 v. 15.1.0 for LTE and TS 38.323 v. 15.3.0 for NR).

During handover there is a short interruption (~50 ms) in data transmission from the time the UE executes the handover command and disconnects from the source cell until it has connected to the target cell (i.e. between steps 5 and 9 in FIG. 10). For traditional applications like mobile broadband and voice this interruption is tolerable. However there are new use cases emerging with more stringent latency requirements (e.g. aerial, industrial automation, industrial control) where even a short interruption is unacceptable.

Figure 12:
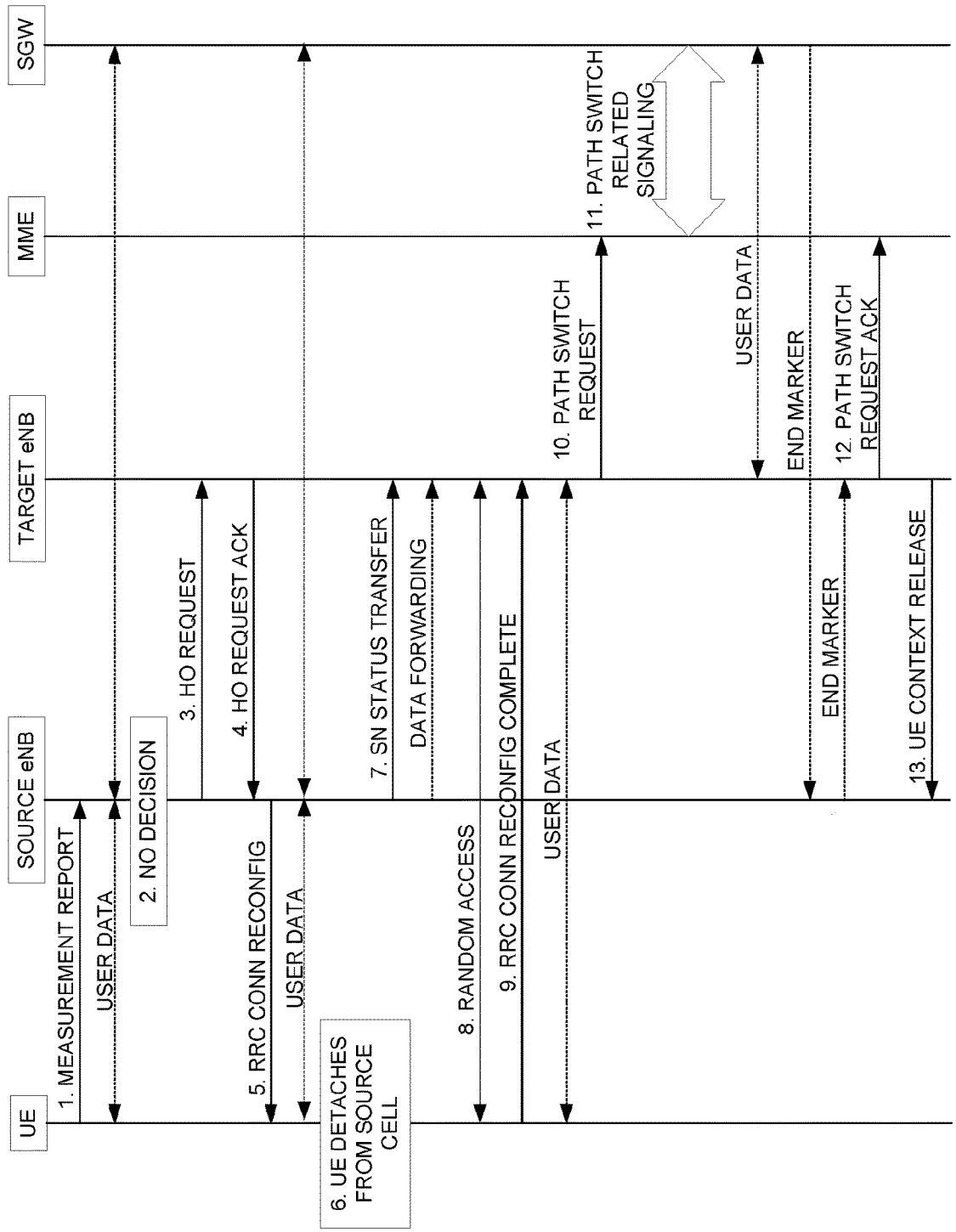
FIG. 12 is a signaling flow diagram during a make-before-break handover procedure.

To address these new use cases, Make-Before-Break (MBB) was introduced in LTE Rel-14. See FIG. 12. In MBB, the handover interruption is reduced by letting the UE keep the connection to source cell until it has initiated the handover to the target cell. This contrasts with the regular handover where the UE releases the connection to the source cell immediately when it receives the handover command (see step 6 in FIG. 10).

MBB as specified in LTE Rel-14 (3GPP TS 36.300 v. 15.3.0 and TS 36.331) has some known limitations. First, it is designed for UEs with a single radio frequency (RF) transmission/reception chain which means that is limited to intra-frequency handovers. Second, due to the difficulties of simultaneous transmission in two cells, especially with single Tx chain, the connection to the source access node is only maintained until the UE executes the initial uplink transmission in the target access node, i.e. the UE releases the connection to the source access node before the connection to the target access node is ready for packet transmission/reception (see step 6 in FIG. 12). Third, there is no clear mechanism defined for how long the source access node will continue to transmit DL data to the UE during HO execution. The source access node is informed that the UE has completed the handover when it receives the end marker from the gateway. However, this indication comes rather late and the source access node may want to stop transmit DL data to the UE before that.

To address these shortcomings of Rel-14 MBB and achieve ~0 ms interruption time, an enhanced version of Make-Before-Break (eMBB) may be introduced for Rel-16 both for LTE and NR. In this enhanced version, it is assumed that the UE is capable of simultaneously transmitting and receiving from the source and target cells. In practice, this may require that the UE is equipped with dual Tx/Rx chains. The dual Tx/Rx chains potentially also allows eMBB to be supported in other handover scenarios such as inter-frequency handover.

Figure 13:
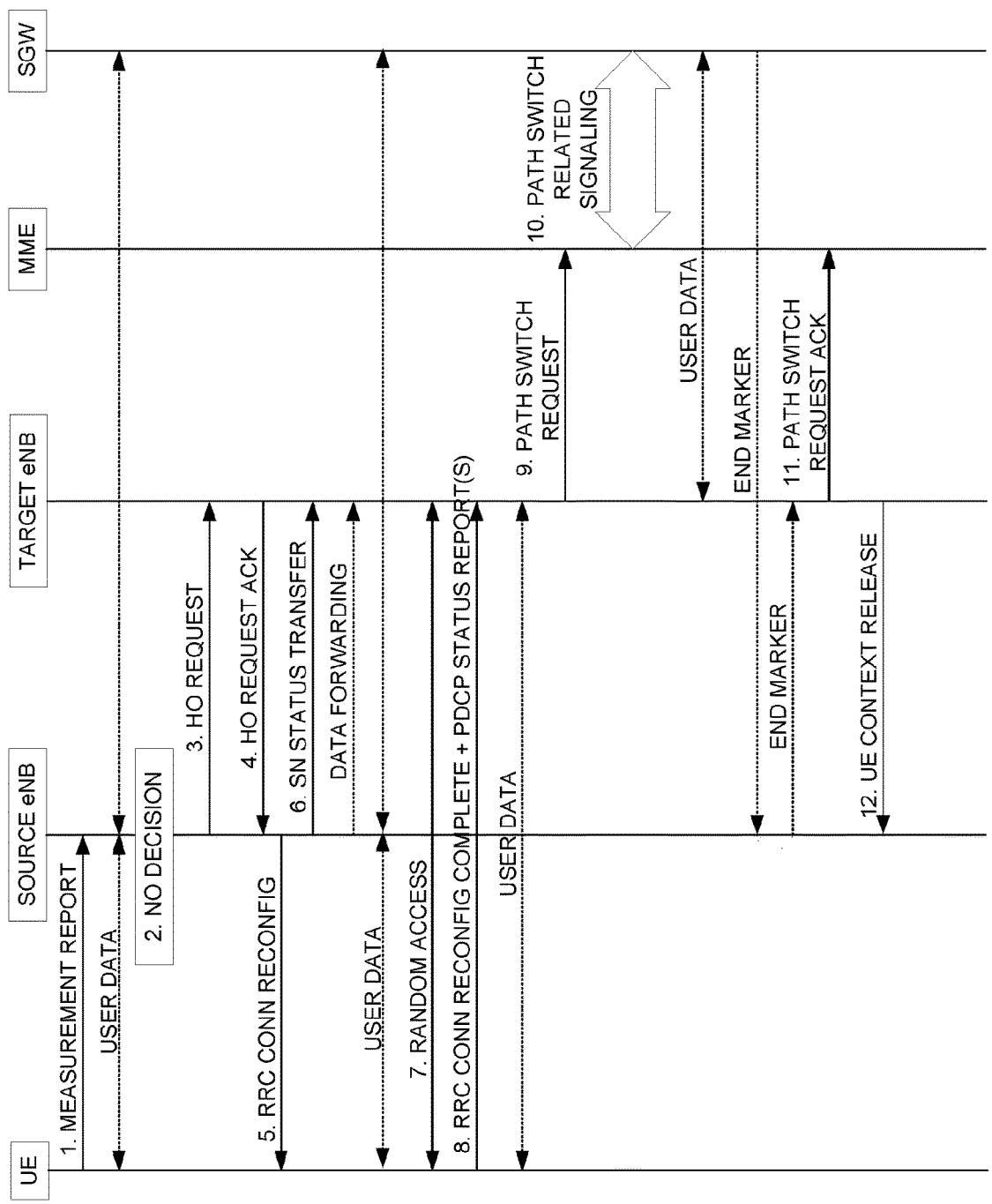
FIG. 13 is a signaling flow diagram during a eMBB inter-node handover procedure.

An example of an eMBB inter-node handover is illustrated in FIG. 13 for the case of LTE. At least one bearer is active for which PDCP status preservation applies. Notably, at step 5, upon receiving the "eMBB HO" indication in the RRC Connection Reconfiguration message, the UE maintains the connection to the source access node even while establishing the connection to the target access node. That is, the UE can send and receive data via the source access node between step 5-8 without any interruption. And after step 8, UE has the target link available for UL/DL data transmission similar to the regular HO procedure.

Moreover, once the connection setup with the target access node is successful, i.e. after sending the RRC Connection Reconfiguration Complete message in step 8, the UE maintains two data links, one to the source access node and one to the target access node. After step 8, UE transmits the UL data on the target access node similar to the regular HO procedure using the target access node security keys. Thus there is no need for UL data transmission to both nodes which avoids UE power splitting between two nodes and also simplifies UE implementation.

Note that the UE needs to maintain the security context for both source access node and target access node until the source link is released. The UE can differentiate the security key to be used for a PDCP PDU based on the cell which the PDU is transmitted/received.

To avoid packet duplication, the UE may send a PDCP status report together with the RRC connection reconfiguration complete message in step 8, indicating the last received PDCP SN. Based on the PDCP status report, the target access node can avoid sending duplicate PDCP packets (i.e. PDCP PDUs with identical sequence numbers) to the UE, i.e. PDCP packets which were already received by the UE in the source cell.

Although not shown, as an alternative to the source access node starting packet data forwarding after step 5 (i.e. after sending Handover Command (RRC Connection Reconfiguration) to the UE), the target access node may indicate to the source access node when to start packet data forwarding. For instance, the packet data forwarding may start at a later stage in the Handover Execution phase, e.g. when the UE performs random-access in the target cell. By starting the packet data forwarding in the source access node at a later stage, the number of duplicated PDCP packets received by the UE from the target cell will potentially be less and by that the DL latency will be somewhat reduced. However, starting the packet data forwarding at a later stage in the Handover Execution phase is also a trade-off between robustness and reduced latency if, e.g., the connection between the UE and the source access node is lost before the connection to the target access node is established. In such case there will be a short interruption in the DL data transfer to the UE.

There currently exist certain challenge(s). RLC UM is typically used for delay-sensitive and error-tolerant applications like VoIP and other real-time applications. As it is these types of applications that would benefit most from reduced handover interruption, it is important that also RLC UM is supported for eMBB.

In a regular handover, the PDCP COUNT (i.e. PDCP SN+PDCP HFN) is reset to 0 in the target access node for RLC UM bearers. As a new key is anyway generated at handover, there is no security reason to maintain the COUNT value. Also, since RLC UM bearers (unlike RLC AM bearers) tolerate packet loss and operate without acknowledgements, there is no retransmission of PDCP SDUs in the target cell, and hence there is no reason to keep the COUNT value for re-ordering purposes. The fact the COUNT is reset to zero is also the reason why the inter-node SN Status Transfer message is not sent for RLC UM bearers during a handover.

eMBB handover differs from regular handover in that the source access node continues to transmit DL data to the UE after it has begun data forwarding to the target access node. This implies that a PDCP SDU may be re-transmitted by the target access node and thus the same PDCP SDU is received twice by the UE. For RLC AM bearers, this is resolved with PDCP SN preservation and PDCP duplication detection in the UE. But for RLC UM bearers the PDCP COUNT value (i.e. PDCP SN+PDCP HFN) is reset in the target access node, thus the UE will not be able to detect such duplicate packets.

Another problem is that the PDCP status report, that may be transmitted by the UE in the target cell after handover to indicate the last received PDCP SN in the source cell is currently only supported for RLC AM bearers. The format of the PDCP status report is also not adapted to RLC UM bearers which are capable of handling packet loss.

Certain aspects of the present disclosure and their embodiments may provide solutions to these or other challenges. One solution (referred to as Solution 1) to handle the problem with duplicate packets in eMBB in combination with RLC UM bearers, is to ensure that the problem does not arise to begin with, i.e., the network ensures that the same PDCP SDU is not transmitted both from the source and target node. This can be achieved by using the same data forwarding principle as in the regular handover: that is, once packet forwarding is started the source access node stops DL data transmission to the UE in the source cell. To reduce the data interruption time this approach may be combined with the solution described above where the target access node indicates to the source access node when to start data forwarding. Alternatively, the UE can indicate to the source access node when it has connected to the target access node and by that, when data forwarding should start. However, since the indication is not instantaneous and since packet forwarding will always suffer from some delay, it may be difficult to achieve the ~0 ms interruption target with this solution. This may be acceptable though if it leads to a simpler solution.

Described generally from the perspective of the UE, then, Solution 1 may include a method in a UE in RRC_CONNECTED mode with one or more RLC UM bearers established. The method may comprise (i) receiving a handover command indicating 'Enhanced Make-Before-Break' type of handover from a source node; (ii) continuing DL data reception in source cell until connection to target cell indicated in the handover command is established; and (iii) stopping DL data reception and re-setting the PDCP COUNT value for the RLC UM bearers once the connection to the target cell is established (e.g. upon completion of the random access procedure in the target cell).

Another solution (referred to as Solution 2) is to allow packets to be duplicated but ensure that the UE (or target radio network node) can detect it when it happens. To support packet duplication detection for RLC UM bearers the PDCP COUNT must be maintained during the handover also for these bearers, i.e. the PDCP SNs must be preserved in the handover execution phase also for RLC UM bearers. This in turn requires that the PDCP SN is transferred from source to target using e.g. the SN status transfer message. To reduce the number of duplicated packets a PDCP status report (or similar message) should also be supported for RLC UM bearers. As the PDCP status report was designed for RLC AM bearers which targets lossless transmission, the format of the PDCP status report may need to be adapted for RLC UM bearers or a new PDCP control PDU could be introduced specific for this purpose.

Described generally from the perspective of the UE, then, Solution 2 may include a method in a UE in RRC_CONNECTED mode with one or more RLC UM bearers established. The method may comprise (i) receiving a handover command indicating 'Enhanced Make-Before-Break' type of handover from a source node; (ii) using the same PDCP COUNT value for RLC UM bearers as used is source cell in the target cell indicated in the handover command; and (iii) using the PDCP COUNT to detect duplicate packets received in the source and target cell for a RLC UM bearer.

Certain embodiments may provide one or more of the following technical advantage(s). Some embodiments prevent packet duplication for RLC UM bearers in Enhanced Make-Before-Break (eMBB) handover. This is done either by avoiding packets to be duplicated to begin with or by ensuring that the duplicate packets can be detected (and discarded) by the UE. Preventing packet duplication may in turn conserve radio resources, conserve processing resources at the radio network node and/or wireless device, and/or conserve battery life of the wireless device.

Consider additional details regarding Solution 1. In the first solution the source access node avoids packet duplication by stopping DL data transmission to the UE when data forwarding to the target access node begins. Since there is no packet duplication the COUNT can be reset to 0 for RLC UM bearers and no SN status transfer message needs to be sent from source to target. To minimize data interruption the target access node or UE indicates when the connection to the target cell is established and when data forwarding should start. However, since the indication is not instantaneous and since packet forwarding will always suffer from some delay, it may be difficult to achieve the ~0 ms interruption target with this solution.

Figure 14:
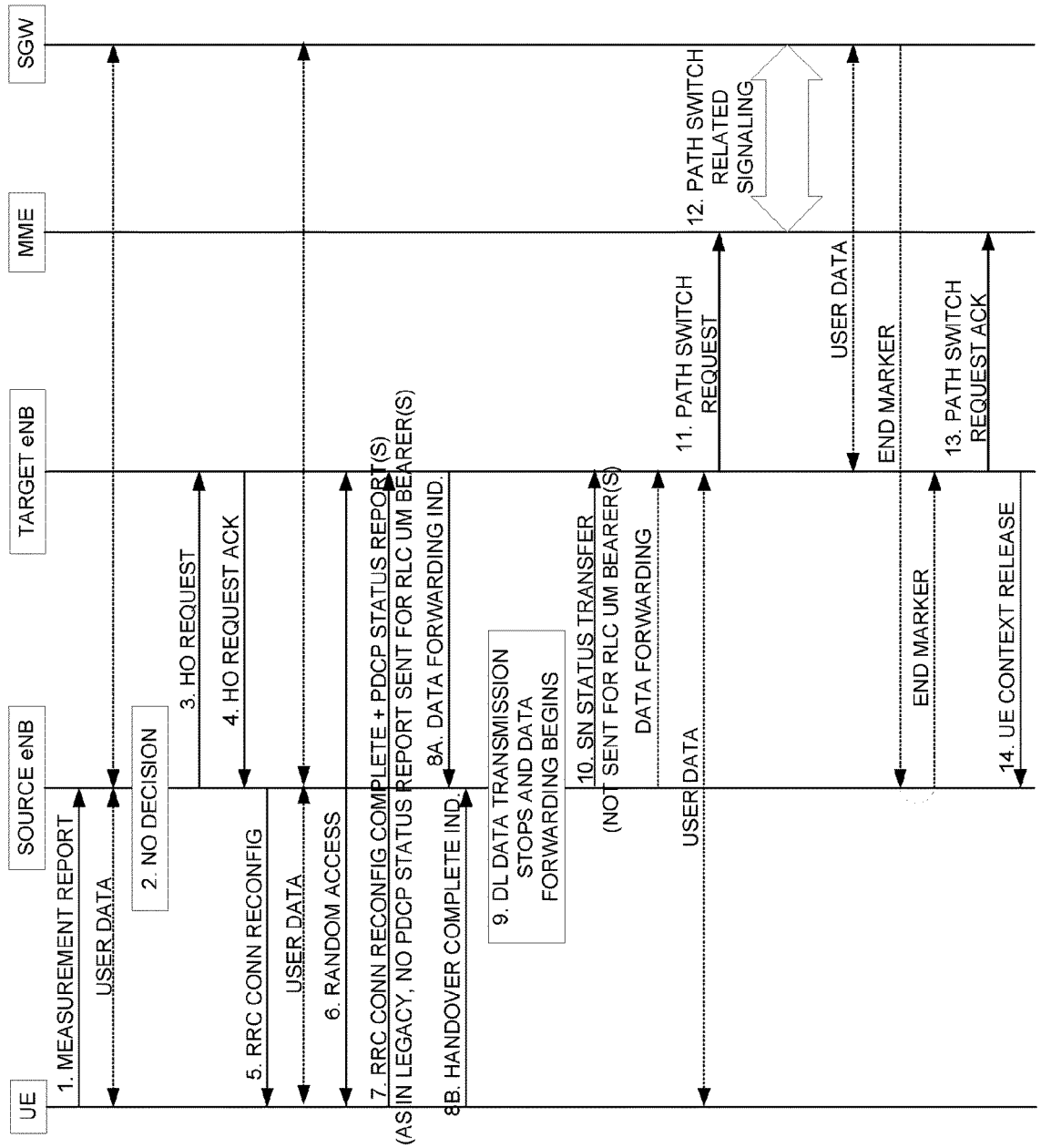
FIG. 14 is a signaling flow diagram during a handover according to some embodiments.

Solution 1 is illustrated in FIG. 14. The source node starts data forwarding and stops DL data transmission to the UE in step 9 after reception of the indication from the target access node or UE in step 8a or 8b. The UE resets the PDCP COUNT for all RLC UM bearers before receiving DL data from the target node (dotted line after step 10).

Now consider additional details regarding Solution 2. In Solution 2, the source node continues to transmit DL data even after data forwarding has started which means packet duplication may occur. However, since the UE maintains the PDCP COUNT for the RLC UM bearers in the target cell, the UE (or the target node) will be able to detect duplicated packets and can discard them. In contrast to solution 1, this solution can achieve ~0 ms interruption time in data transmission during the handover.

Figure 15:
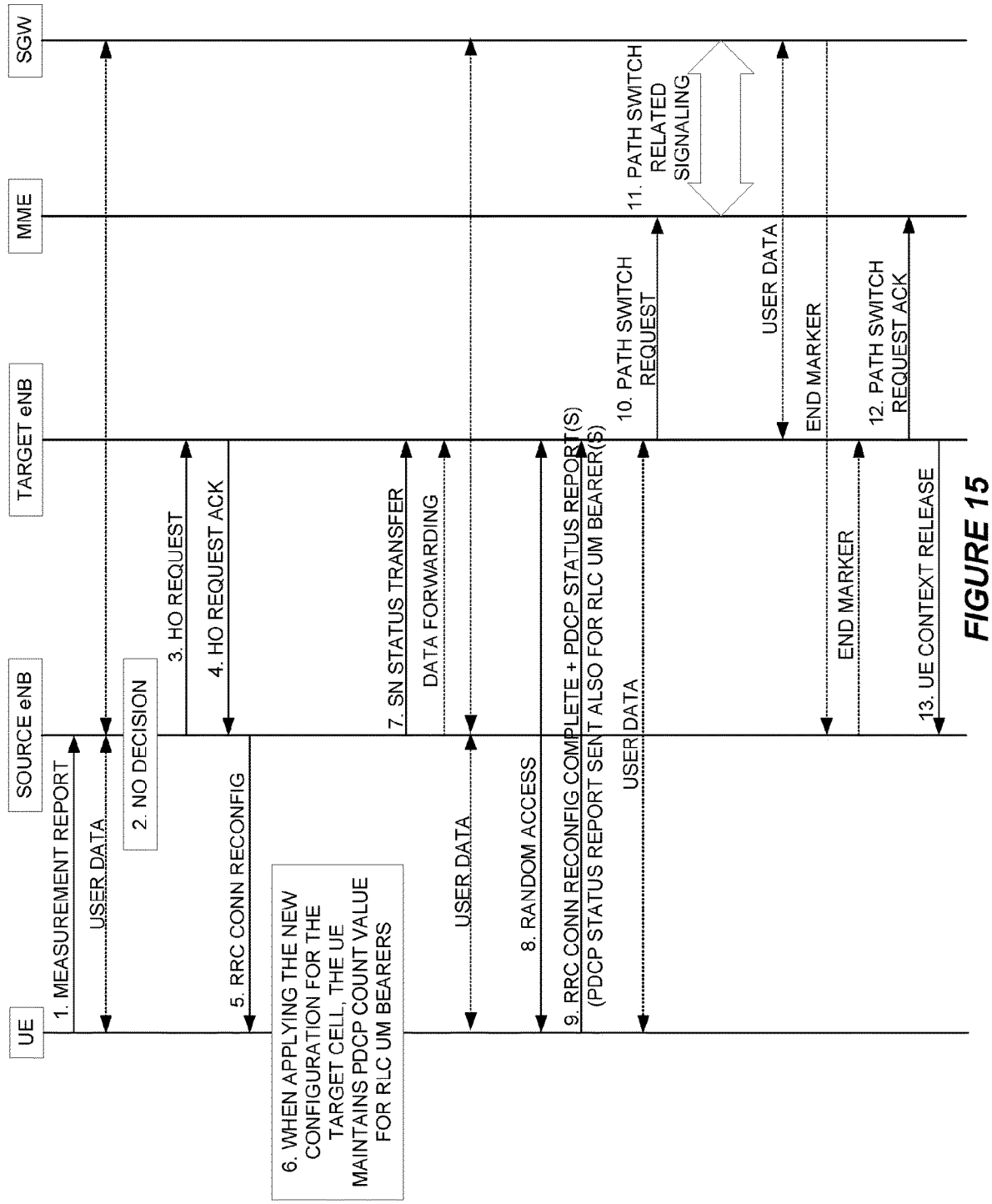
FIG. 15 is a signaling flow diagram during a handover according to other embodiments.

Solution 2 is illustrated in FIG. 15, which shows an eMBB solution where PDCP COUNT is maintained for RLC UM bearers. Compared to legacy handover and Rel-14 MBB, the PDCP COUNT is not reset to 0 for RLC UM bearers when the UE applies the target cell configuration received in the Handover Command (i.e. RRC connection reconfiguration) in step 6. The other difference is that PDCP status report is also sent for RLC UM bearers in step 9 as also RLC UM bearers may experience duplicated packets in this eMBB variant.

Figure 11:
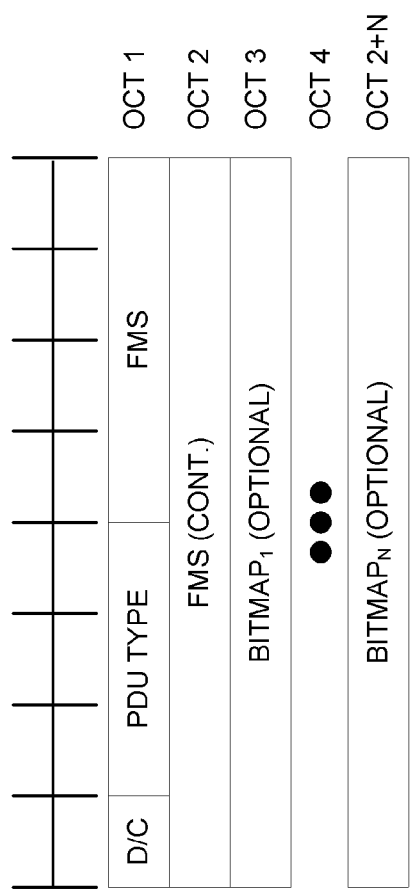
FIG. 11 is a block diagram of a PDCP status report.

Recall from above that the PDCP status report is designed for RLC AM bearers and contains a bitmap indicating which PDCP SDUs need to be retransmitted and a reference SN, the First Missing SDU (FMS) (see FIG. 11). In the case that all PDCP SDUs have been received in sequence for an RLC AM bearer, the FMS indicates the next expected SN and no bitmap is For RLM UM bearers there may be no need to indicate the missing PDCP SDUs in the PDCP status report since RLC UM bearers tolerate packet loss. This means that the bitmap can potentially be omitted and only the FMS field needs to be included to indicate the next expected SN. As a result, the FMS field would have a slightly different meaning for RLC UM compared to RLC AM. In RLC AM the value of the FMS field is set "SN of last PDCP SDU received in sequence +1" whereas for RLC UM it would be set to "highest SN received+1". Omitting the bitmap not only reduces the size of the PDCP status report but it also means that the PDCP status report will have a known (and hence predictable) size. A predictable size is important from a scheduling point of view since the target access node then knows how large UL grant it needs to provide when the PDCP status report is to be sent from the UE to the target access node. Instead of re-interpreting the fields of the existing PDCP status report, another alternative is to introduce a new PDCP control PDU with similar purpose as the SN status report but with a format specifically adapted to RLC UM.

In order for SN status preservation to work, the PDCP SN needs to be transferred from the source access node to the target access node for the RLC UM bearers. In the example in FIG. 15, this is achieved by means of the SN status transfer message in step 7. Another alternative is to use an "inband" approach and send the PDCP SN together with the forwarded PDCP SDUs using the GTP extension header mentioned in the introduction section. In this case only the PDCP SN is transferred but not the PDCP HFN. As the HFN is used for ciphering and integrity protection and not needed for duplicate detection or re-ordering, the target access node could handle this by setting the HFN to 0 (the UE would then also need to set the HFN to 0). In other words, the HFN would be reset to 0 while the SN is kept running. Note that resetting the HFN but not the SN part of the COUNT has no impact on security since the security keys are anyway changed at handover.

For the most part, the solutions above have been described in a generic way using terms which are common to LTE and NR. The signaling diagrams however use LTE specific terminology but they can easily be adapted to NR by making the following terminology replacements:

| LTE nodes | | NR nodes |
|---|---|---|
| eNB | → | gNB |
| MME | → | AMF |
| SGW | → | UPF |
| LTE messages | | NR messages |
| RRCConnectionReconfiguration | → | RRCReconfiguration |
| RRCConnectionReconfiguration-Complete | → | RRCReconfiguration-Complete |

In some embodiments herein, an RLC entity (e.g., at a wireless device or network node) can be configured to perform data transfer in one of the following three modes: Transparent Mode (TM), Unacknowledged Mode (UM) or Acknowledged Mode (AM). Consequently, an RLC entity is categorized as a TM RLC entity, an UM RLC entity or an AM RLC entity depending on the mode of data transfer that the RLC entity is configured to provide.

An UM RLC entity is configured either as a transmitting UM RLC entity or a receiving UM RLC entity. The transmitting UM RLC entity receives RLC SDUs from upper layer and sends RLC PDUs to its peer receiving UM RLC entity via lower layers. The receiving UM RLC entity delivers RLC SDUs to upper layer and receives RLC PDUs from its peer transmitting UM RLC entity via lower layers.

An AM RLC entity consists of a transmitting side and a receiving side. The transmitting side of an AM RLC entity receives RLC SDUs from upper layer and sends RLC PDUs to its peer AM RLC entity via lower layers. The receiving side of an AM RLC entity delivers RLC SDUs to upper layer and receives RLC PDUs from its peer AM RLC entity via lower layers.

In some embodiments, the MBB or eMBB handover may be indicated in the handover command, e.g., a mobilityControlinfo field. For example, in some embodiments, the information field makeBeforeBreak indicates this by indicating that the UE shall continue uplink transmission/downlink reception with the source cell(s) before performing the first transmission through PRACH to the target intra-frequency PCell, or performing initial PUSCH transmission to the target intra-frequency PCell while rach-Skip is configured.

Figure 16:
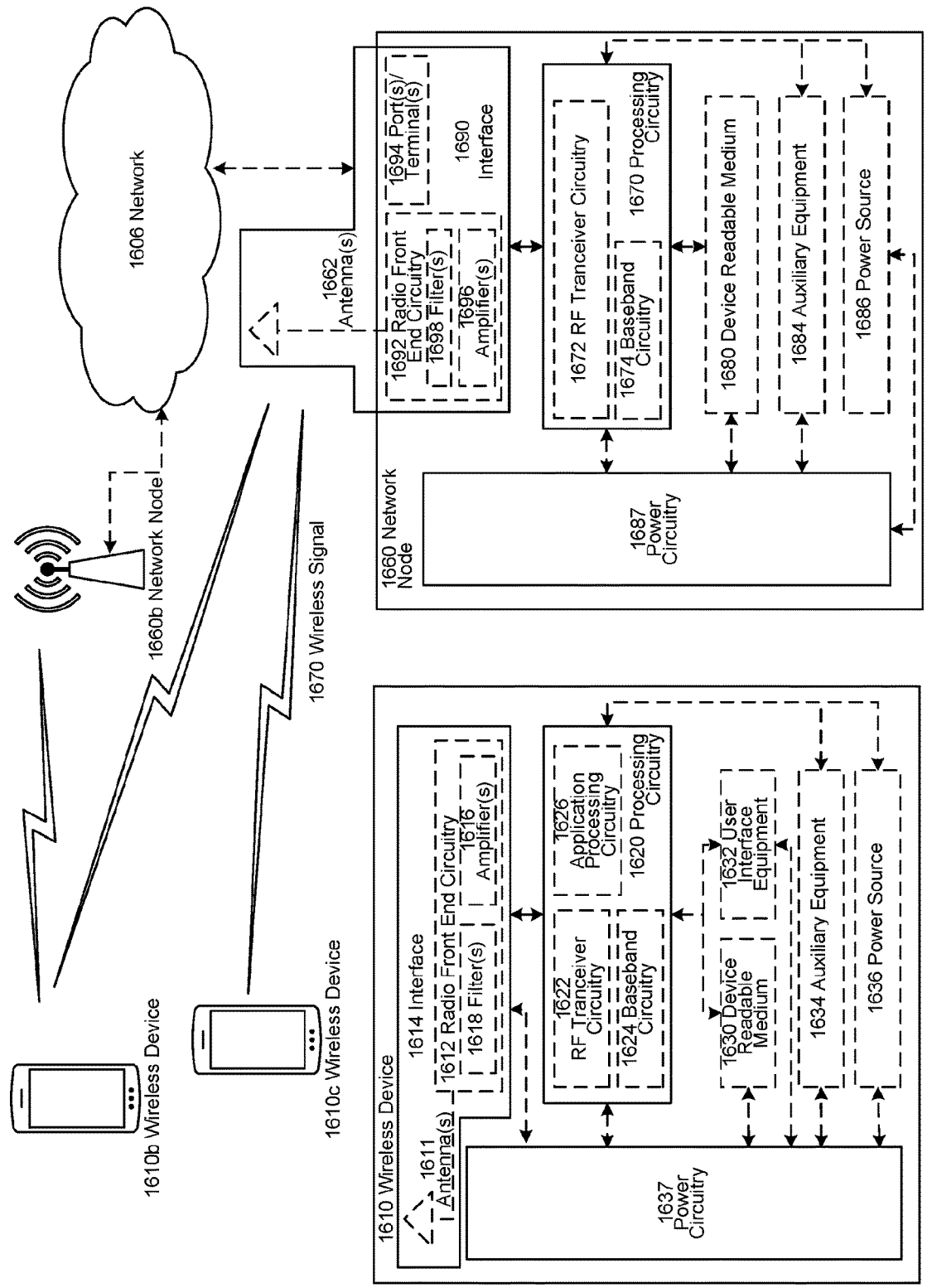
FIG. 16 is a block diagram of a wireless communication network according to some embodiments.

Although the subject matter described herein may be implemented in any appropriate type of system using any suitable components, the embodiments disclosed herein are described in relation to a wireless network, such as the example wireless network illustrated in FIG. 16. For simplicity, the wireless network of FIG. 16 only depicts network 1606, network nodes 1660 and 1660b, and WDs 1610, 1610b, and 1610c. In practice, a wireless network may further include any additional elements suitable to support communication between wireless devices or between a wireless device and another communication device, such as a landline telephone, a service provider, or any other network node or end device. Of the illustrated components, network node 1660 and wireless device (WD) 1610 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1606 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1660 and WD 1610 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 16, network node 1660 includes processing circuitry 1670, device readable medium 1680, interface 1690, auxiliary equipment 1684, power source 1686, power circuitry 1687, and antenna 1662. Although network node 1660 illustrated in the example wireless network of FIG. 16 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1660 are depicted as single boxes located within a larger box, or nested within multiple boxes, in practice, a network node may comprise multiple different physical components that make up a single illustrated component (e.g., device readable medium 1680 may comprise multiple separate hard drives as well as multiple RAM modules).

Similarly, network node 1660 may be composed of multiple physically separate components (e.g., a NodeB component and a RNC component, or a BTS component and a BSC component, etc.), which may each have their own respective components. In certain scenarios in which network node 1660 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1660 may be configured to support multiple radio access technologies (RATs). In such embodiments, some components may be duplicated (e.g., separate device readable medium 1680 for the different RATs) and some components may be reused (e.g., the same antenna 1662 may be shared by the RATs). Network node 1660 may also include multiple sets of the various illustrated components for different wireless technologies integrated into network node 1660, such as, for example, GSM, WCDMA, LTE, NR, WiFi, or Bluetooth wireless technologies. These wireless technologies may be integrated into the same or different chip or set of chips and other components within network node 1660.

Processing circuitry 1670 is configured to perform any determining, calculating, or similar operations (e.g., certain obtaining operations) described herein as being provided by a network node. These operations performed by processing circuitry 1670 may include processing information obtained by processing circuitry 1670 by, for example, converting the obtained information into other information, comparing the obtained information or converted information to information stored in the network node, and/or performing one or more operations based on the obtained information or converted information, and as a result of said processing making a determination.

Processing circuitry 1670 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1660 components, such as device readable medium 1680, network node 1660 functionality. For example, processing circuitry 1670 may execute instructions stored in device readable medium 1680 or in memory within processing circuitry 1670. Such functionality may include providing any of the various wireless features, functions, or benefits discussed herein. In some embodiments, processing circuitry 1670 may include a system on a chip (SOC).

In some embodiments, processing circuitry 1670 may include one or more of radio frequency (RF) transceiver circuitry 1672 and baseband processing circuitry 1674. In some embodiments, radio frequency (RF) transceiver circuitry 1672 and baseband processing circuitry 1674 may be on separate chips (or sets of chips), boards, or units, such as radio units and digital units. In alternative embodiments, part or all of RF transceiver circuitry 1672 and baseband processing circuitry 1674 may be on the same chip or set of chips, boards, or units In certain embodiments, some or all of the functionality described herein as being provided by a network node, base station, eNB or other such network device may be performed by processing circuitry 1670 executing instructions stored on device readable medium 1680 or memory within processing circuitry 1670. In alternative embodiments, some or all of the functionality may be provided by processing circuitry 1670 without executing instructions stored on a separate or discrete device readable medium, such as in a hard-wired manner. In any of those embodiments, whether executing instructions stored on a device readable storage medium or not, processing circuitry 1670 can be configured to perform the described functionality. The benefits provided by such functionality are not limited to processing circuitry 1670 alone or to other components of network node 1660, but are enjoyed by network node 1660 as a whole, and/or by end users and the wireless network generally.

Device readable medium 1680 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1670. Device readable medium 1680 may store any suitable instructions, data or information, including a computer program, software, an application including one or more of logic, rules, code, tables, etc. and/or other instructions capable of being executed by processing circuitry 1670 and, utilized by network node 1660. Device readable medium 1680 may be used to store any calculations made by processing circuitry 1670 and/or any data received via interface 1690. In some embodiments, processing circuitry 1670 and device readable medium 1680 may be considered to be integrated.

Interface 1690 is used in the wired or wireless communication of signalling and/or data between network node 1660, network 1606, and/or WDs 1610. As illustrated, interface 1690 comprises port(s)/terminal(s) 1694 to send and receive data, for example to and from network 1606 over a wired connection. Interface 1690 also includes radio front end circuitry 1692 that may be coupled to, or in certain embodiments a part of, antenna 1662. Radio front end circuitry 1692 comprises filters 1698 and amplifiers 1696. Radio front end circuitry 1692 may be connected to antenna 1662 and processing circuitry 1670. Radio front end circuitry may be configured to condition signals communicated between antenna 1662 and processing circuitry 1670. Radio front end circuitry 1692 may receive digital data that is to be sent out to other network nodes or WDs via a wireless connection. Radio front end circuitry 1692 may convert the digital data into a radio signal having the appropriate channel and bandwidth parameters using a combination of filters 1698 and/or amplifiers 1696. The radio signal may then be transmitted via antenna 1662. Similarly, when receiving data, antenna 1662 may collect radio signals which are then converted into digital data by radio front end circuitry 1692. The digital data may be passed to processing circuitry 1670. In other embodiments, the interface may comprise different components and/or different combinations of components.

In certain alternative embodiments, network node 1660 may not include separate radio front end circuitry 1692, instead, processing circuitry 1670 may comprise radio front end circuitry and may be connected to antenna 1662 without separate radio front end circuitry 1692. Similarly, in some embodiments, all or some of RF transceiver circuitry 1672 may be considered a part of interface 1690. In still other embodiments, interface 1690 may include one or more ports or terminals 1694, radio front end circuitry 1692, and RF transceiver circuitry 1672, as part of a radio unit (not shown), and interface 1690 may communicate with baseband processing circuitry 1674, which is part of a digital unit (not shown).

Antenna 1662 may include one or more antennas, or antenna arrays, configured to send and/or receive wireless signals. Antenna 1662 may be coupled to radio front end circuitry 1690 and may be any type of antenna capable of transmitting and receiving data and/or signals wirelessly. In some embodiments, antenna 1662 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1662 may be separate from network node 1660 and may be connectable to network node 1660 through an interface or port.

Antenna 1662, interface 1690, and/or processing circuitry 1670 may be configured to perform any receiving operations and/or certain obtaining operations described herein as being performed by a network node. Any information, data and/or signals may be received from a wireless device, another network node and/or any other network equipment. Similarly, antenna 1662, interface 1690, and/or processing circuitry 1670 may be configured to perform any transmitting operations described herein as being performed by a network node. Any information, data and/or signals may be transmitted to a wireless device, another network node and/or any other network equipment.

Power circuitry 1687 may comprise, or be coupled to, power management circuitry and is configured to supply the components of network node 1660 with power for performing the functionality described herein. Power circuitry 1687 may receive power from power source 1686. Power source 1686 and/or power circuitry 1687 may be configured to provide power to the various components of network node 1660 in a form suitable for the respective components (e.g., at a voltage and current level needed for each respective component). Power source 1686 may either be included in, or external to, power circuitry 1687 and/or network node 1660. For example, network node 1660 may be connectable to an external power source (e.g., an electricity outlet) via an input circuitry or interface such as an electrical cable, whereby the external power source supplies power to power circuitry 1687. As a further example, power source 1686 may comprise a source of power in the form of a battery or battery pack which is connected to, or integrated in, power circuitry 1687. The battery may provide backup power should the external power source fail. Other types of power sources, such as photovoltaic devices, may also be used.

Alternative embodiments of network node 1660 may include additional components beyond those shown in FIG. 16 that may be responsible for providing certain aspects of the network node's functionality, including any of the functionality described herein and/or any functionality necessary to support the subject matter described herein. For example, network node 1660 may include user interface equipment to allow input of information into network node 1660 and to allow output of information from network node 1660. This may allow a user to perform diagnostic, maintenance, repair, and other administrative functions for network node 1660.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (lot) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1610 includes antenna 1611, interface 1614, processing circuitry 1620, device readable medium 1630, user interface equipment 1632, auxiliary equipment 1634, power source 1636 and power circuitry 1637. WD 1610 may include multiple sets of one or more of the illustrated components for different wireless technologies supported by WD 1610, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1610.

Antenna 1611 may include one or more antennas or antenna arrays, configured to send and/or receive wireless signals, and is connected to interface 1614. In certain alternative embodiments, antenna 1611 may be separate from WD 1610 and be connectable to WD 1610 through an interface or port. Antenna 1611, interface 1614, and/or processing circuitry 1620 may be configured to perform any receiving or transmitting operations described herein as being performed by a WD. Any information, data and/or signals may be received from a network node and/or another WD. In some embodiments, radio front end circuitry and/or antenna 1611 may be considered an interface.

As illustrated, interface 1614 comprises radio front end circuitry 1612 and antenna 1611. Radio front end circuitry 1612 comprise one or more filters 1618 and amplifiers 1616. Radio front end circuitry 1614 is connected to antenna 1611 and processing circuitry 1620, and is configured to condition signals communicated between antenna 1611 and processing circuitry 1620. Radio front end circuitry 1612 may be coupled to or a part of antenna 1611. In some embodiments, WD 1610 may not include separate radio front end circuitry 1612; rather, processing circuitry 1620 may comprise radio front end circuitry and may be connected to antenna 1611. Similarly, in some embodiments, some or all of RF transceiver circuitry 1622 may be considered a part of interface 1614. Radio front end circuitry 1612 may receive digital data that is to be sent out to other network nodes or WDs via a wireless connection. Radio front end circuitry 1612 may convert the digital data into a radio signal having the appropriate channel and bandwidth parameters using a combination of filters 1618 and/or amplifiers 1616. The radio signal may then be transmitted via antenna 1611. Similarly, when receiving data, antenna 1611 may collect radio signals which are then converted into digital data by radio front end circuitry 1612. The digital data may be passed to processing circuitry 1620. In other embodiments, the interface may comprise different components and/or different combinations of components.

Processing circuitry 1620 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1610 components, such as device readable medium 1630, WD 1610 functionality. Such functionality may include providing any of the various wireless features or benefits discussed herein. For example, processing circuitry 1620 may execute instructions stored in device readable medium 1630 or in memory within processing circuitry 1620 to provide the functionality disclosed herein.

As illustrated, processing circuitry 1620 includes one or more of RF transceiver circuitry 1622, baseband processing circuitry 1624, and application processing circuitry 1626. In other embodiments, the processing circuitry may comprise different components and/or different combinations of components. In certain embodiments processing circuitry 1620 of WD 1610 may comprise a SOC. In some embodiments, RF transceiver circuitry 1622, baseband processing circuitry 1624, and application processing circuitry 1626 may be on separate chips or sets of chips. In alternative embodiments, part or all of baseband processing circuitry 1624 and application processing circuitry 1626 may be combined into one chip or set of chips, and RF transceiver circuitry 1622 may be on a separate chip or set of chips. In still alternative embodiments, part or all of RF transceiver circuitry 1622 and baseband processing circuitry 1624 may be on the same chip or set of chips, and application processing circuitry 1626 may be on a separate chip or set of chips. In yet other alternative embodiments, part or all of RF transceiver circuitry 1622, baseband processing circuitry 1624, and application processing circuitry 1626 may be combined in the same chip or set of chips. In some embodiments, RF transceiver circuitry 1622 may be a part of interface 1614. RF transceiver circuitry 1622 may condition RF signals for processing circuitry 1620.

In certain embodiments, some or all of the functionality described herein as being performed by a WD may be provided by processing circuitry 1620 executing instructions stored on device readable medium 1630, which in certain embodiments may be a computer-readable storage medium. In alternative embodiments, some or all of the functionality may be provided by processing circuitry 1620 without executing instructions stored on a separate or discrete device readable storage medium, such as in a hard-wired manner. In any of those particular embodiments, whether executing instructions stored on a device readable storage medium or not, processing circuitry 1620 can be configured to perform the described functionality. The benefits provided by such functionality are not limited to processing circuitry 1620 alone or to other components of WD 1610, but are enjoyed by WD 1610 as a whole, and/or by end users and the wireless network generally.

Processing circuitry 1620 may be configured to perform any determining, calculating, or similar operations (e.g., certain obtaining operations) described herein as being performed by a WD. These operations, as performed by processing circuitry 1620, may include processing information obtained by processing circuitry 1620 by, for example, converting the obtained information into other information, comparing the obtained information or converted information to information stored by WD 1610, and/or performing one or more operations based on the obtained information or converted information, and as a result of said processing making a determination.

Device readable medium 1630 may be operable to store a computer program, software, an application including one or more of logic, rules, code, tables, etc. and/or other instructions capable of being executed by processing circuitry 1620. Device readable medium 1630 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1620. In some embodiments, processing circuitry 1620 and device readable medium 1630 may be considered to be integrated.

User interface equipment 1632 may provide components that allow for a human user to interact with WD 1610. Such interaction may be of many forms, such as visual, audial, tactile, etc. User interface equipment 1632 may be operable to produce output to the user and to allow the user to provide input to WD 1610. The type of interaction may vary depending on the type of user interface equipment 1632 installed in WD 1610. For example, if WD 1610 is a smart phone, the interaction may be via a touch screen; if WD 1610 is a smart meter, the interaction may be through a screen that provides usage (e.g., the number of gallons used) or a speaker that provides an audible alert (e.g., if smoke is detected). User interface equipment 1632 may include input interfaces, devices and circuits, and output interfaces, devices and circuits. User interface equipment 1632 is configured to allow input of information into WD 1610, and is connected to processing circuitry 1620 to allow processing circuitry 1620 to process the input information. User interface equipment 1632 may include, for example, a microphone, a proximity or other sensor, keys/buttons, a touch display, one or more cameras, a USB port, or other input circuitry. User interface equipment 1632 is also configured to allow output of information from WD 1610, and to allow processing circuitry 1620 to output information from WD 1610. User interface equipment 1632 may include, for example, a speaker, a display, vibrating circuitry, a USB port, a headphone interface, or other output circuitry. Using one or more input and output interfaces, devices, and circuits, of user interface equipment 1632, WD 1610 may communicate with end users and/or the wireless network, and allow them to benefit from the functionality described herein.

Auxiliary equipment 1634 is operable to provide more specific functionality which may not be generally performed by WDs. This may comprise specialized sensors for doing measurements for various purposes, interfaces for additional types of communication such as wired communications etc. The inclusion and type of components of auxiliary equipment 1634 may vary depending on the embodiment and/or scenario.

Power source 1636 may, in some embodiments, be in the form of a battery or battery pack. Other types of power sources, such as an external power source (e.g., an electricity outlet), photovoltaic devices or power cells, may also be used. WD 1610 may further comprise power circuitry 1637 for delivering power from power source 1636 to the various parts of WD 1610 which need power from power source 1636 to carry out any functionality described or indicated herein. Power circuitry 1637 may in certain embodiments comprise power management circuitry. Power circuitry 1637 may additionally or alternatively be operable to receive power from an external power source; in which case WD 1610 may be connectable to the external power source (such as an electricity outlet) via input circuitry or an interface such as an electrical power cable. Power circuitry 1637 may also in certain embodiments be operable to deliver power from an external power source to power source 1636. This may be, for example, for the charging of power source 1636. Power circuitry 1637 may perform any formatting, converting, or other modification to the power from power source 1636 to make the power suitable for the respective components of WD 1610 to which power is supplied.

Figure 17:
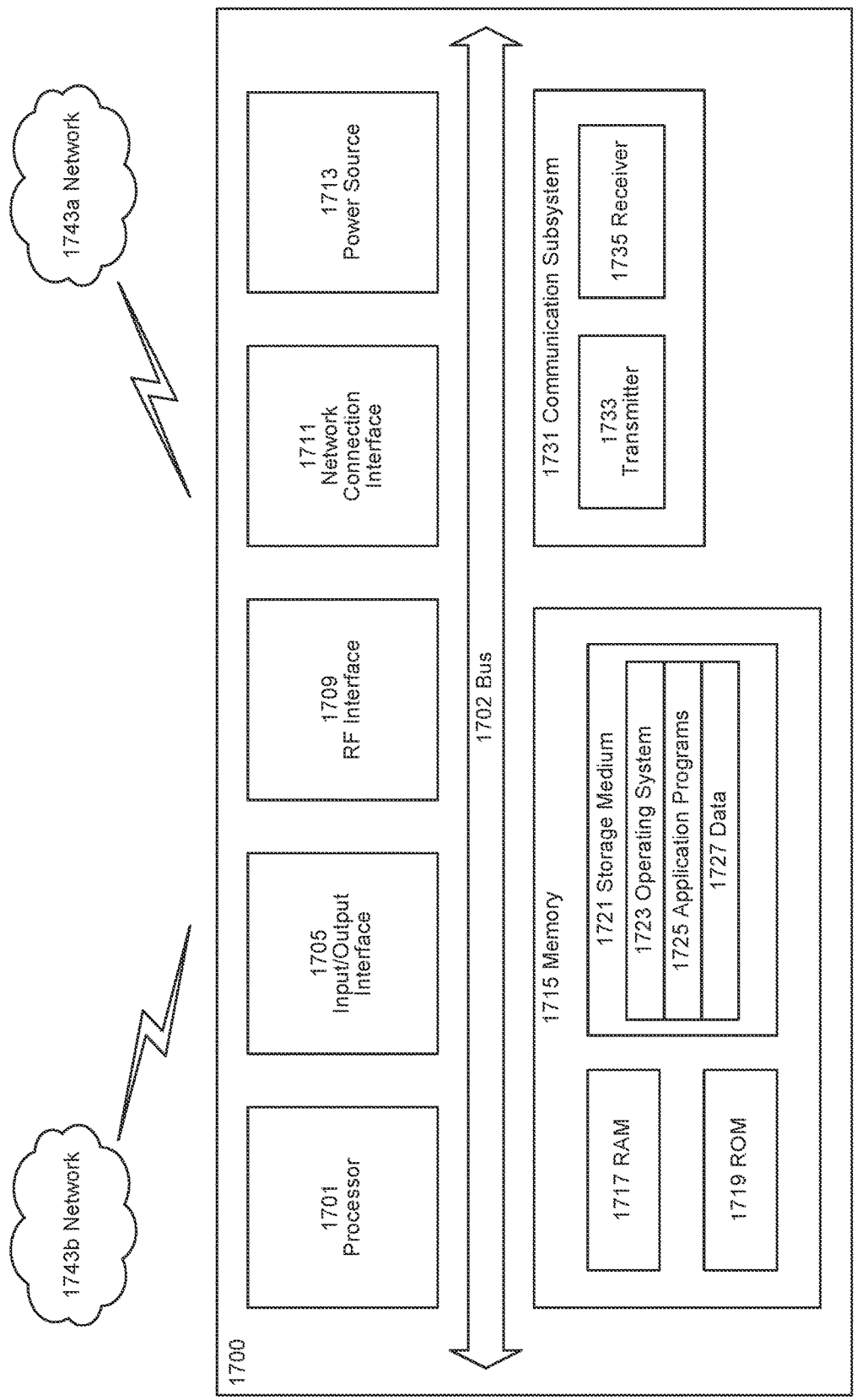
FIG. 17 is a block diagram of a user equipment according to some embodiments.

FIG. 17 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 17200 may be any UE identified by the $3^{rd}$ Generation Partnership Project (3GPP), including a NB-IoT UE, a machine type communication (MTC) UE, and/or an enhanced MTC (eMTC) UE. UE 1700, as illustrated in FIG. 17, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 17 is a UE, the components discussed herein are equally applicable to a WD, and vice-versa.

In FIG. 17, UE 1700 includes processing circuitry 1701 that is operatively coupled to input/output interface 1705, radio frequency (RF) interface 1709, network connection interface 1711, memory 1715 including random access memory (RAM) 1717, read-only memory (ROM) 1719, and storage medium 1721 or the like, communication subsystem 1731, power source 1733, and/or any other component, or any combination thereof. Storage medium 1721 includes operating system 1723, application program 1725, and data 1727. In other embodiments, storage medium 1721 may include other similar types of information. Certain UEs may utilize all of the components shown in FIG. 17, or only a subset of the components. The level of integration between the components may vary from one UE to another UE. Further, certain UEs may contain multiple instances of a component, such as multiple processors, memories, transceivers, transmitters, receivers, etc.

In FIG. 17, processing circuitry 1701 may be configured to process computer instructions and data. Processing circuitry 1701 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1701 may include two central processing units (CPUs). Data may be information in a form suitable for use by a computer.

In the depicted embodiment, input/output interface 1705 may be configured to provide a communication interface to an input device, output device, or input and output device. UE 1700 may be configured to use an output device via input/output interface 1705. An output device may use the same type of interface port as an input device. For example, a USB port may be used to provide input to and output from UE 1700. The output device may be a speaker, a sound card, a video card, a display, a monitor, a printer, an actuator, an emitter, a smartcard, another output device, or any combination thereof. UE 1700 may be configured to use an input device via input/output interface 1705 to allow a user to capture information into UE 1700. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 17, RF interface 1709 may be configured to provide a communication interface to RF components such as a transmitter, a receiver, and an antenna. Network connection interface 1711 may be configured to provide a communication interface to network 1743a. Network 1743a may encompass wired and/or wireless networks such as a local-area network (LAN), a wide-area network (WAN), a computer network, a wireless network, a telecommunications network, another like network or any combination thereof. For example, network 1743a may comprise a Wi-Fi network. Network connection interface 1711 may be configured to include a receiver and a transmitter interface used to communicate with one or more other devices over a communication network according to one or more communication protocols, such as Ethernet, TCP/IP, SONET, ATM, or the like. Network connection interface 1711 may implement receiver and transmitter functionality appropriate to the communication network links (e.g., optical, electrical, and the like). The transmitter and receiver functions may share circuit components, software or firmware, or alternatively may be implemented separately.

RAM 1717 may be configured to interface via bus 1702 to processing circuitry 1701 to provide storage or caching of data or computer instructions during the execution of software programs such as the operating system, application programs, and device drivers. ROM 1719 may be configured to provide computer instructions or data to processing circuitry 1701. For example, ROM 1719 may be configured to store invariant low-level system code or data for basic system functions such as basic input and output (I/O), startup, or reception of keystrokes from a keyboard that are stored in a non-volatile memory. Storage medium 1721 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1721 may be configured to include operating system 1723, application program 1725 such as a web browser application, a widget or gadget engine or another application, and data file 1727. Storage medium 1721 may store, for use by UE 1700, any of a variety of various operating systems or combinations of operating systems.

Storage medium 1721 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1721 may allow UE 1700 to access computer-executable instructions, application programs or the like, stored on transitory or non-transitory memory media, to off-load data, or to upload data. An article of manufacture, such as one utilizing a communication system may be tangibly embodied in storage medium 1721, which may comprise a device readable medium.

In FIG. 17, processing circuitry 1701 may be configured to communicate with network 1743b using communication subsystem 1731. Network 1743a and network 1743b may be the same network or networks or different network or networks. Communication subsystem 1731 may be configured to include one or more transceivers used to communicate with network 1743b. For example, communication subsystem 1731 may be configured to include one or more transceivers used to communicate with one or more remote transceivers of another device capable of wireless communication such as another WD, UE, or base station of a radio access network (RAN) according to one or more communication protocols, such as IEEE 802.17, CDMA, WCDMA, GSM, LTE, UTRAN, WiMax, or the like. Each transceiver may include transmitter 1733 and/or receiver 1735 to implement transmitter or receiver functionality, respectively, appropriate to the RAN links (e.g., frequency allocations and the like). Further, transmitter 1733 and receiver 1735 of each transceiver may share circuit components, software or firmware, or alternatively may be implemented separately.

In the illustrated embodiment, the communication functions of communication subsystem 1731 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1731 may include cellular communication, Wi-Fi communication, Bluetooth communication, and GPS communication. Network 1743b may encompass wired and/or wireless networks such as a local-area network (LAN), a wide-area network (WAN), a computer network, a wireless network, a telecommunications network, another like network or any combination thereof. For example, network 1743b may be a cellular network, a Wi-Fi network, and/or a near-field network. Power source 1713 may be configured to provide alternating current (AC) or direct current (DC) power to components of UE 1700.

The features, benefits and/or functions described herein may be implemented in one of the components of UE 1700 or partitioned across multiple components of UE 1700. Further, the features, benefits, and/or functions described herein may be implemented in any combination of hardware, software or firmware. In one example, communication subsystem 1731 may be configured to include any of the components described herein. Further, processing circuitry 1701 may be configured to communicate with any of such components over bus 1702. In another example, any of such components may be represented by program instructions stored in memory that when executed by processing circuitry 1701 perform the corresponding functions described herein. In another example, the functionality of any of such components may be partitioned between processing circuitry 1701 and communication subsystem 1731. In another example, the non-computationally intensive functions of any of such components may be implemented in software or firmware and the computationally intensive functions may be implemented in hardware.

Figure 18:
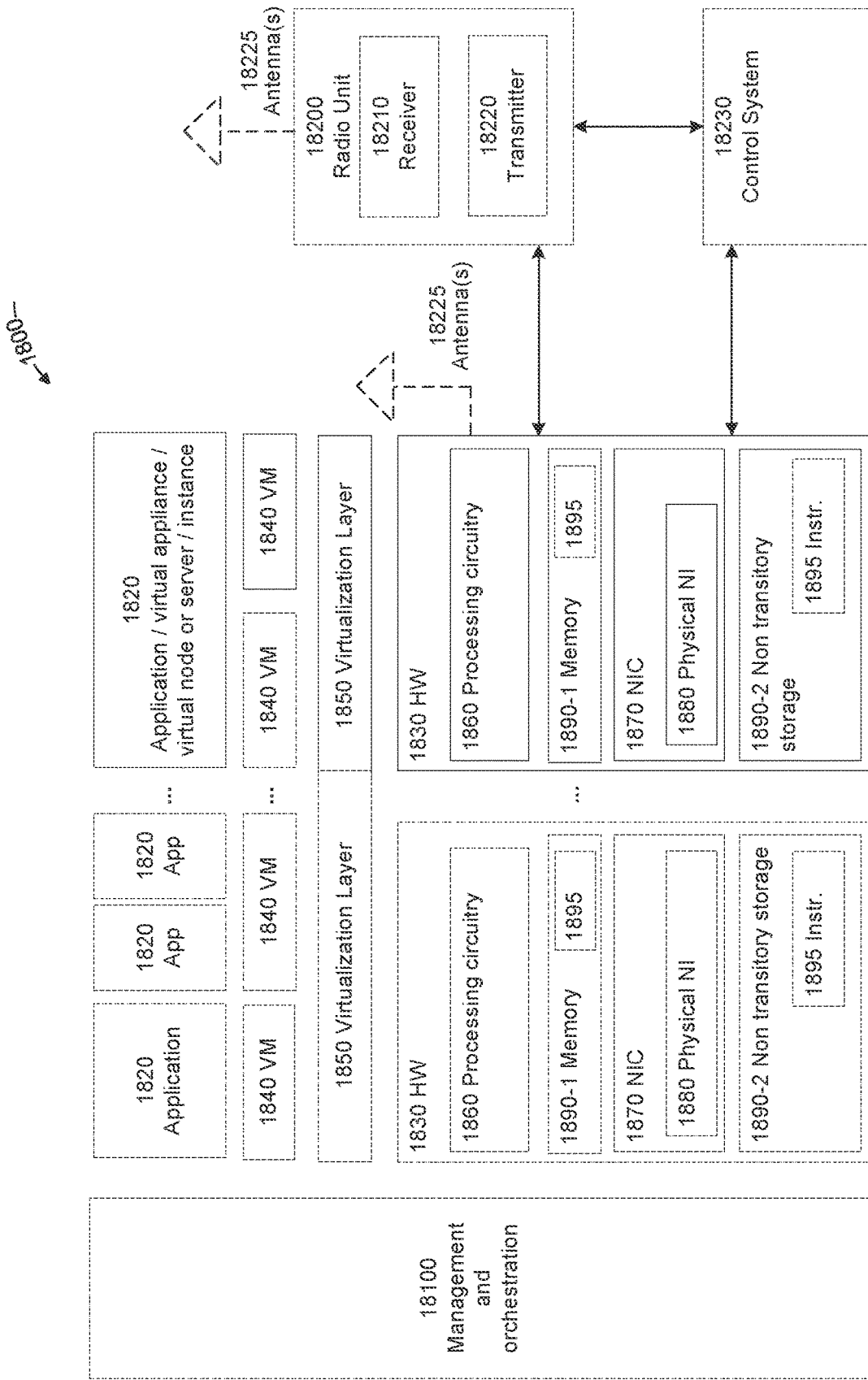
FIG. 18 is a block diagram of a virtualization environment according to some embodiments.

FIG. 18 is a schematic block diagram illustrating a virtualization environment 1800 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1800 hosted by one or more of hardware nodes 1830. Further, in embodiments in which the virtual node is not a radio access node or does not require radio connectivity (e.g., a core network node), then the network node may be entirely virtualized.

The functions may be implemented by one or more applications 1820 (which may alternatively be called software instances, virtual appliances, network functions, virtual nodes, virtual network functions, etc.) operative to implement some of the features, functions, and/or benefits of some of the embodiments disclosed herein. Applications 1820 are run in virtualization environment 1800 which provides hardware 1830 comprising processing circuitry 1860 and memory 1890. Memory 1890 contains instructions 1895 executable by processing circuitry 1860 whereby application 1820 is operative to provide one or more of the features, benefits, and/or functions disclosed herein.

Virtualization environment 1800, comprises general-purpose or special-purpose network hardware devices 1830 comprising a set of one or more processors or processing circuitry 1860, which may be commercial off-the-shelf (COTS) processors, dedicated Application Specific Integrated Circuits (ASICs), or any other type of processing circuitry including digital or analog hardware components or special purpose processors. Each hardware device may comprise memory 1890-1 which may be non-persistent memory for temporarily storing instructions 1895 or software executed by processing circuitry 1860. Each hardware device may comprise one or more network interface controllers (NICs) 1870, also known as network interface cards, which include physical network interface 1880. Each hardware device may also include non-transitory, persistent, machine-readable storage media 1890-2 having stored therein software 1895 and/or instructions executable by processing circuitry 1860. Software 1895 may include any type of software including software for instantiating one or more virtualization layers 1850 (also referred to as hypervisors), software to execute virtual machines 1840 as well as software allowing it to execute functions, features and/or benefits described in relation with some embodiments described herein.

Virtual machines 1840, comprise virtual processing, virtual memory, virtual networking or interface and virtual storage, and may be run by a corresponding virtualization layer 1850 or hypervisor. Different embodiments of the instance of virtual appliance 1820 may be implemented on one or more of virtual machines 1840, and the implementations may be made in different ways.

During operation, processing circuitry 1860 executes software 1895 to instantiate the hypervisor or virtualization layer 1850, which may sometimes be referred to as a virtual machine monitor (VMM). Virtualization layer 1850 may present a virtual operating platform that appears like networking hardware to virtual machine 1840.

As shown in FIG. 18, hardware 1830 may be a standalone network node with generic or specific components. Hardware 1830 may comprise antenna 18225 and may implement some functions via virtualization. Alternatively, hardware 1830 may be part of a larger cluster of hardware (e.g. such as in a data center or customer premise equipment (CPE)) where many hardware nodes work together and are managed via management and orchestration (MANO) 18100, which, among others, oversees lifecycle management of applications 1820.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1840 may be a software implementation of a physical machine that runs programs as if they were executing on a physical, non-virtualized machine. Each of virtual machines 1840, and that part of hardware 1830 that executes that virtual machine, be it hardware dedicated to that virtual machine and/or hardware shared by that virtual machine with others of the virtual machines 1840, forms a separate virtual network elements (VNE).

Still in the context of NFV, Virtual Network Function (VNF) is responsible for handling specific network functions that run in one or more virtual machines 1840 on top of hardware networking infrastructure 1830 and corresponds to application 1820 in FIG. 18.

In some embodiments, one or more radio units 18200 that each include one or more transmitters 18220 and one or more receivers 18210 may be coupled to one or more antennas 18225. Radio units 18200 may communicate directly with hardware nodes 1830 via one or more appropriate network interfaces and may be used in combination with the virtual components to provide a virtual node with radio capabilities, such as a radio access node or a base station.

In some embodiments, some signalling can be effected with the use of control system 18230 which may alternatively be used for communication between the hardware nodes 1830 and radio units 18200.

Figure 19:
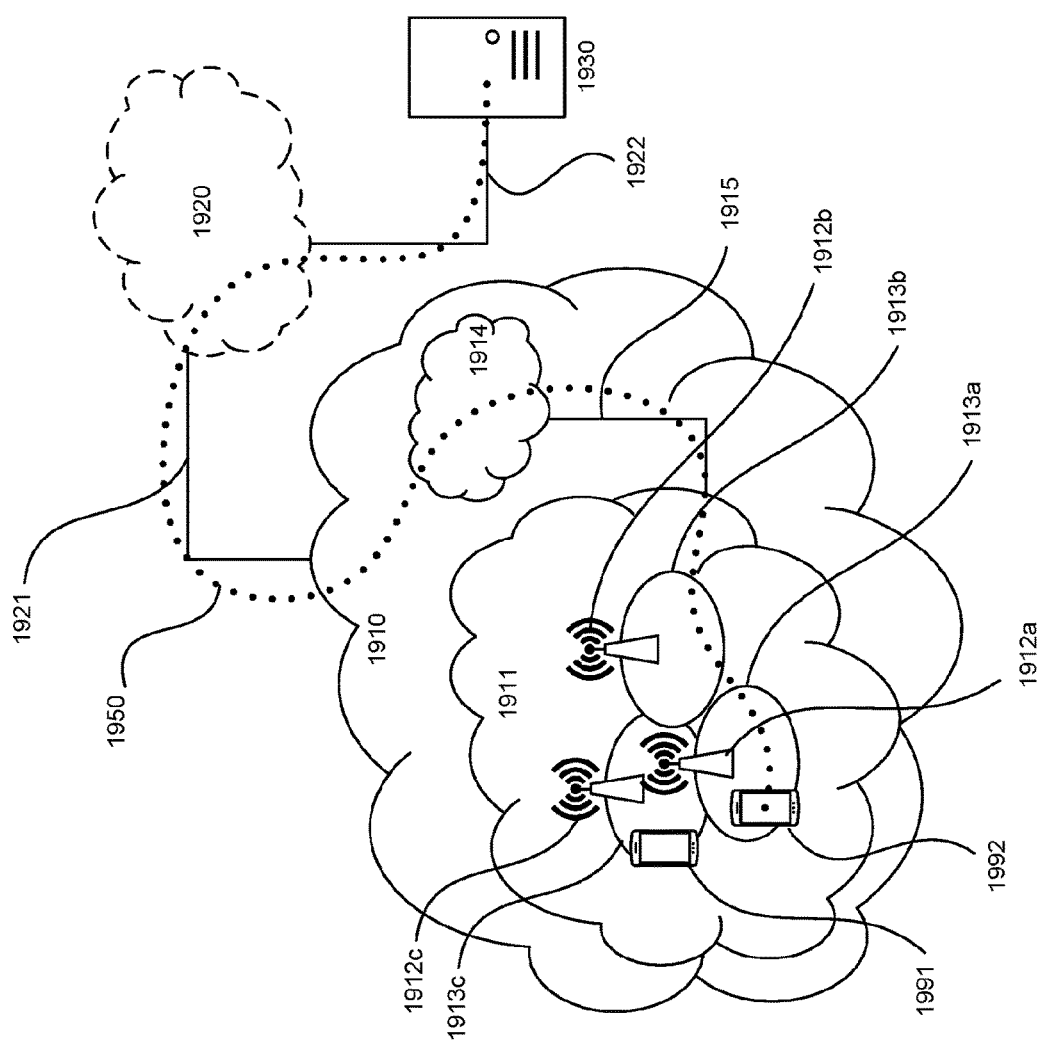
FIG. 19 is a block diagram of a communication network with a host computer according to some embodiments.

FIG. 19 illustrates a telecommunication network connected via an intermediate network to a host computer in accordance with some embodiments. In particular, with reference to FIG. 19, in accordance with an embodiment, a communication system includes telecommunication network 1910, such as a 3GPP-type cellular network, which comprises access network 1911, such as a radio access network, and core network 1914. Access network 1911 comprises a plurality of base stations 1912a, 1912b, 1912c, such as NBs, eNBs, gNBs or other types of wireless access points, each defining a corresponding coverage area 1913a, 1913b, 1913c. Each base station 1912a, 1912b, 1912c is connectable to core network 1914 over a wired or wireless connection 1915. A first UE 1991 located in coverage area 1913c is configured to wirelessly connect to, or be paged by, the corresponding base station 1912c. A second UE 1992 in coverage area 1913a is wirelessly connectable to the corresponding base station 1912a. While a plurality of UEs 1991, 1992 are illustrated in this example, the disclosed embodiments are equally applicable to a situation where a sole UE is in the coverage area or where a sole UE is connecting to the corresponding base station 1912.

Telecommunication network 1910 is itself connected to host computer 1930, which may be embodied in the hardware and/or software of a standalone server, a cloud-implemented server, a distributed server or as processing resources in a server farm. Host computer 1930 may be under the ownership or control of a service provider, or may be operated by the service provider or on behalf of the service provider. Connections 1921 and 1922 between telecommunication network 1910 and host computer 1930 may extend directly from core network 1914 to host computer 1930 or may go via an optional intermediate network 1920. Intermediate network 1920 may be one of, or a combination of more than one of, a public, private or hosted network; intermediate network 1920, if any, may be a backbone network or the Internet; in particular, intermediate network 1920 may comprise two or more sub-networks (not shown).

The communication system of FIG. 19 as a whole enables connectivity between the connected UEs 1991, 1992 and host computer 1930. The connectivity may be described as an over-the-top (OTT) connection 1950. Host computer 1930 and the connected UEs 1991, 1992 are configured to communicate data and/or signaling via OTT connection 1950, using access network 1911, core network 1914, any intermediate network 1920 and possible further infrastructure (not shown) as intermediaries. OTT connection 1950 may be transparent in the sense that the participating communication devices through which OTT connection 1950 passes are unaware of routing of uplink and downlink communications. For example, base station 1912 may not or need not be informed about the past routing of an incoming downlink communication with data originating from host computer 1930 to be forwarded (e.g., handed over) to a connected UE 1991. Similarly, base station 1912 need not be aware of the future routing of an outgoing uplink communication originating from the UE 1991 towards the host computer 1930.

Figure 20:
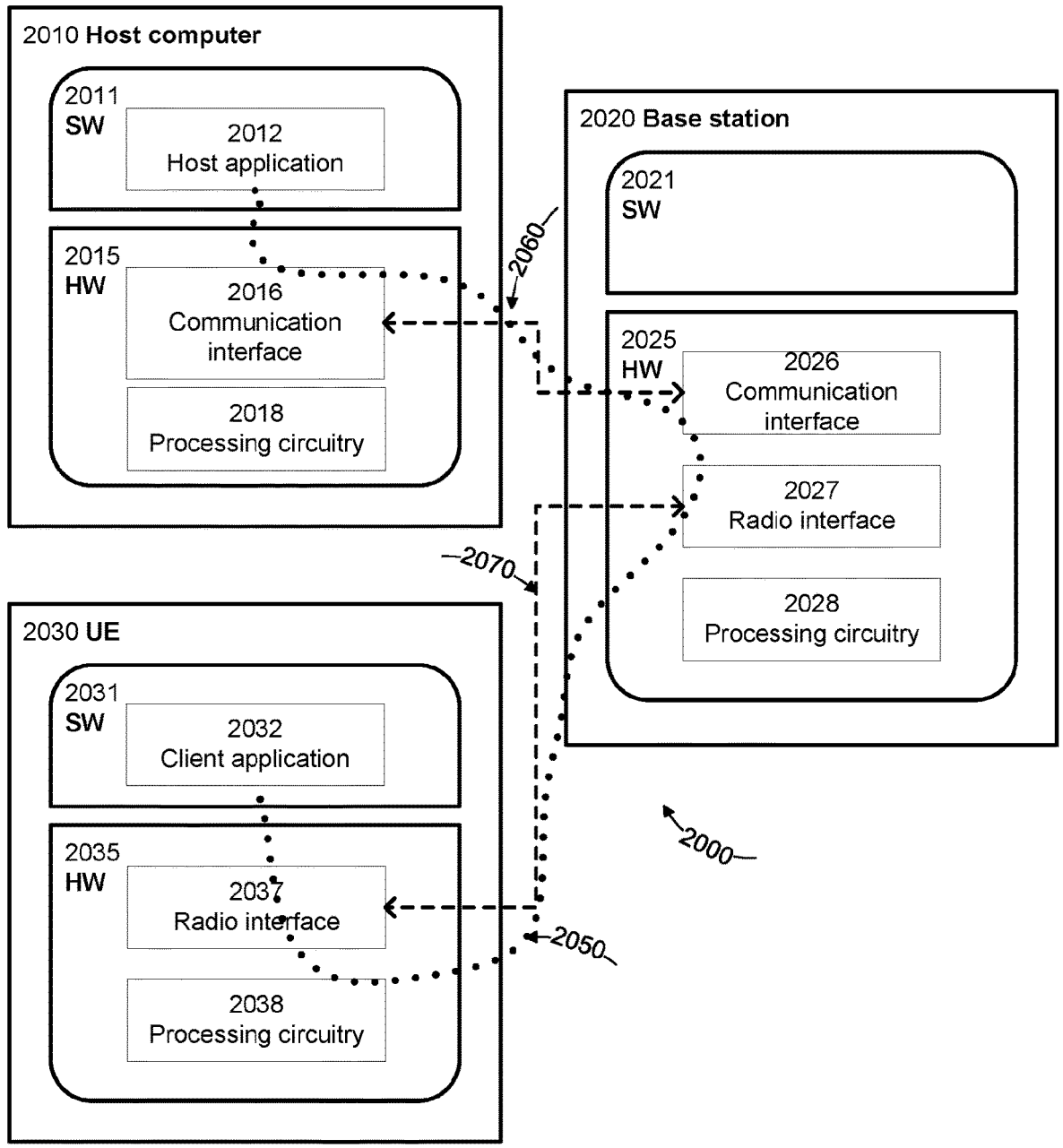
FIG. 20 is a block diagram of a host computer according to some embodiments.

Example implementations, in accordance with an embodiment, of the UE, base station and host computer discussed in the preceding paragraphs will now be described with reference to FIG. 20. FIG. 20 illustrates host computer communicating via a base station with a user equipment over a partially wireless connection in accordance with some embodiments In communication system 2000, host computer 2010 comprises hardware 2015 including communication interface 2016 configured to set up and maintain a wired or wireless connection with an interface of a different communication device of communication system 2000. Host computer 2010 further comprises processing circuitry 2018, which may have storage and/or processing capabilities. In particular, processing circuitry 2018 may comprise one or more programmable processors, application-specific integrated circuits, field programmable gate arrays or combinations of these (not shown) adapted to execute instructions. Host computer 2010 further comprises software 2011, which is stored in or accessible by host computer 2010 and executable by processing circuitry 2018. Software 2011 includes host application 2012. Host application 2012 may be operable to provide a service to a remote user, such as UE 2030 connecting via OTT connection 2050 terminating at UE 2030 and host computer 2010. In providing the service to the remote user, host application 2012 may provide user data which is transmitted using OTT connection 2050.

Communication system 2000 further includes base station 2020 provided in a telecommunication system and comprising hardware 2025 enabling it to communicate with host computer 2010 and with UE 2030. Hardware 2025 may include communication interface 2026 for setting up and maintaining a wired or wireless connection with an interface of a different communication device of communication system 2000, as well as radio interface 2027 for setting up and maintaining at least wireless connection 2070 with UE 2030 located in a coverage area (not shown in FIG. 20) served by base station 2020. Communication interface 2026 may be configured to facilitate connection 2060 to host computer 2010. Connection 2060 may be direct or it may pass through a core network (not shown in FIG. 20) of the telecommunication system and/or through one or more intermediate networks outside the telecommunication system. In the embodiment shown, hardware 2025 of base station 2020 further includes processing circuitry 2028, which may comprise one or more programmable processors, application-specific integrated circuits, field programmable gate arrays or combinations of these (not shown) adapted to execute instructions. Base station 2020 further has software 2021 stored internally or accessible via an external connection.

Communication system 2000 further includes UE 2030 already referred to. Its hardware 2035 may include radio interface 2037 configured to set up and maintain wireless connection 2070 with a base station serving a coverage area in which UE 2030 is currently located. Hardware 2035 of UE 2030 further includes processing circuitry 2038, which may comprise one or more programmable processors, application-specific integrated circuits, field programmable gate arrays or combinations of these (not shown) adapted to execute instructions. UE 2030 further comprises software 2031, which is stored in or accessible by UE 2030 and executable by processing circuitry 2038. Software 2031 includes client application 2032. Client application 2032 may be operable to provide a service to a human or non-human user via UE 2030, with the support of host computer 2010. In host computer 2010, an executing host application 2012 may communicate with the executing client application 2032 via OTT connection 2050 terminating at UE 2030 and host computer 2010. In providing the service to the user, client application 2032 may receive request data from host application 2012 and provide user data in response to the request data. OTT connection 2050 may transfer both the request data and the user data. Client application 2032 may interact with the user to generate the user data that it provides.

It is noted that host computer 2010, base station 2020 and UE 2030 illustrated in FIG. 20 may be similar or identical to host computer 1930, one of base stations 1912*a*, 1912*b*, 1912*c* and one of U Es 1991, 1992 of FIG. 19, respectively. This is to say, the inner workings of these entities may be as shown in FIG. 20 and independently, the surrounding network topology may be that of FIG. 19.

In FIG. 20, OTT connection 2050 has been drawn abstractly to illustrate the communication between host computer 2010 and UE 2030 via base station 2020, without explicit reference to any intermediary devices and the precise routing of messages via these devices. Network infrastructure may determine the routing, which it may be configured to hide from UE 2030 or from the service provider operating host computer 2010, or both. While OTT connection 2050 is active, the network infrastructure may further take decisions by which it dynamically changes the routing (e.g., on the basis of load balancing consideration or reconfiguration of the network).

Wireless connection 2070 between UE 2030 and base station 2020 is in accordance with the teachings of the embodiments described throughout this disclosure. One or more of the various embodiments improve the performance of OTT services provided to UE 2030 using OTT connection 2050, in which wireless connection 2070 forms the last segment. More precisely, the teachings of these embodiments may improve the packet transmission efficiency in unacknowledged mode, so as to conserve radio resources, processing resources, and/or power consumption, and thereby provide benefits such as relaxed restriction on file size (due to improved system performance) and extended battery lifetime of wireless devices.

A measurement procedure may be provided for the purpose of monitoring data rate, latency and other factors on which the one or more embodiments improve. There may further be an optional network functionality for reconfiguring OTT connection 2050 between host computer 2010 and UE 2030, in response to variations in the measurement results. The measurement procedure and/or the network functionality for reconfiguring OTT connection 2050 may be implemented in software 2011 and hardware 2015 of host computer 2010 or in software 2031 and hardware 2035 of UE 2030, or both. In embodiments, sensors (not shown) may be deployed in or in association with communication devices through which OTT connection 2050 passes; the sensors may participate in the measurement procedure by supplying values of the monitored quantities exemplified above, or supplying values of other physical quantities from which software 2011, 2031 may compute or estimate the monitored quantities. The reconfiguring of OTT connection 2050 may include message format, retransmission settings, preferred routing etc.; the reconfiguring need not affect base station 2020, and it may be unknown or imperceptible to base station 2020. Such procedures and functionalities may be known and practiced in the art. In certain embodiments, measurements may involve proprietary UE signaling facilitating host computer 2010's measurements of throughput, propagation times, latency and the like. The measurements may be implemented in that software 2011 and 2031 causes messages to be transmitted, in particular empty or 'dummy' messages, using OTT connection 2050 while it monitors propagation times, errors etc.

Figure 21:
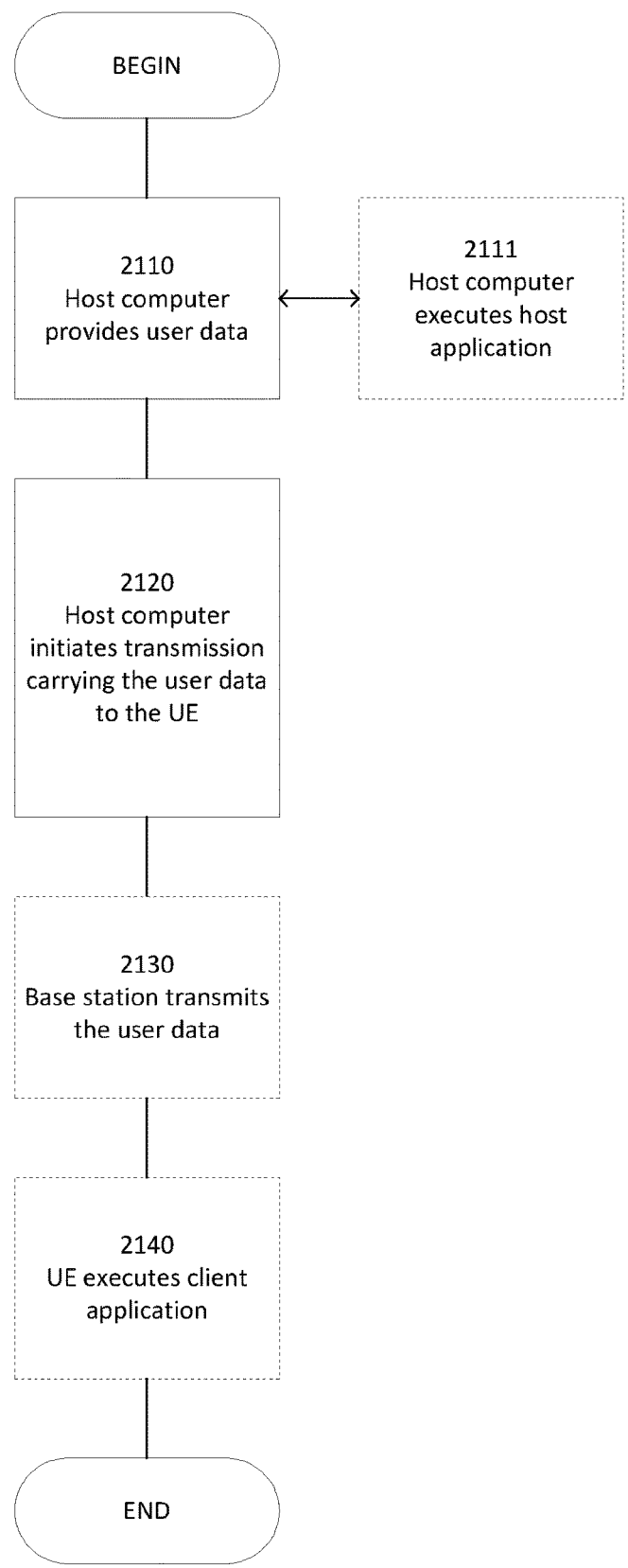
FIG. 21 is a flowchart illustrating a method implemented in a communication system, in accordance with one embodiment.

FIG. 21 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 21 will be included in this section. In step 2110, the host computer provides user data. In substep 2111 (which may be optional) of step 2110, the host computer provides the user data by executing a host application. In step 2120, the host computer initiates a transmission carrying the user data to the UE. In step 2130 (which may be optional), the base station transmits to the UE the user data which was carried in the transmission that the host computer initiated, in accordance with the teachings of the embodiments described throughout this disclosure. In step 2140 (which may also be optional), the UE executes a client application associated with the host application executed by the host computer.

Figure 22:
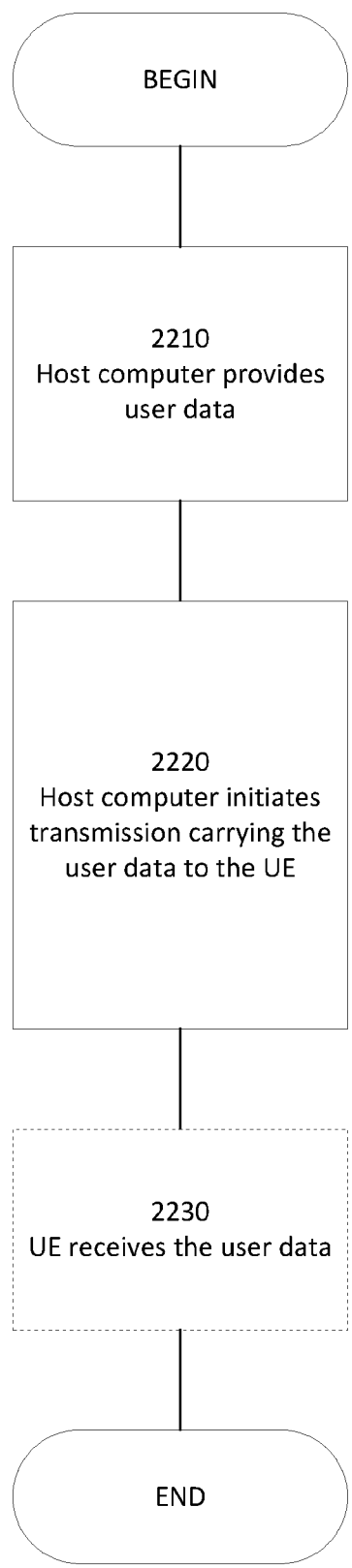
FIG. 22 is a flowchart illustrating a method implemented in a communication system, in accordance with one embodiment.

FIG. 22 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 22 will be included in this section. In step 2210 of the method, the host computer provides user data. In an optional substep (not shown) the host computer provides the user data by executing a host application. In step 2220, the host computer initiates a transmission carrying the user data to the UE. The transmission may pass via the base station, in accordance with the teachings of the embodiments described throughout this disclosure. In step 2230 (which may be optional), the UE receives the user data carried in the transmission.

Figure 23:
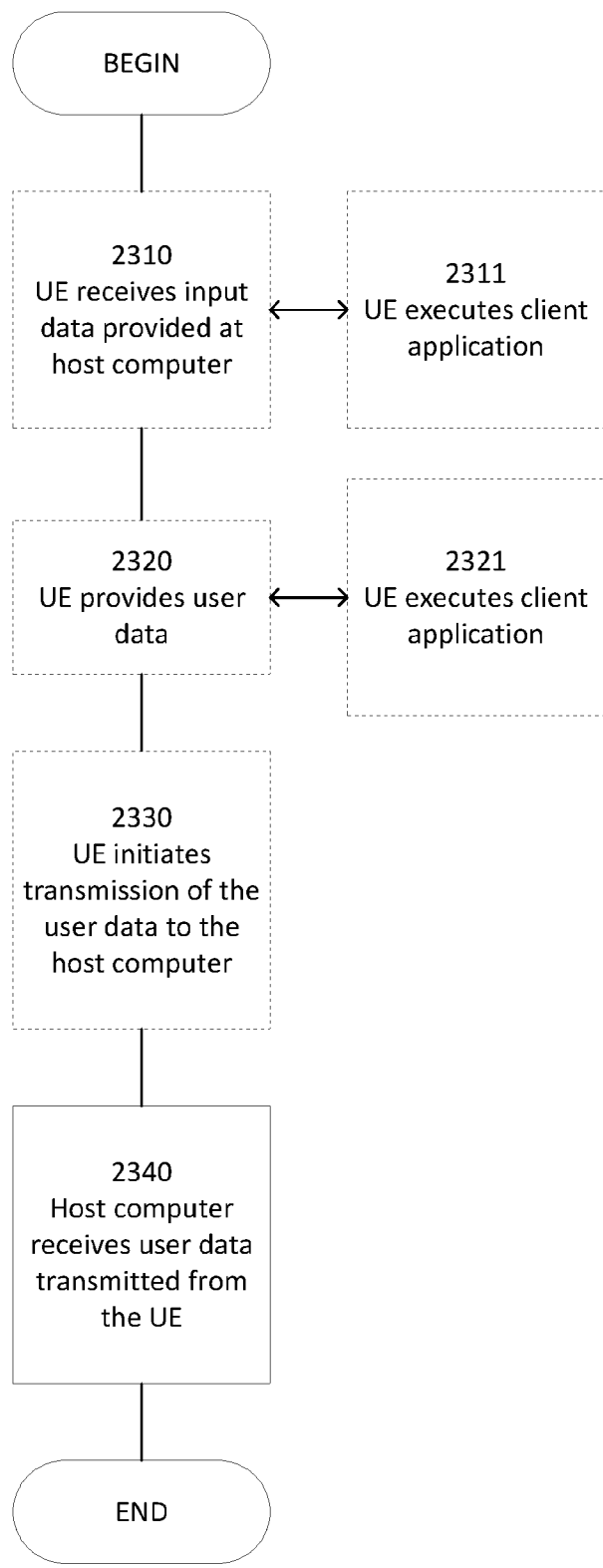
FIG. 23 is a flowchart illustrating a method implemented in a communication system, in accordance with one embodiment.

FIG. 23 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 23 will be included in this section. In step 2310 (which may be optional), the UE receives input data provided by the host computer. Additionally or alternatively, in step 2320, the UE provides user data. In substep 2321 (which may be optional) of step 2320, the UE provides the user data by executing a client application. In substep 2311 (which may be optional) of step 2310, the UE executes a client application which provides the user data in reaction to the received input data provided by the host computer. In providing the user data, the executed client application may further consider user input received from the user. Regardless of the specific manner in which the user data was provided, the UE initiates, in substep 2330 (which may be optional), transmission of the user data to the host computer. In step 2340 of the method, the host computer receives the user data transmitted from the UE, in accordance with the teachings of the embodiments described throughout this disclosure.

Figure 24:
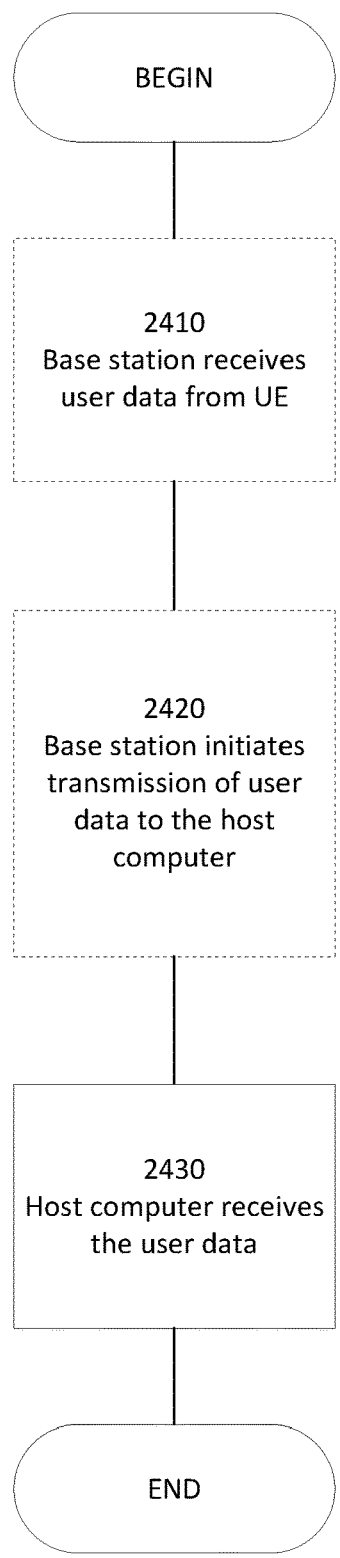
FIG. 24 is a flowchart illustrating a method implemented in a communication system, in accordance with one embodiment.

FIG. 24 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 24 will be included in this section. In step 2410 (which may be optional), in accordance with the teachings of the embodiments described throughout this disclosure, the base station receives user data from the UE. In step 2420 (which may be optional), the base station initiates transmission of the received user data to the host computer. In step 2430 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

In view of the above, then, embodiments herein generally include a communication system including a host computer. The host computer may comprise processing circuitry configured to provide user data. The host computer may also comprise a communication interface configured to forward the user data to a cellular network for transmission to a user equipment (UE). The cellular network may comprise a base station having a radio interface and processing circuitry, the base station's processing circuitry configured to perform any of the steps of any of the embodiments described above for a base station.

In some embodiments, the communication system further includes the base station.

In some embodiments, the communication system further includes the UE, wherein the UE is configured to communicate with the base station.

In some embodiments, the processing circuitry of the host computer is configured to execute a host application, thereby providing the user data. In this case, the UE comprises processing circuitry configured to execute a client application associated with the host application.

Embodiments herein also include a method implemented in a communication system including a host computer, a base station and a user equipment (UE). The method comprises, at the host computer, providing user data. The method may also comprise, at the host computer, initiating a transmission carrying the user data to the UE via a cellular network comprising the base station. The base station performs any of the steps of any of the embodiments described above for a base station.

In some embodiments, the method further comprising, at the base station, transmitting the user data.

In some embodiments, the user data is provided at the host computer by executing a host application. In this case, the method further comprises, at the UE, executing a client application associated with the host application.

Embodiments herein also include a user equipment (UE) configured to communicate with a base station. The UE comprises a radio interface and processing circuitry configured to perform any of the embodiments above described for a UE.

Embodiments herein further include a communication system including a host computer. The host computer comprises processing circuitry configured to provide user data, and a communication interface configured to forward user data to a cellular network for transmission to a user equipment (UE). The UE comprises a radio interface and processing circuitry. The UE's components are configured to perform any of the steps of any of the embodiments described above for a UE.

In some embodiments, the cellular network further includes a base station configured to communicate with the UE.

In some embodiments, the processing circuitry of the host computer is configured to execute a host application, thereby providing the user data. The UE's processing circuitry is configured to execute a client application associated with the host application.

Embodiments also include a method implemented in a communication system including a host computer, a base station and a user equipment (UE). The method comprises, at the host computer, providing user data and initiating a transmission carrying the user data to the UE via a cellular network comprising the base station. The UE performs any of the steps of any of the embodiments described above for a UE.

In some embodiments, the method further comprises, at the UE, receiving the user data from the base station.

Embodiments herein further include a communication system including a host computer. The host computer comprises a communication interface configured to receive user data originating from a transmission from a user equipment (UE) to a base station. The UE comprises a radio interface and processing circuitry. The UE's processing circuitry is configured to perform any of the steps of any of the embodiments described above for a UE.

In some embodiments the communication system further includes the UE.

In some embodiments, the communication system further including the base station. In this case, the base station comprises a radio interface configured to communicate with the UE and a communication interface configured to forward to the host computer the user data carried by a transmission from the UE to the base station.

In some embodiments, the processing circuitry of the host computer is configured to execute a host application. And the UE's processing circuitry is configured to execute a client application associated with the host application, thereby providing the user data.

In some embodiments, the processing circuitry of the host computer is configured to execute a host application, thereby providing request data. And the UE's processing circuitry is configured to execute a client application associated with the host application, thereby providing the user data in response to the request data.

Embodiments herein also include a method implemented in a communication system including a host computer, a base station and a user equipment (UE). The method comprises, at the host computer, receiving user data transmitted to the base station from the UE. The UE performs any of the steps of any of the embodiments described above for the UE.

In some embodiments, the method further comprises, at the UE, providing the user data to the base station.

In some embodiments, the method also comprises, at the UE, executing a client application, thereby providing the user data to be transmitted. The method may further comprise, at the host computer, executing a host application associated with the client application.

In some embodiments, the method further comprises, at the UE, executing a client application, and, at the UE, receiving input data to the client application. The input data is provided at the host computer by executing a host application associated with the client application. The user data to be transmitted is provided by the client application in response to the input data.

Embodiments also include a communication system including a host computer. The host computer comprises a communication interface configured to receive user data originating from a transmission from a user equipment (UE) to a base station. The base station comprises a radio interface and processing circuitry. The base station's processing circuitry is configured to perform any of the steps of any of the embodiments described above for a base station.

In some embodiments, the communication system further includes the base station.

In some embodiments, the communication system further includes the UE. The UE is configured to communicate with the base station.

In some embodiments, the processing circuitry of the host computer is configured to execute a host application. And the UE is configured to execute a client application associated with the host application, thereby providing the user data to be received by the host computer.

Embodiments moreover include a method implemented in a communication system including a host computer, a base station and a user equipment (UE). The method comprises, at the host computer, receiving, from the base station, user data originating from a transmission which the base station has received from the UE. The UE performs any of the steps of any of the embodiments described above for a UE.

In some embodiments, the method further comprises, at the base station, receiving the user data from the UE.

In some embodiments, the method further comprises, at the base station, initiating a transmission of the received user data to the host computer.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

What is claimed is:

1. A method performed by a wireless device, the method comprising:
    establishing, to a source radio network node, an unacknowledged mode bearer with a source link;
    receiving a handover command that commands the wireless device to perform a make-before-break handover from the source link to a target link;
    performing the make-before-break handover from the source link to the target link, the make-before-break handover comprising establishing a connection to a target radio network node with the target link and resetting a downlink data packet sequence number receiver status for the unacknowledged mode bearer after or as part of the make-before-brake handover;
    after receiving the handover command, continuing to receive from the source link downlink data packets for the unacknowledged mode bearer, until after the wireless device establishes the connection with the target link;
    after the wireless device establishes the connection with the target link, receiving from the target link downlink data packets for the unacknowledged mode bearer;
    preserving a downlink data packet sequence number receiver status at the wireless device for the unacknowledged mode bearer, by using the same downlink data packet sequence number receiver status for the unacknowledged mode bearer before and after the make-before-break handover; and
    based on the downlink data packet sequence number receiver status as preserved, monitoring for data packets received in duplicate from the source link and the target link for the unacknowledged mode bearer.

2. The method of claim 1, wherein the downlink data packets are downlink packet data convergence protocol (PDCP) service data units (SDUs) and wherein the downlink data packet sequence number receiver status is a downlink PDCP sequence number (SN) receiver status that indicates a next PDCP SN that the target link shall assign to a new SDU which does not have a PDCP SN yet.

3. The method of claim 1, wherein said preserving comprises preserving a packet data convergence protocol (PDCP) COUNT for the unacknowledged mode bearer, wherein the PDCP COUNT comprises a hyper-frame number (HFN) and a PDCP sequence number.

4. The method of claim 1, wherein a packet data convergence protocol (PDCP) COUNT comprises a hyper-frame number (HFN) and a PDCP sequence number, and wherein said preserving comprises preserving at least the PDCP sequence number of the PDCP COUNT for the unacknowledged mode bearer.

5. The method of claim 1, wherein the unacknowledged mode bearer is a radio link control (RLC) unacknowledged mode (UM) bearer or a radio bearer that utilizes RLC UM.

6. A method performed by a source radio network node, the method comprising:
    establishing, with a wireless device, an unacknowledged mode bearer with a source link;
    transmitting, to the wireless device, a handover command that commands the wireless device to perform a make-before-break handover from the source link provided by the source radio network node to a target link provided by a target radio network node, the make-before-break handover comprises resetting a downlink data packet sequence number transmitter status for the unacknowledged mode bearer after or as part of the make-before-break handover;
    preserving the downlink data packet sequence number transmitter/receiver status at the source radio network node for the unacknowledged mode bearer by using the same downlink data packet sequence number transmitter/receiver status for the unacknowledged mode bearer before and after the make-before-break handover; and
    transmitting, from the source radio network node to the target radio network node, control signaling indicating the preserved downlink data packet sequence number transmitter/receiver status at the source radio network node for the unacknowledged mode bearer.

7. The method of claim 6, further comprising, after transmitting the handover command:
    forwarding downlink data packets for the unacknowledged mode bearer from the source radio network node to the target radio network node; and
    continuing to transmit downlink data packets for the unacknowledged mode bearer from the source link to the wireless device, until after the wireless device establishes a connection with the target link as part of the make-before-break handover.

8. The method of claim 6, wherein the downlink data packet sequence number transmitter status indicates a next sequence number that the target radio network node shall assign to a new data packet for the unacknowledged mode bearer which does not have a sequence number yet.

9. The method of claim 6, wherein the downlink data packets are downlink packet data convergence protocol (PDCP) service data units (SDUs) wherein the downlink data packet sequence number transmitter status is a downlink PDCP sequence number (SN) transmitter status that indicates a next PDCP SN that the target link shall assign to a new SDU which does not have a PDCP SN yet.

10. The method of claim 6, wherein a packet data convergence protocol (PDCP) COUNT comprises a hyper-frame number (HFN) and a PDCP sequence number, and wherein said downlink data packet sequence number transmitter status comprises at least the PDCP sequence number of the PDCP COUNT for the unacknowledged mode bearer.

11. The method of claim 6, wherein the unacknowledged mode bearer is a radio link control (RLC) unacknowledged mode (UM) bearer or a radio bearer that utilizes RLC UM.

12. A method performed by a target radio network node, the method comprising:
    transmitting, from the target radio network node, a handover command to a source radio network node that commands a wireless device to perform a make-before-break handover from a source link provided by the source radio network node to a target link provided by the target radio network node, the make-before-break handover comprises resetting a downlink data packet sequence number transmitter/receiver status for an unacknowledged mode bearer after or as part of the make-before-break handover; and
    receiving, from the source radio network node, control signaling indicating a preserved downlink data packet sequence number transmitter/receiver status at the source radio network node for the unacknowledged mode bearer,
    wherein the downlink data packet sequence number transmitter/receiver status is preserved at the source radio network node for the unacknowledged mode bearer by using the same downlink data packet sequence number transmitter/receiver status for the unacknowledged mode bearer before and after the make-before-break handover.

13. The method of claim 12, further comprising:
    after transmitting the handover command, receiving downlink data packets for the unacknowledged mode bearer forwarded from the source radio network node; and
    after establishing a connection between the wireless device and the target link as part of the make-before-break handover, transmitting from the target link to the wireless device downlink data packets for the unacknowledged mode bearer.

14. The method of claim 12, wherein the downlink data packet sequence number transmitter status indicates a next sequence number that the target radio network node shall assign to a new data packet for the unacknowledged mode bearer which does not have a sequence number yet.

15. The method of claim 14, wherein the next sequence number is a sequence number occurring next after a highest sequence number of downlink data packets transmitted by the source radio network node to the wireless device for the unacknowledged mode bearer.

16. The method of claim 14, further comprising assigning the indicated next sequence number to a new data packet for the unacknowledged mode bearer which does not have a sequence number yet.

17. The method of claim 12, wherein a DL COUNT field of a sequence number (SN) status transfer message indicates a PDCP-SN and a Hyper frame number, and wherein the control signaling comprises the PDCP-SN indicated by the DL COUNT field.

18. The method of claim 12, wherein the downlink data packets are downlink packet data convergence protocol (PDCP) service data units (SDUs) and wherein the downlink data packet sequence number transmitter status is a downlink PDCP sequence number (SN) transmitter status that indicates a next PDCP SN that the target link shall assign to a new SDU which does not have a PDCP SN yet.

19. The method of claim 12, wherein the unacknowledged mode bearer is a radio link control (RLC) unacknowledged mode (UM) bearer or a radio bearer that utilizes RLC UM.

20. A wireless device comprising:
communication circuitry; and
processing circuitry configured to:
- establish to a source radio network node, an unacknowledged mode bearer with a source link;
- receive a handover command that commands the wireless device to perform a make-before-break handover from the source link to a target link;
- perform the make-before-break handover from the source link to the target link, the make-before-break handover comprising establishing a connection to a target radio network node with the target link and resetting a downlink data packet sequence number receiver status for the unacknowledged mode bearer after or as part of the make-before-break handover;
- after receiving the handover command, continue to receive from the source link downlink data packets for the unacknowledged mode bearer, until after the wireless device establishes the connection with the target link;
- after the wireless device establishes the connection with the target link, receive from the target link downlink data packets for the unacknowledged mode bearer;
- preserve a downlink data packet sequence number receiver status at the wireless device for the unacknowledged mode bearer, by using the same downlink data packet sequence number receiver status for the unacknowledged mode bearer before and after the make-before-break handover; and
- based on the downlink data packet sequence number receiver status as preserved, monitor for data packets received in duplicate from the source link and the target link for the unacknowledged mode bearer.

21. The wireless device of claim 20, wherein the downlink data packets are downlink packet data convergence protocol (PDCP) service data units (SDUs) and wherein the downlink data packet sequence number receiver status is a downlink PDCP sequence number (SN) receiver status that indicates a next PDCP SN that the target link shall assign to a new SDU which does not have a PDCP SN yet.

22. The wireless device of claim 20, wherein the processing circuitry is configured to preserve a packet data convergence protocol (PDCP) COUNT for the unacknowledged mode bearer, wherein the PDCP COUNT comprises a hyperframe number (HFN) and a PDCP sequence number.

23. The wireless device of claim 20, wherein a packet data convergence protocol (PDCP) COUNT comprises a hyperframe number (HFN) and a PDCP sequence number, and wherein the processing circuitry is configured to preserve at least the PDCP sequence number of the PDCP COUNT for the unacknowledged mode bearer.

24. The wireless device of claim 20, wherein the unacknowledged mode bearer is a radio link control (RLC) unacknowledged mode (UM) bearer or a radio bearer that utilizes RLC UM.

25. A source radio network node comprising:
communication circuitry; and
processing circuitry configured to:
- establish, with a wireless device, an unacknowledged mode bearer with a source link;
- transmit, to the wireless device, a handover command that commands the wireless device to perform a make-before-break handover from the source link provided by the source radio network node to a target link provided by a target radio network node, the make-before-break handover comprises resetting a downlink data packet sequence number transmitter status for the unacknowledged mode bearer;
- preserve the downlink data packet sequence number transmitter status at the source radio network node for the unacknowledged mode bearer by using the same downlink data packet sequence number transmitter status for the unacknowledged mode bearer before and after the make-before-break handover; and
- transmit, from the source radio network node to the target radio network node, control signaling indicating the preserved downlink data packet sequence number transmitter status at the source radio network node for the unacknowledged mode bearer.

26. A target radio network node comprising:
communication circuitry; and
processing circuitry configured to:
transmit, from the target radio network node, a handover command to a source radio network node that commands a wireless device to perform a make-before-break handover from a source link provided by the source radio network node to a target link provided by the target radio network node, the make-before-break handover comprises resetting a downlink data packet sequence number transmitter status for an unacknowledged mode bearer after or as part of the make-before-break handover; and
receive, from the source radio network node, control signaling indicating a preserved downlink data packet sequence number transmitter status at the source radio network node for the unacknowledged mode bearer,
wherein the downlink data packet sequence number transmitter/receiver status is preserved at the source radio network node for the unacknowledged mode bearer by using the same downlink data packet sequence number transmitter/receiver status for the unacknowledged mode bearer before and after the make-before-break handover.

* * * * *